(12) United States Patent
Taieb et al.

(10) Patent No.: US 11,953,340 B2
(45) Date of Patent: Apr. 9, 2024

(54) UPDATING ROAD NAVIGATION MODEL USING NON-SEMANTIC ROAD FEATURE POINTS

(71) Applicant: Mobileye Vision Technologies Ltd., Jerusalem (IL)

(72) Inventors: Yoav Taieb, Jerusalem (IL); Itai Ben Shalom, Mazkeret Batya (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 348 days.

(21) Appl. No.: 17/400,252

(22) Filed: Aug. 12, 2021

(65) Prior Publication Data
US 2021/0372808 A1    Dec. 2, 2021

Related U.S. Application Data

(63) Continuation of application No. PCT/IB2020/000115, filed on Feb. 14, 2020.
(Continued)

(51) Int. Cl.
*G01C 21/00* (2006.01)
*B60W 10/18* (2012.01)
(Continued)

(52) U.S. Cl.
CPC ......... *G01C 21/3807* (2020.08); *B60W 10/18* (2013.01); *B60W 30/181* (2013.01);
(Continued)

(58) Field of Classification Search
CPC ...... G06V 20/56; G06V 20/58; G06V 20/582; G06V 20/588; G06V 10/764;
(Continued)

(56) References Cited

U.S. PATENT DOCUMENTS

2015/0210274 A1\* 7/2015 Clarke ................. G06T 7/62
382/104
2016/0363647 A1\* 12/2016 Zeng ................ G06V 20/582
(Continued)

FOREIGN PATENT DOCUMENTS

| EP | 3324334 A1 | 5/2018 |
|---|---|---|
| WO | WO 2018/017793 A1 | 1/2018 |
| WO | WO 2018/104563 A2 | 6/2018 |

OTHER PUBLICATIONS

Aly et al., sem Match: Road Semantics-based Accurate Map Matching for Challenging Positioning Data, SIGSPATIAL'15, Nov. 3-6, 2015, Bellevue, WA, USA, 2015 ACM, ISBN 978-1-4503-3967-4/15/11, DOI://dx.doi.org/10.1145/2820783.2820824, pp. 1-10.\*
(Continued)

*Primary Examiner* — Guillermo M Rivera-Martinez
(74) *Attorney, Agent, or Firm* — FINNEGAN, HENDERSON, FARABOW, GARRETT & DUNNER, LLP

(57) ABSTRACT

A navigation system may include a processor programmed to analyze a first image to identify a non-semantic road feature; identify a first image location, in the first image, of one point associated with the non-semantic road feature; analyze a second image to identify a representation of the non-semantic road feature in the second image; identify a second image location, in the second image, of the one point associated with the non-semantic road feature; determine, based on a difference between the first and second image locations and based on motion information for a vehicle between a capture of the first image and a capture of the second image, three-dimensional coordinates for the one point associated with the non-semantic road feature; and send the three-dimensional coordinates for the one point
(Continued)

associated with the non-semantic road feature to a server for use in updating a road navigation model.

25 Claims, 65 Drawing Sheets

Related U.S. Application Data

(60) Provisional application No. 62/813,403, filed on Mar. 4, 2019, provisional application No. 62/805,646, filed on Feb. 14, 2019.

(51) Int. Cl.
| | |
|---|---|
| *B60W 30/18* | (2012.01) |
| *G01C 21/36* | (2006.01) |
| *G06T 7/00* | (2017.01) |
| *G06T 7/246* | (2017.01) |
| *G06T 7/32* | (2017.01) |
| *G06T 7/70* | (2017.01) |
| *G06T 7/73* | (2017.01) |
| *G06V 20/56* | (2022.01) |
| *G06V 20/58* | (2022.01) |
| *G06V 20/64* | (2022.01) |
| *G06V 40/10* | (2022.01) |
| *G06V 10/46* | (2022.01) |

(52) U.S. Cl.
CPC ... *B60W 30/18154* (2013.01); *G01C 21/3602* (2013.01); *G01C 21/3815* (2020.08); *G01C 21/3841* (2020.08); *G06T 7/246* (2017.01); *G06T 7/32* (2017.01); *G06T 7/70* (2017.01); *G06T 7/73* (2017.01); *G06T 7/97* (2017.01); *G06V 20/582* (2022.01); *G06V 20/584* (2022.01); *G06V 20/588* (2022.01); *G06V 20/64* (2022.01); *G06V 40/103* (2022.01); *B60W 2554/802* (2020.02); *B60W 2556/40* (2020.02); *B60W 2556/50* (2020.02); *G06T 2207/30252* (2013.01); *G06T 2207/30256* (2013.01); *G06T 2207/30261* (2013.01); *G06V 10/462* (2022.01); *G06V 20/58* (2022.01); *G06V 2201/07* (2022.01); *G06V 2201/08* (2022.01)

(58) Field of Classification Search
CPC . G06T 2207/30252; G06T 2207/10016; G06T 17/00
See application file for complete search history.

(56) References Cited

U.S. PATENT DOCUMENTS

| | | | |
|---|---|---|---|
| 2017/0046580 A1* | 2/2017 | Lu | G06V 10/462 |
| 2017/0308989 A1* | 10/2017 | Lee | G06V 20/56 |
| 2018/0189578 A1* | 7/2018 | Yang | B60W 40/04 |
| 2019/0361439 A1* | 11/2019 | Zeng | B60W 50/0097 |
| 2020/0086764 A1* | 3/2020 | Mimura | B60W 30/18 |

OTHER PUBLICATIONS

Wang et al., A Survey of Mobile Laser Scanning Applications and Key Techniques over Urban Areas, Remote Sensing 2019; 11(13), 1540, //doi.org/10.3390/rs11131540. pp. 1-20.*
International Search Report and Written Opinion issued in International No. PCT/IB2020/000115, dated Aug. 19, 2020, 22 pages.
International Search Report, issued from the European Patent Office in International Application No. GB2315493.3, dated Nov. 14, 2023 (6 pages).

* cited by examiner

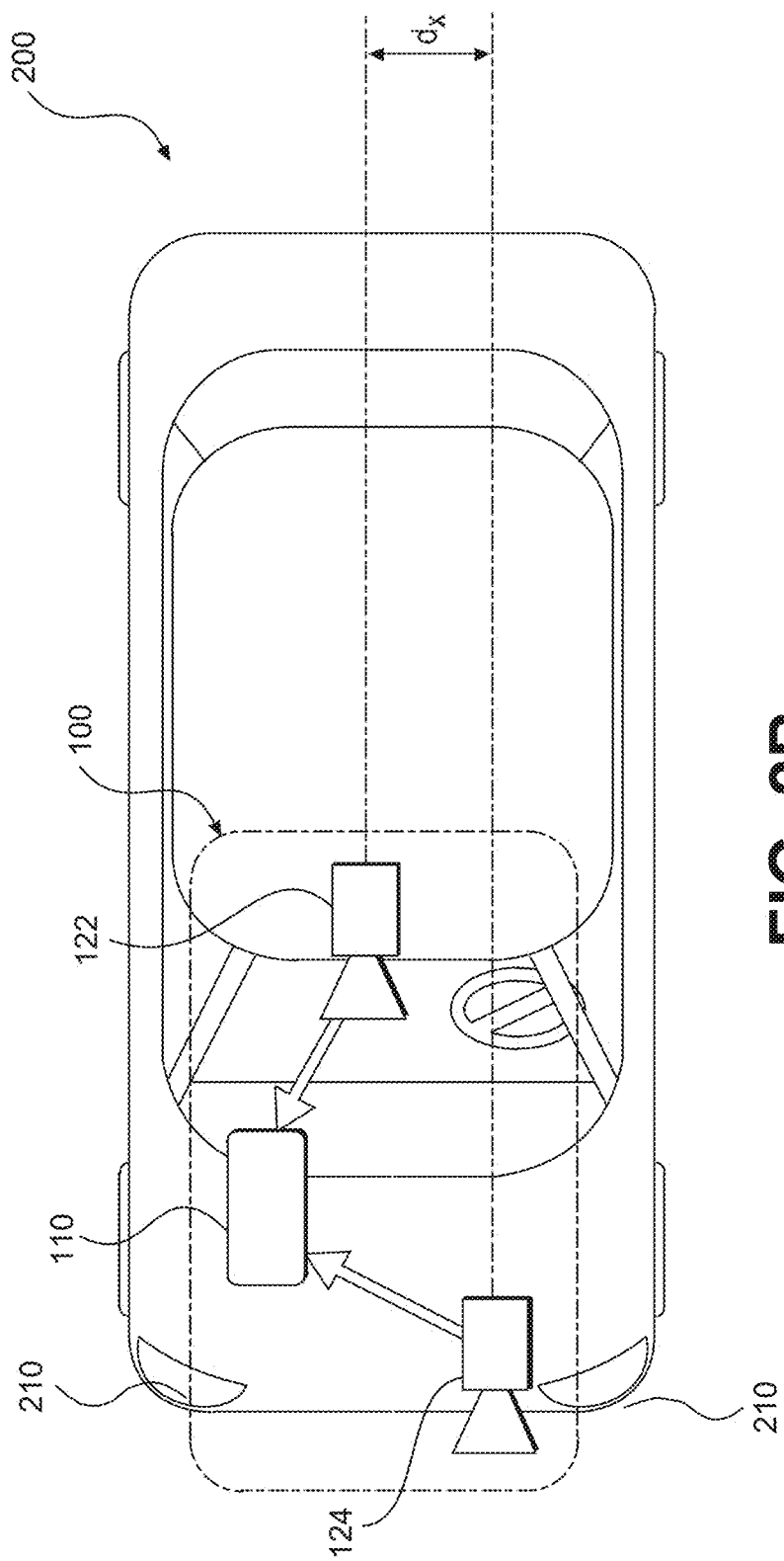

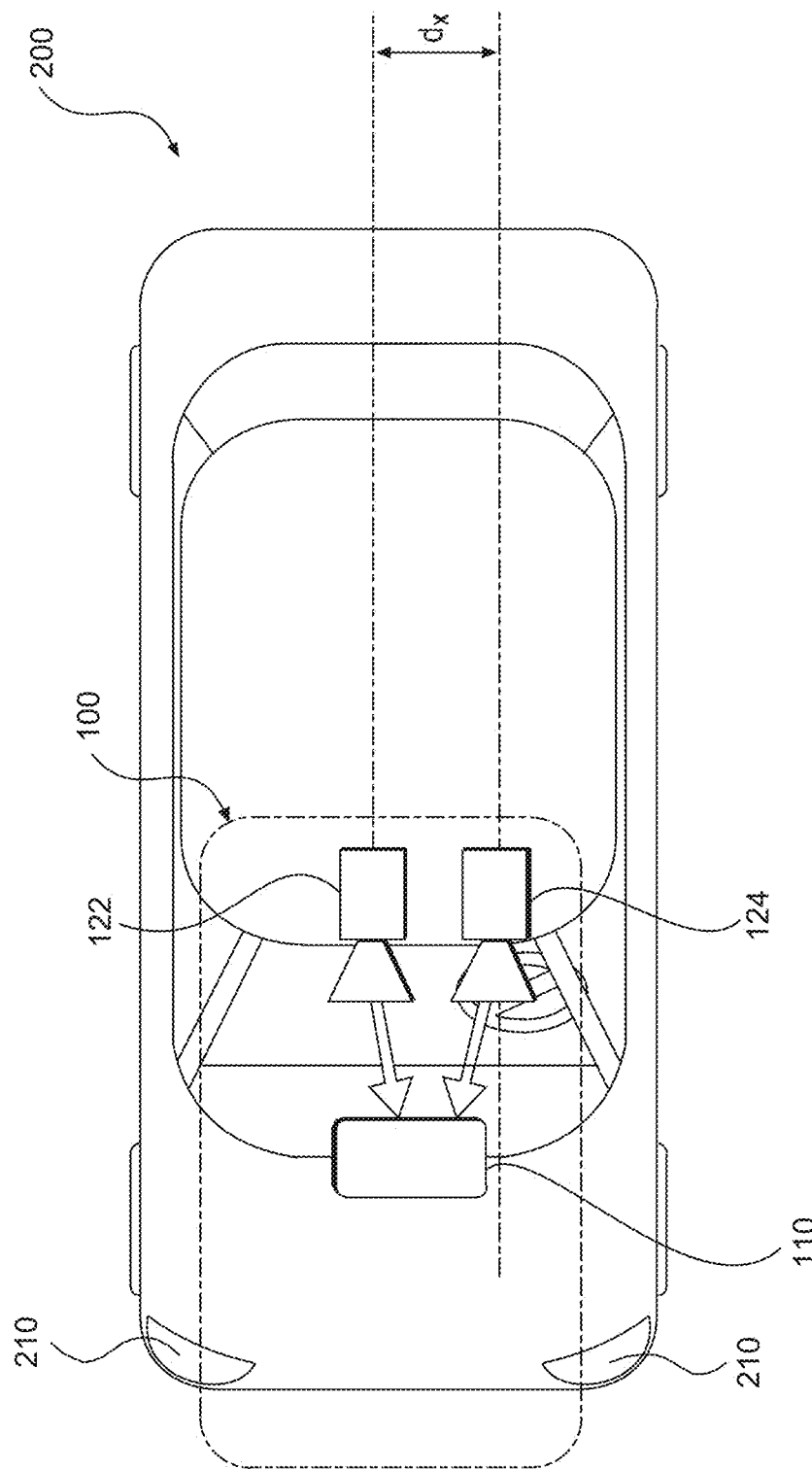

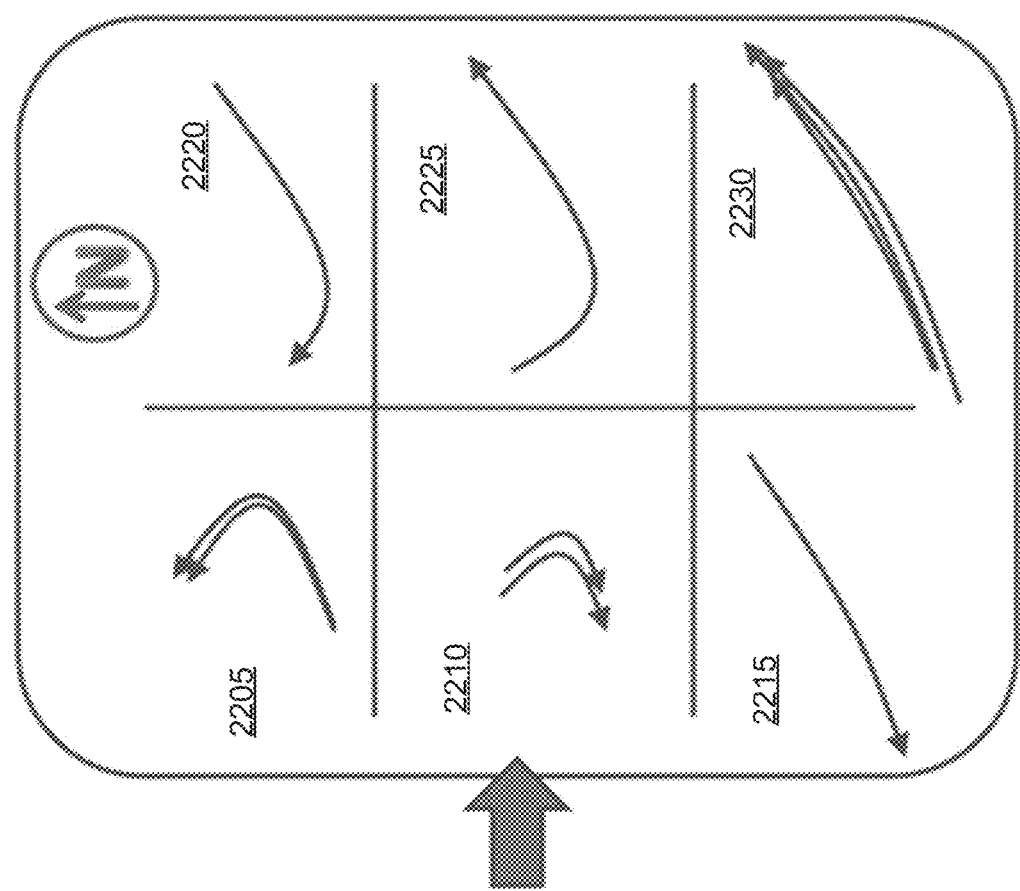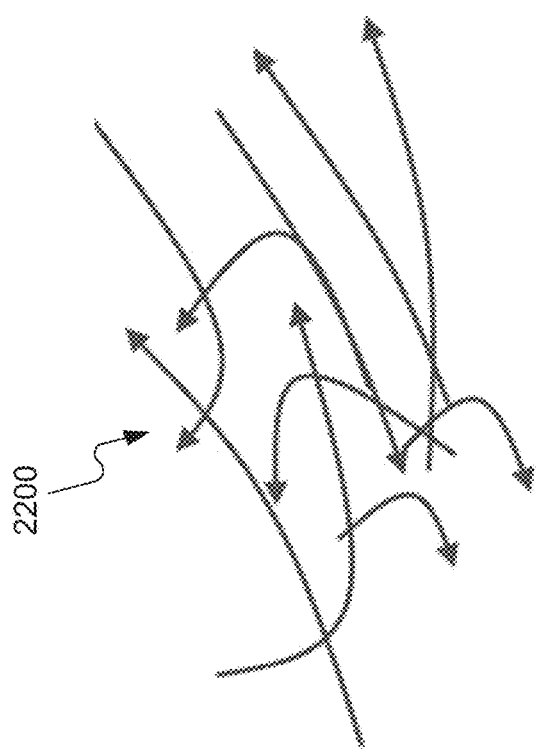
FIG. 22

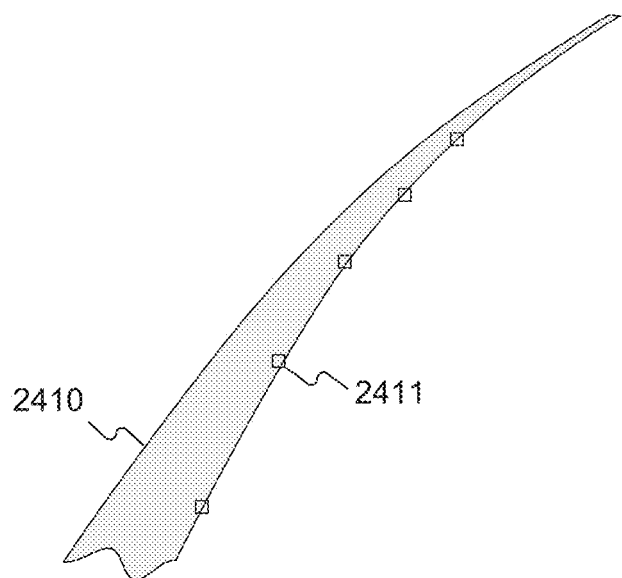
FIG. 24A
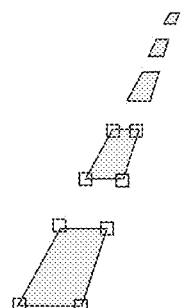
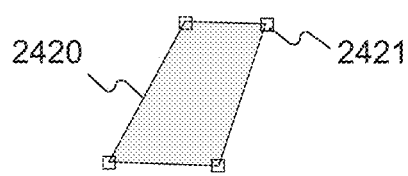
FIG. 24B

2920

```
┌─────────────────────────────────────────────────────────────┐
│ RECEIVE DRIVE INFORMATION FROM EACH OF A PLURALITY OF       │ ─ 2921
│ VEHICLES, THE DRIVE INFORMATION INCLUDING A STOPPING        │
│ LOCATION AT WHICH A PARTICULAR VEHICLE STOPPED RELATIVE TO  │
│ AN INTERSECTION DURING A DRIVE ALONG A ROAD SEGMENT         │
└─────────────────────────────────────────────────────────────┘
                              │
                              ▼
┌─────────────────────────────────────────────────────────────┐
│ AGGREGATE THE STOPPING LOCATIONS IN THE DRIVE INFORMATION   │ ─ 2922
│ RECEIVED FROM THE PLURALITY OF VEHICLES                     │
└─────────────────────────────────────────────────────────────┘
                              │
                              ▼
┌─────────────────────────────────────────────────────────────┐
│ DETERMINE, BASED ON THE AGGREGATED STOPPING LOCATIONS, A    │ ─ 2923
│ STOP LINE LOCATION RELATIVE TO THE INTERSECTION             │
└─────────────────────────────────────────────────────────────┘
                              │
                              ▼
┌─────────────────────────────────────────────────────────────┐
│ UPDATE THE ROAD NAVIGATION MODEL TO INCLUDE THE STOP LINE   │ ─ 2924
│ LOCATION                                                    │
└─────────────────────────────────────────────────────────────┘
```

UPDATING ROAD NAVIGATION MODEL USING NON-SEMANTIC ROAD FEATURE POINTS

CROSS REFERENCES TO RELATED APPLICATIONS

This application is a continuation of International Application No. PCT/IB2020/000115, filed Feb. 14, 2020, which claims the benefit of priority of U.S. Provisional Application No. 62/805,646, filed on Feb. 14, 2019, and U.S. Provisional Application No. 62/813,403, filed on Mar. 4, 2019. The foregoing applications are incorporated herein by reference in their entirety.

BACKGROUND

Technical Field

The present disclosure relates generally to vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for vehicle navigation. The disclosed embodiments may use cameras to provide vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In an embodiment, a navigation system for a host vehicle may include at least one processor programmed to receive, from a camera of the host vehicle, one or more images captured from an environment of the host vehicle. The at least one processor may also be programmed to analyze the one or more images to detect an indicator of an intersection. The at least one processor may further be programmed to determine, based on output received from at least one sensor of the host vehicle, a stopping location of the host vehicle relative to the detected intersection. The at least one processor may also be programmed to analyze the one or more images to determine an indicator of whether one or more other vehicles are in front of the host vehicle. The at least one processor may further be programmed to send the stopping location of the host vehicle and the indicator of whether one or more other vehicles are in front of the host vehicle to a server for use in updating a road navigation model.

In an embodiment, a computer-implemented method for a host vehicle may include receiving, from a camera of the host vehicle, one or more images captured from an environment of the host vehicle. The method may also include analyzing the one or more images to detect an indicator of an intersection. The method may further include determining, based on output received from at least one sensor of the host vehicle, a stopping location of the host vehicle relative to the detected intersection. The method may also include analyzing the one or more images to determine an indicator of whether one or more other vehicles are in front of the host vehicle. The method may further include sending the stopping location of the host vehicle and the indicator of whether one or more other vehicles are in front of the host vehicle to a server for use in updating a road navigation model.

In an embodiment, a system for updating a road navigation model for a road segment may include at least one processor programmed to receive drive information from each of a plurality of vehicles, the drive information including a stopping location at which a particular vehicle from among the plurality of vehicles stopped relative to an intersection during a drive along the road segment. The at least one processor may also be programmed to aggregate the stopping locations in the drive information received from the plurality of vehicles. The at least one processor may further be programmed to determine, based on the aggregated stopping locations, a stop line location relative to the intersection. The at least one processor may also be programmed to update the road navigation model to include the stop line location.

In an embodiment, a computer-implemented method for updating a road navigation model for a road segment may include receiving drive information from each of a plurality of vehicles, the drive information including a stopping location at which a particular vehicle from among the plurality of vehicles stopped relative to an intersection during a drive along the road segment. The method may also include aggregating the stopping locations in the drive information received from the plurality of vehicles. The method may further include determining, based on the aggregated stopping locations, a stop line location relative to the intersection. The method may also include updating the road navigation model to include the stop line location.

In an embodiment, a navigation system for a host vehicle may include at least one processor programmed to receive, from a camera of the host vehicle, one or more images captured from an environment of the host vehicle. The at least one processor may also be programmed to detect an indicator of an intersection in an environment of the host vehicle, wherein a surface of road segment in a lane forward of the host vehicle includes no markings indicating a location for stopping. The at least one processor may further be programmed to receive map information including a stop line location relative to the intersection. The at least one processor may also be programmed to cause, based on the stop line location relative to the intersection, the host vehicle to perform at least one navigational action relative to the intersection.

In an embodiment, a computer-implemented method for a host vehicle may include receiving, from a camera of the host vehicle, one or more images captured from an environment of the host vehicle. The method may also include detecting an indicator of an intersection in an environment of the host vehicle, wherein a surface of road segment in a lane forward of the host vehicle includes no markings indicating a location for stopping. The method may further include receiving map information including a stop line location relative to the intersection. The method may also include causing, based on the stop line location relative to the intersection, the host vehicle to perform at least one navigational action relative to the intersection.

In an embodiment, a navigation system for a host vehicle may include at least one processor programmed to receive, from a camera of the host vehicle, one or more images captured from an environment of the host vehicle. The at least one processor may also be programmed to analyze the one or more images to detect an indicator of an intersection. The at least one processor may further be programmed to determine, based on output received from at least one sensor of the host vehicle, a stopping location of the host vehicle relative to the detected intersection. The at least one processor may also be programmed to analyze the one or more images to determine that no vehicles are in front of the host vehicle. The at least one processor may further be programmed to send the stopping location of the host vehicle based on the determination that no vehicles are in front of the host vehicle.

In an embodiment, a system for generating map information may include at least one processor programmed to receive a first image from a first vehicle captured by a camera of the first vehicle during a drive of the first vehicle along at least a portion of a road segment and receive a second image from a second vehicle captured by a camera of the second vehicle during a drive of the first vehicle along at least a portion of the road segment. The at least processor may also be configured to analyze the first and second images to identify representations of a plurality of objects. The objects may belong to at least one predetermined category of objects. The at least processor may further be programmed to analyze the first and second images to determine position indicators for each of the plurality of objects relative to the road segment. The at least processor may also be programmed to correlate the position indicators for each of the plurality of objects. The correlating may include determining refined positions of each object based on the determined position indicators. The at least processor may further be programmed to generate, based on the refined positions of objects belonging to a particular predetermined category of objects, a map including representations of the refined positions of one or more of the plurality objects that belong to the particular predetermined category of objects.

In an embodiment, a computer-implemented method for generating map information may include receiving a first image from a first vehicle captured by a camera of the first vehicle during a drive of the first vehicle along at least a portion of a road segment and receiving a second image from a second vehicle captured by a camera of the second vehicle during a drive of the first vehicle along at least a portion of the road segment. The method may also include analyzing the first and second images to identify representations of a plurality of objects. The objects may belong to at least one predetermined category of objects. The method may further include analyzing the first and second images to determine position indicators for each of the plurality of objects relative to the road segment. The method may also include correlating the position indicators for each of the plurality of objects. The correlating may include determining refined positions of each object based on the determined position indicators. The method may further include generating, based on the refined positions of objects belonging to a particular predetermined category of objects, a map including representations of the refined positions of one or more of the plurality objects that belong to the particular predetermined category of objects.

In an embodiment, a non-transitory computer-readable medium storing instructions that, when executed by at least one processor, are configured to cause at least one processor to receive a first image from a first vehicle captured by a camera of the first vehicle during a drive of the first vehicle along at least a portion of a road segment and receive a second image from a second vehicle captured by a camera of the second vehicle during a drive of the first vehicle along at least a portion of the road segment. The instructions may also cause the at least processor to analyze the first and second images to identify representations of a plurality of objects. The objects may belong to at least one predetermined category of objects. The instructions may further cause the at least processor to analyze the first and second images to determine position indicators for each of the plurality of objects relative to the road segment. The instructions may also cause the at least processor to correlate the position indicators for each of the plurality of objects. The correlating may include determining refined positions of each object based on the determined position indicators. The instructions may further cause the at least processor to generate, based on the refined positions of objects belonging to a particular predetermined category of objects, a map including representations of the refined positions of one or more of the plurality objects that belong to the particular predetermined category of objects.

In an embodiment, a system for collecting condition information associated with a road segment may include at least one processor programmed to receive at least one identifier associated with a condition having at least one dynamic characteristic. The at least one identifier may be determined based on acquisition, from a camera associated with a host vehicle, of at least one image representative of an environment of the host vehicle, analysis of the at least one image to identify the condition in the environment of the host vehicle, and analysis of the at least one image to determine the at least one identifier associated with the condition. The at least one processor may also be programmed to update a database record to include the at least one identifier associated with the condition, and distribute the database record to at least one entity.

In an embodiment, a computer-implemented method for collecting condition information associated with a road segment may include receiving at least one identifier associated with a condition having at least one dynamic characteristic. The at least one identifier may be determined based on acquisition, from a camera associated with a host vehicle, of at least one image representative of an environment of the host vehicle, analysis of the at least one image to identify the condition in the environment of the host vehicle, and analysis of the at least one image to determine the at least one identifier associated with the condition. The method may also include updating a database record to include the at least one identifier associated with the condition, and distributing the database record to at least one entity.

In an embodiment, a system for correlating information collected from a plurality of vehicles relative to a common road segment may include at least one processor programmed to receive a first set of drive information from a first vehicle. The first set of drive information may include at least a first indicator of a position associated with a detected semantic road feature and a second indicator of a position associated with a detected non-semantic road feature. The first and second indicators of position may have been determined based on analysis of at least one image captured by a camera of the first vehicle during a drive of the first vehicle along at least a portion of the common road segment. The at least one processor may further be programmed to receive a second set of drive information from a second vehicle. The second set of drive information may include at least a third indicator of a position associated with the detected semantic road feature and a fourth indicator of a position associated with the detected non-semantic road feature. The third and fourth indicators of position may have been determined based on analysis of at least one image captured by a camera of the second vehicle during a drive by the second vehicle along at least the portion of the common road segment. The at least one processor may correlate the first and second sets of drive information. The correlating may include determining a refined position of the detected semantic road feature based on the first and third indicators of the position associated with the detected semantic road feature and determining a refined position of the detected non-semantic road feature based on the second and forth indicators of the position associated with the detected non-semantic road feature. The at least one processor may then store the refined positions of the detected semantic road feature and the detected non-semantic road feature in a map and distribute the map to one or more vehicles for use in navigating the one or more vehicles along the common road segment.

In an embodiment, a computer-implemented method for correlating information collected from a plurality of vehicles relative to a common road segment may include receiving a first set of drive information from a first vehicle. The first set of drive information may include at least a first indicator of a position associated with a detected semantic road feature and a second indicator of a position associated with a detected non-semantic road feature. The first and second indicators of position may have been determined based on analysis of at least one image captured by a camera of the first vehicle during a drive of the first vehicle along at least a portion of the common road segment. The method may further include receiving a second set of drive information from a second vehicle. The second set of drive information may include at least a third indicator of a position associated with the detected semantic road feature and a fourth indicator of a position associated with the detected non-semantic road feature. The third and fourth indicators of position may have been determined based on analysis of at least one image captured by a camera of the second vehicle during a drive by the second vehicle along at least the portion of the common road segment. The method may include correlating the first and second sets of drive information. The correlating may include determining a refined position of the detected semantic road feature based on the first and third indicators of the position associated with the detected semantic road feature and determining a refined position of the detected non-semantic road feature based on the second and forth indicators of the position associated with the detected non-semantic road feature. The method may then include storing the refined positions of the detected semantic road feature and the detected non-semantic road feature in a map and distributing the map to one or more vehicles for use in navigating the one or more vehicles along the common road segment.

In an embodiment, a system for navigating a vehicle may include at least one processor programmed to receive, from a camera of the vehicle, a plurality of images captured from an environment of the vehicle. The at least one processor may analyze a first image of the plurality of images to identify a non-semantic road feature represented in the first image and identify a first image location, in the first image, of at least one point associated with the non-semantic road feature. The at least one processor may further be configured to analyze a second image of the plurality images to identify a representation of the non-semantic road feature in the second image and identify a second image location, in the second image, of the at least one point associated with the non-semantic road feature. The at least one processor may then determine, based on a difference between the first and second image locations and based on motion information for the vehicle between a capture of the first image and a capture of the second image, three-dimensional coordinates for the at least one point associated with the non-semantic road feature. The at least one processor may further be configured to send the three-dimensional coordinates for the at least one point associated with the non-semantic road feature to a server for use in updating a road navigation model.

In an embodiment, a computer-implemented method for navigating a vehicle may include receiving, from a camera of the vehicle, a plurality of images captured from an environment of the vehicle. The method may include analyzing a first image of the plurality of images to identify a non-semantic road feature represented in the first image and identifying a first image location, in the first image, of at least one point associated with the non-semantic road feature. The method may further include analyzing a second image of the plurality images to identify a representation of the non-semantic road feature in the second image identifying a second image location, in the second image, of the at least one point associated with the non-semantic road feature. The method may then include determining, based on a difference between the first and second image locations and based on motion information for the vehicle between a capture of the first image and a capture of the second image, three-dimensional coordinates for the at least one point associated with the non-semantic road feature. The method may further include sending the three-dimensional coordinates for the at least one point associated with the non-semantic road feature to a server for use in updating a road navigation model.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2B is a diagrammatic top view representation of the vehicle and system shown in FIG. 2A consistent with the disclosed embodiments.

FIG. 2C is a diagrammatic top view representation of another embodiment of a vehicle including a system consistent with the disclosed embodiments.

FIG. 22 illustrates a process of clustering vehicle trajectories associated with vehicles, consistent with the disclosed embodiments.

FIGS. 24A, 24B, 24C, and 24D illustrate exemplary lane marks that may be detected consistent with the disclosed embodiments.

FIG. 29B is a flowchart showing an exemplary process for updating a road navigation model, consistent with the disclosed embodiments.

DETAILED DESCRIPTION

Figure 1:
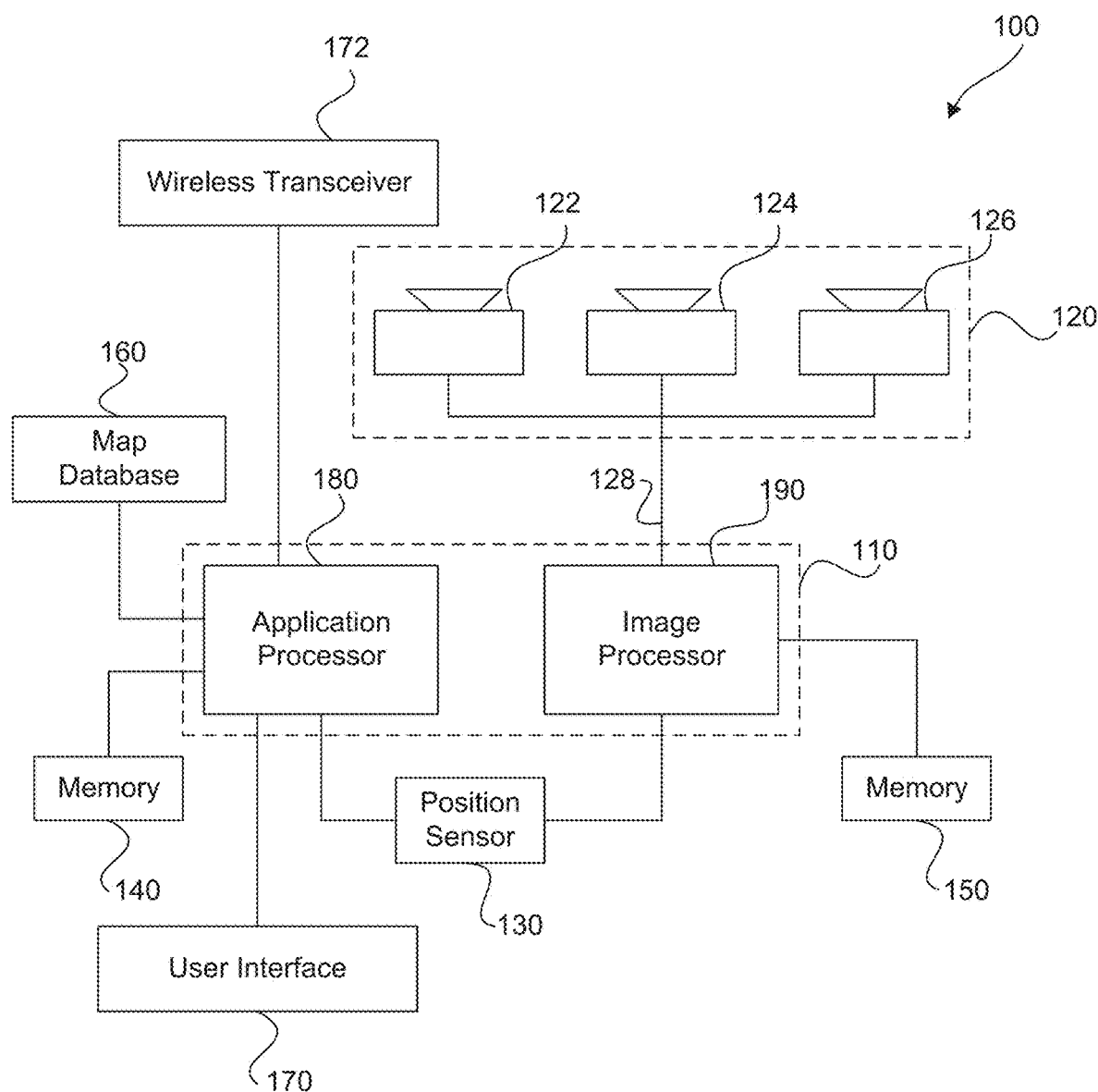
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
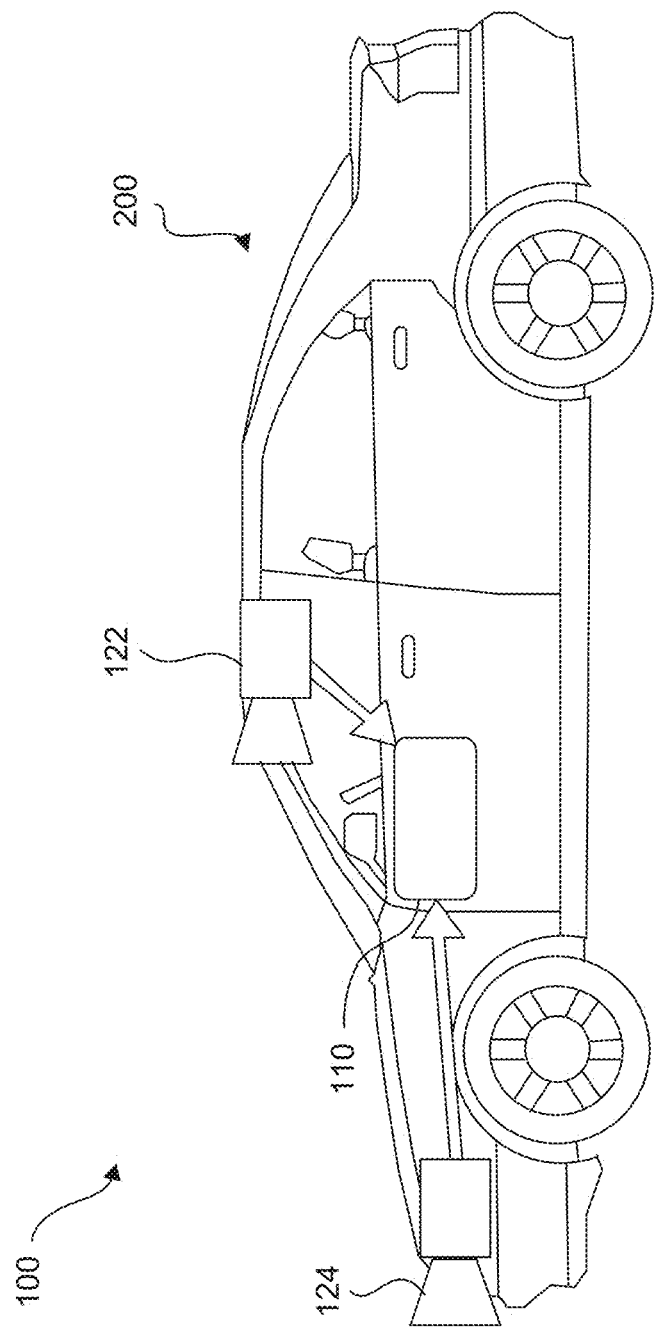
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
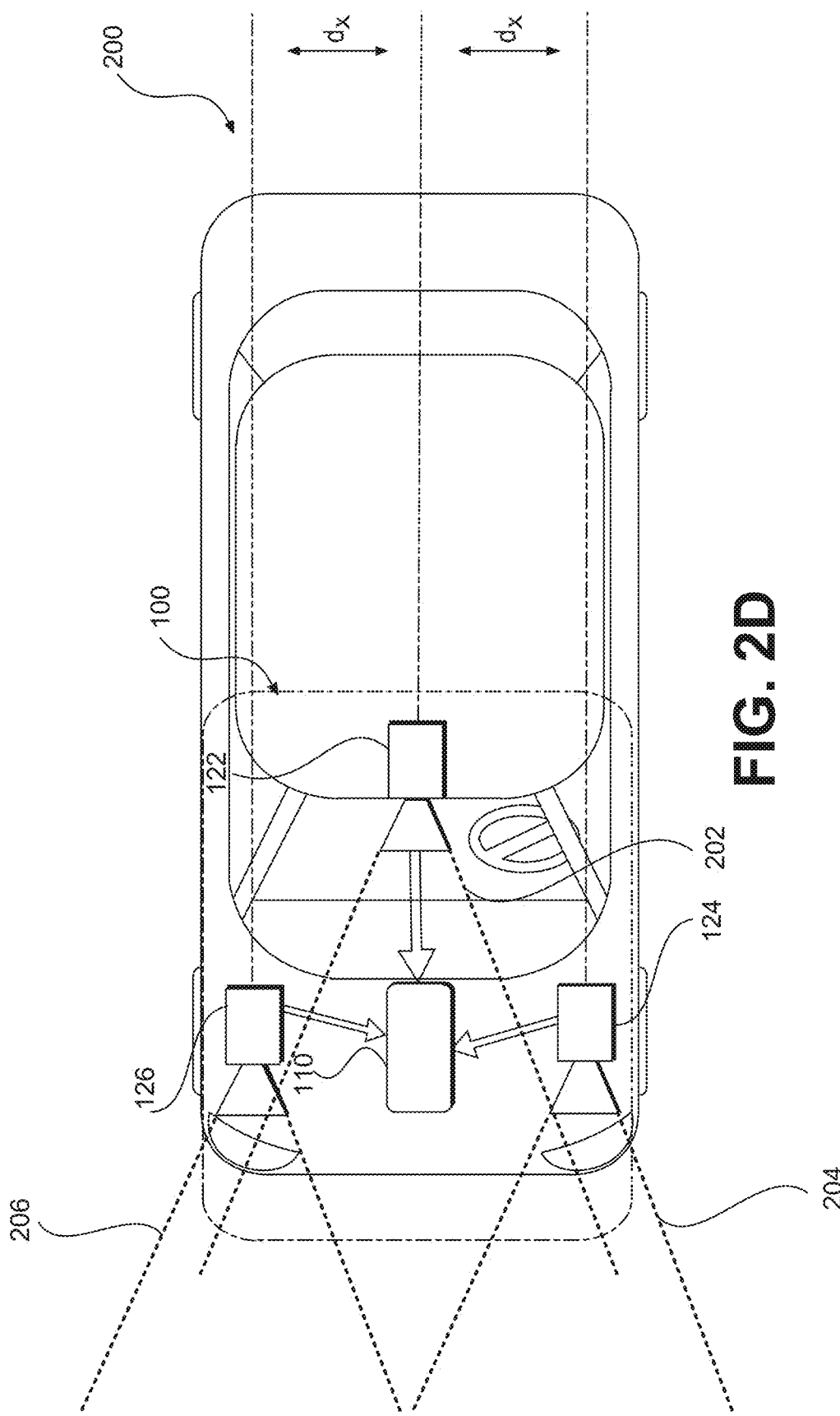
FIG. 2D is a diagrammatic top view representation of yet another embodiment of a vehicle including a system consistent with the disclosed embodiments.
Figure 2E:
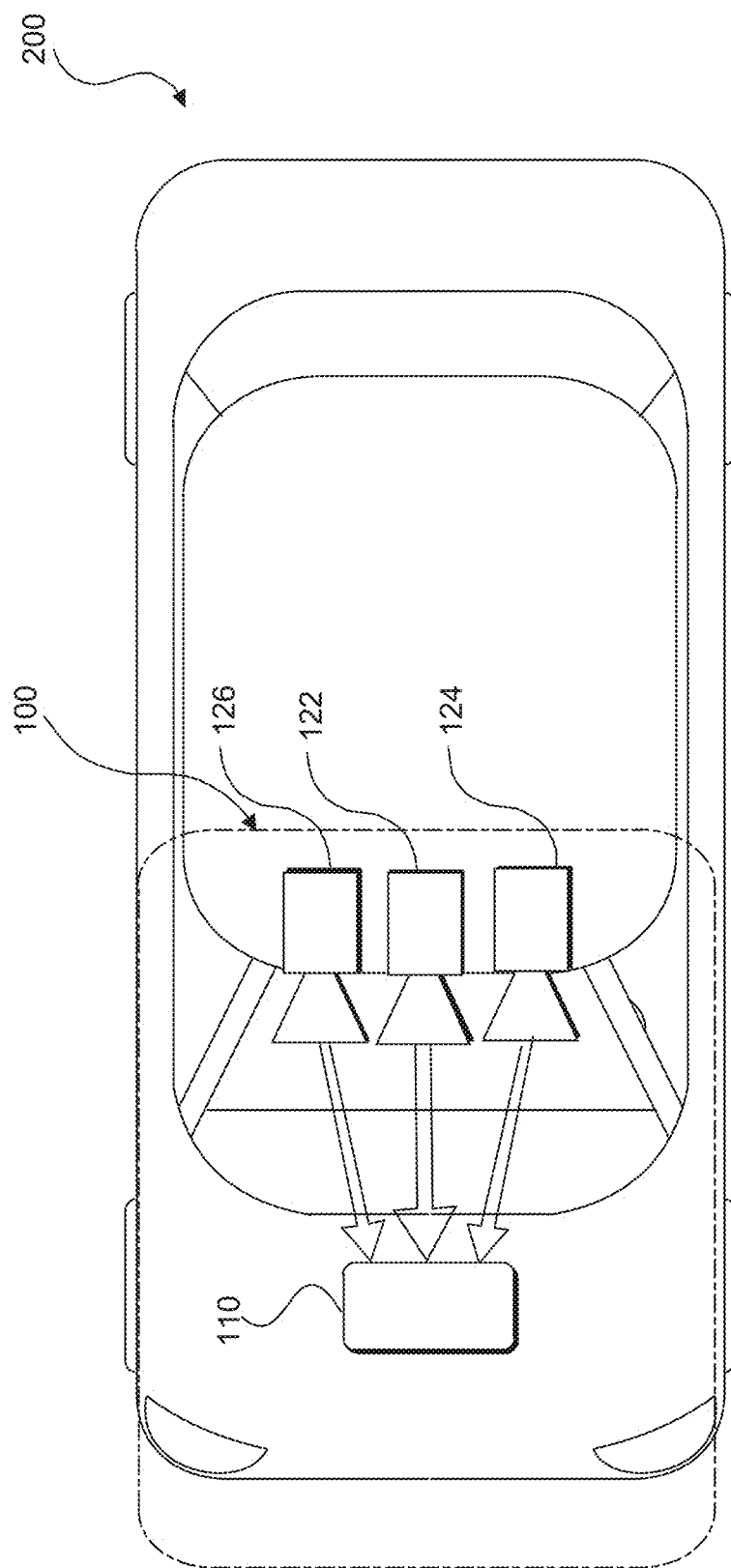
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
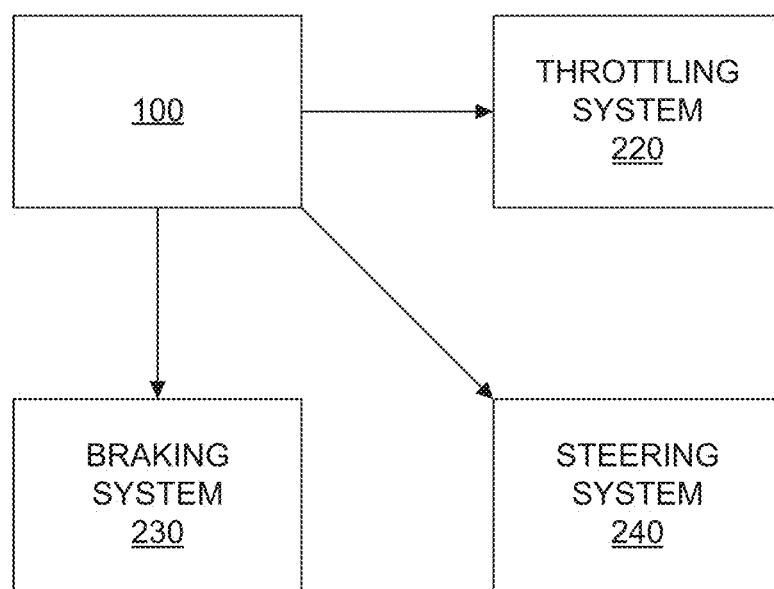
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
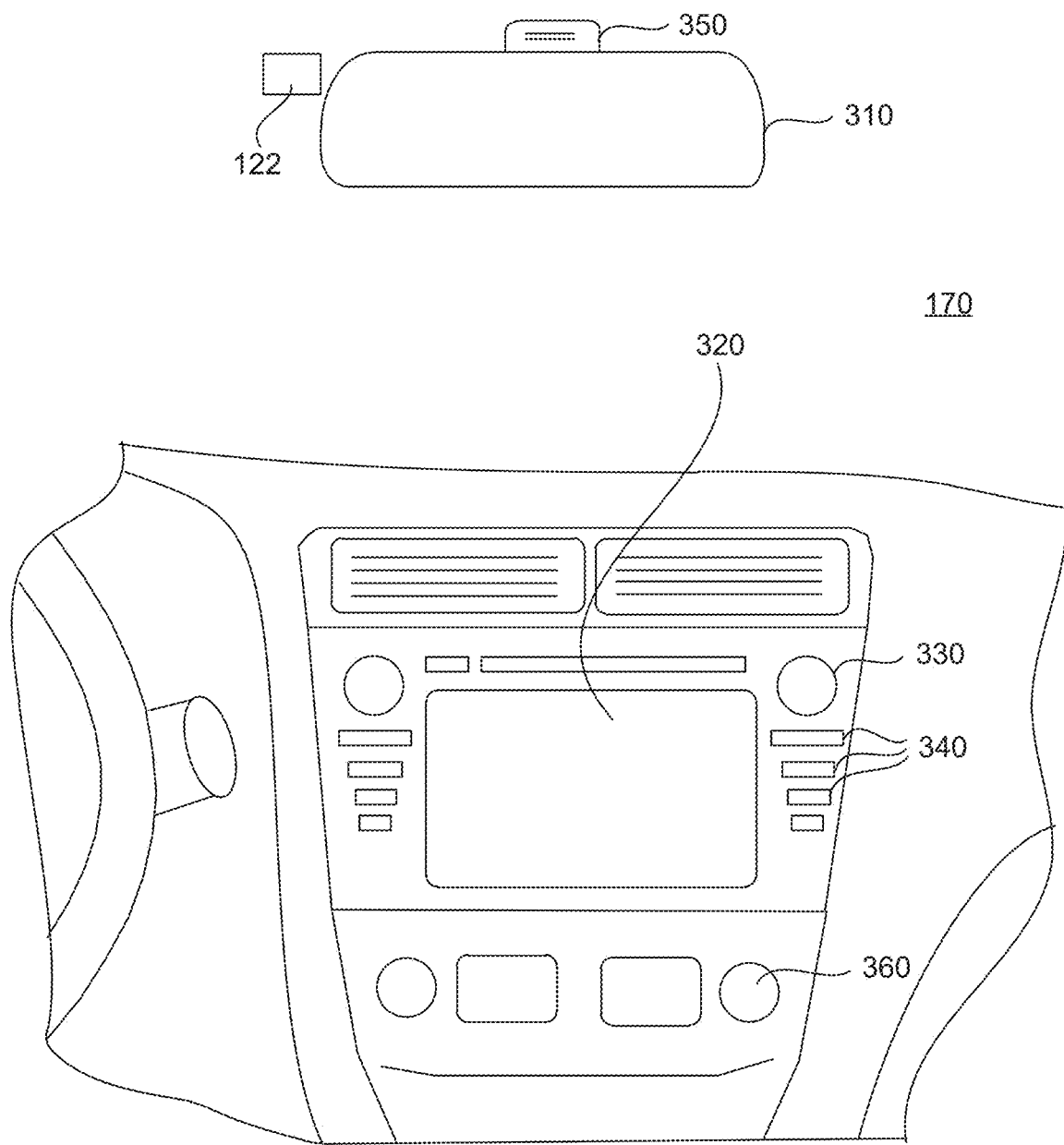
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
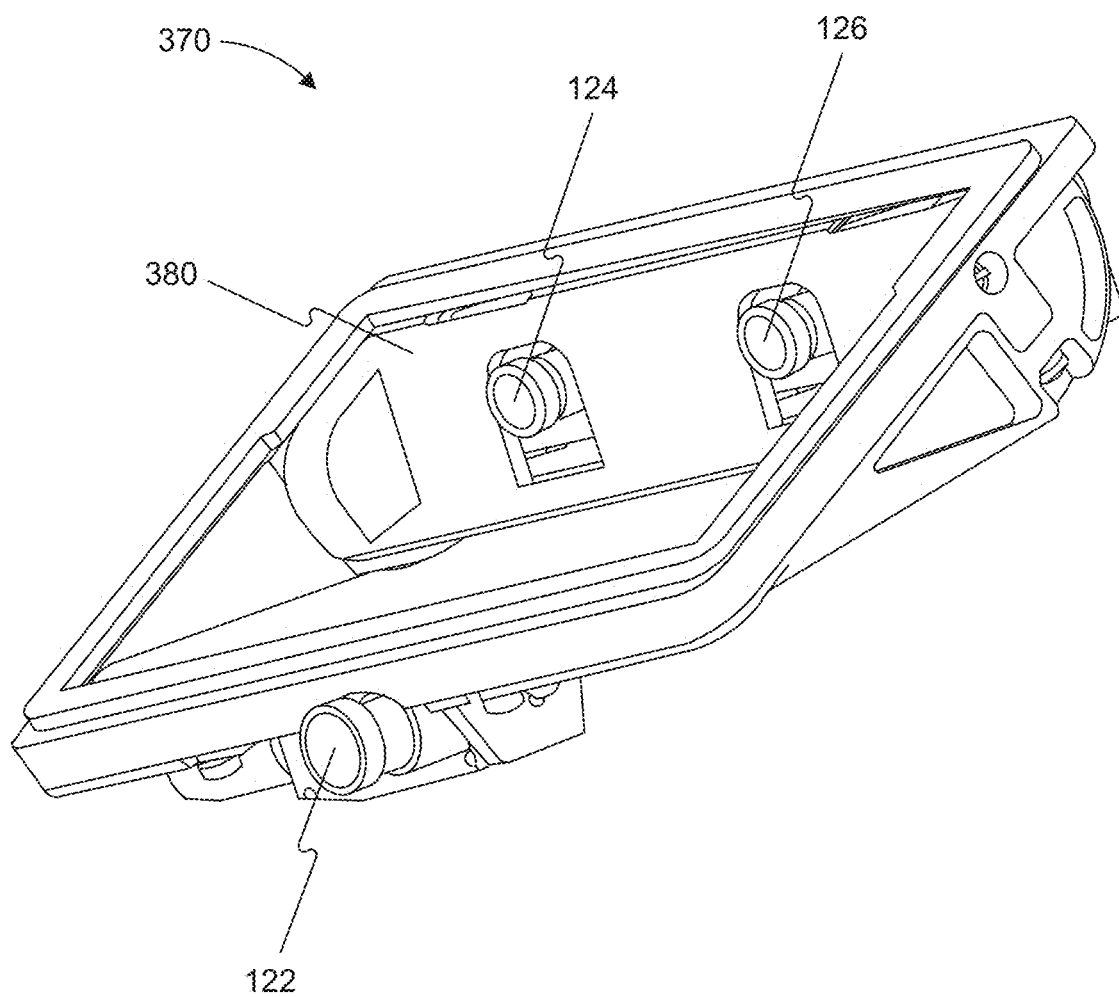
FIG. 3B is an illustration of an example of a camera mount that is configured to be positioned behind a rearview mirror and against a vehicle windshield consistent with the disclosed embodiments.
Figure 3C:
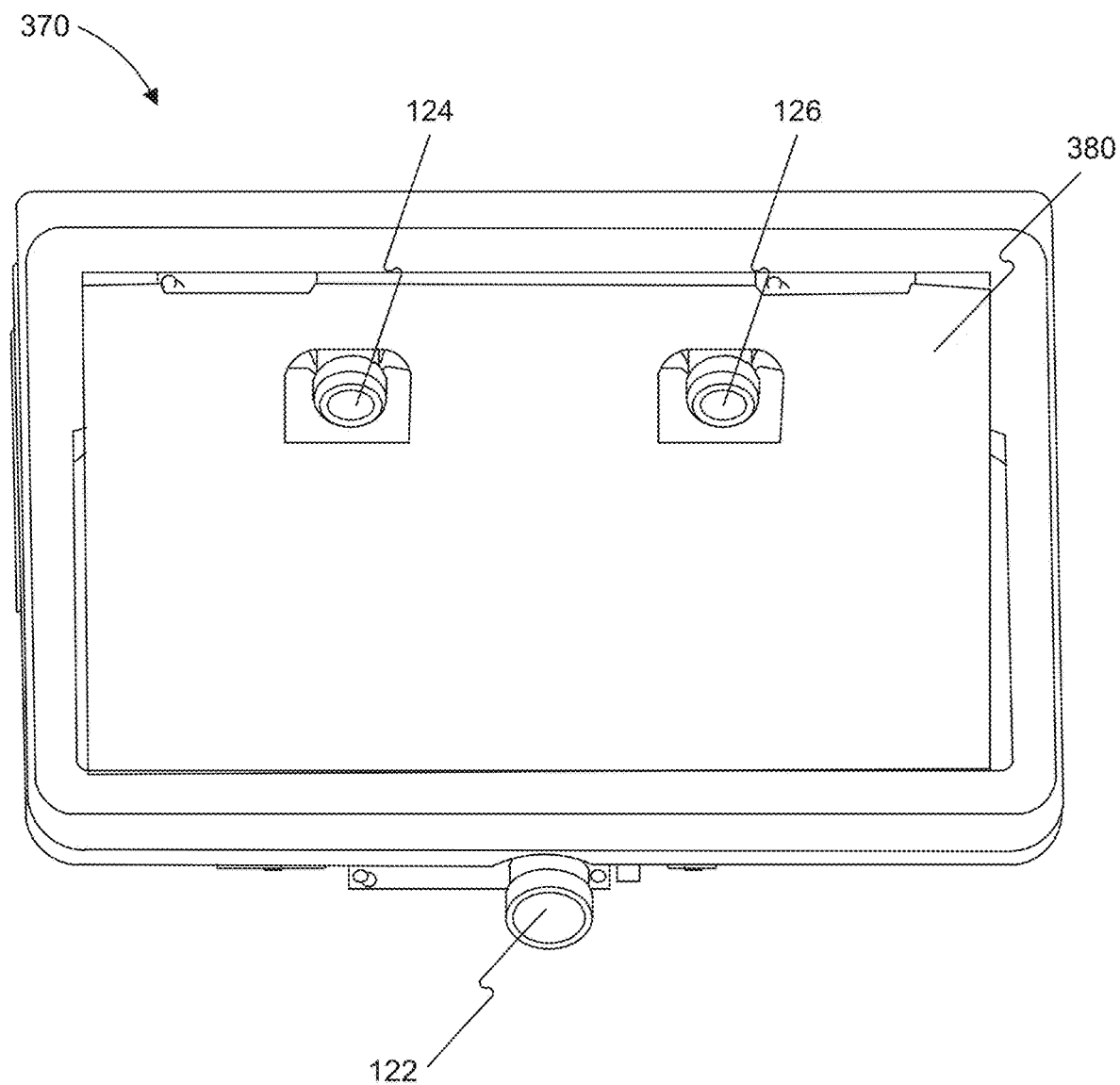
FIG. 3C is an illustration of the camera mount shown in FIG. 3B from a different perspective consistent with the disclosed embodiments.
Figure 3D:
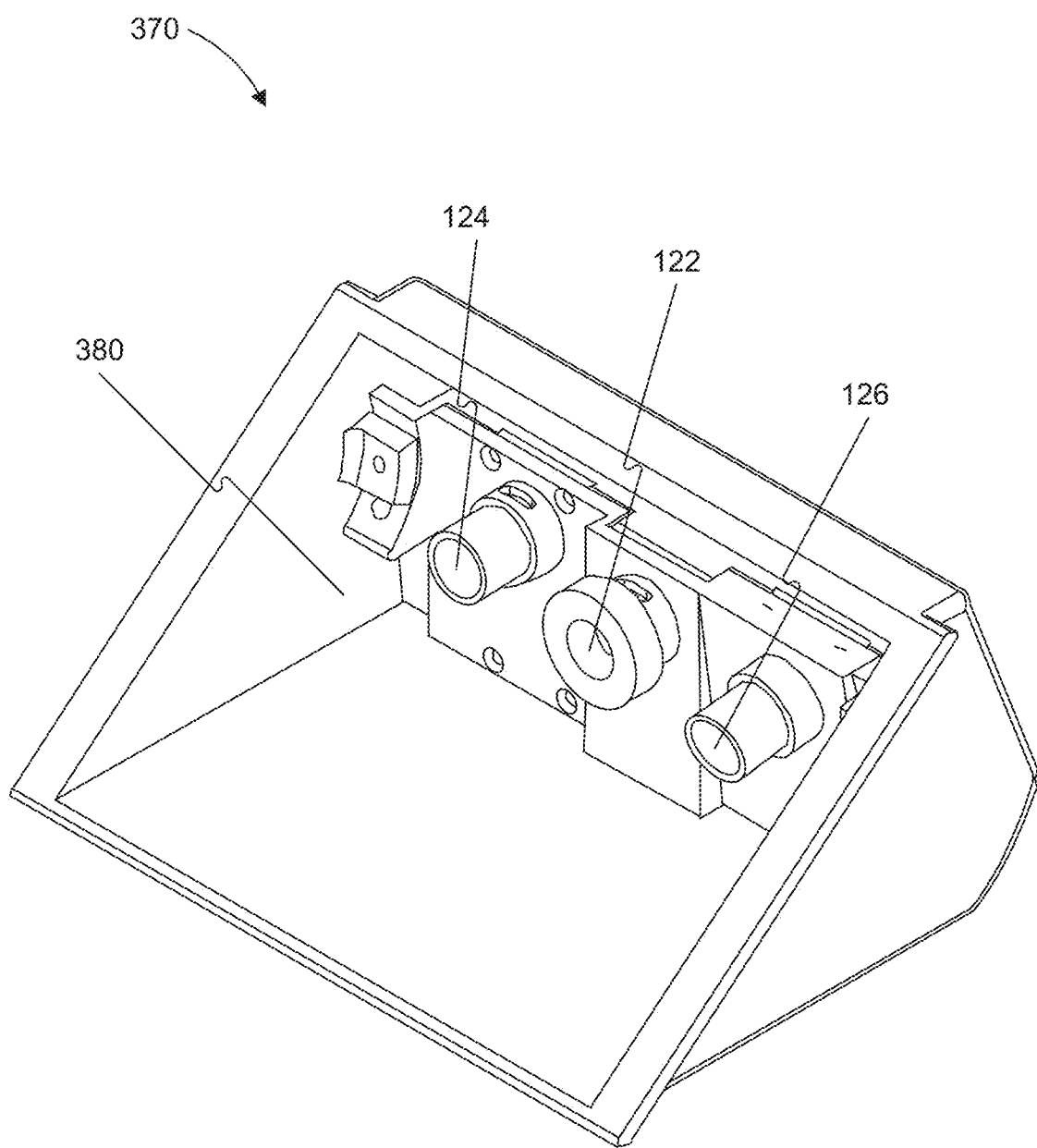
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
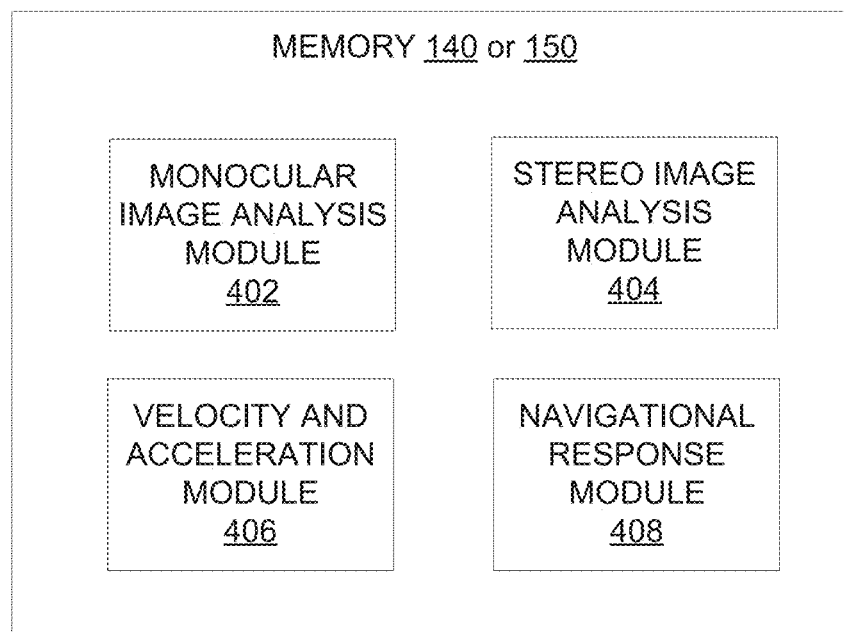
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
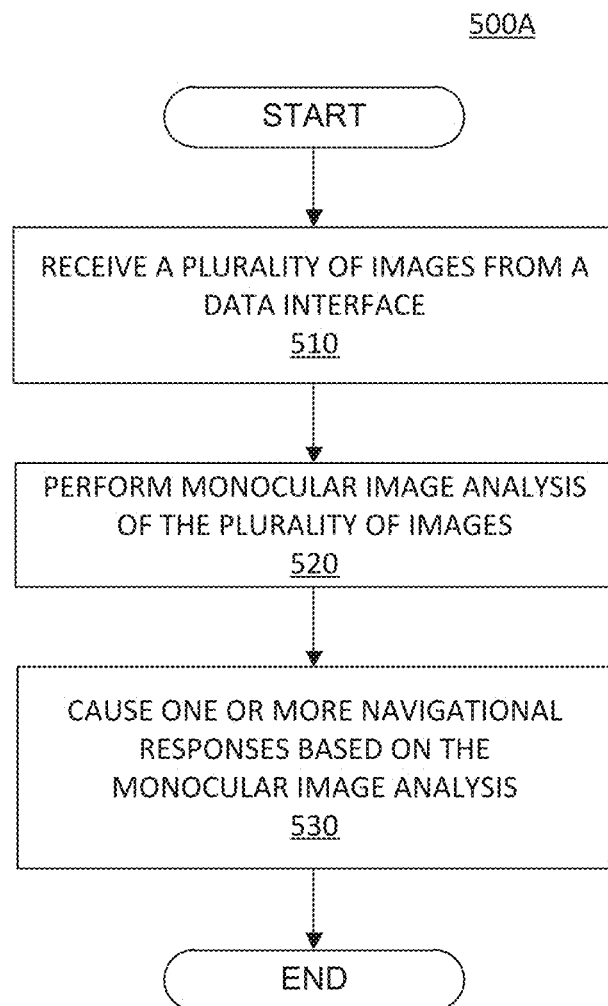
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
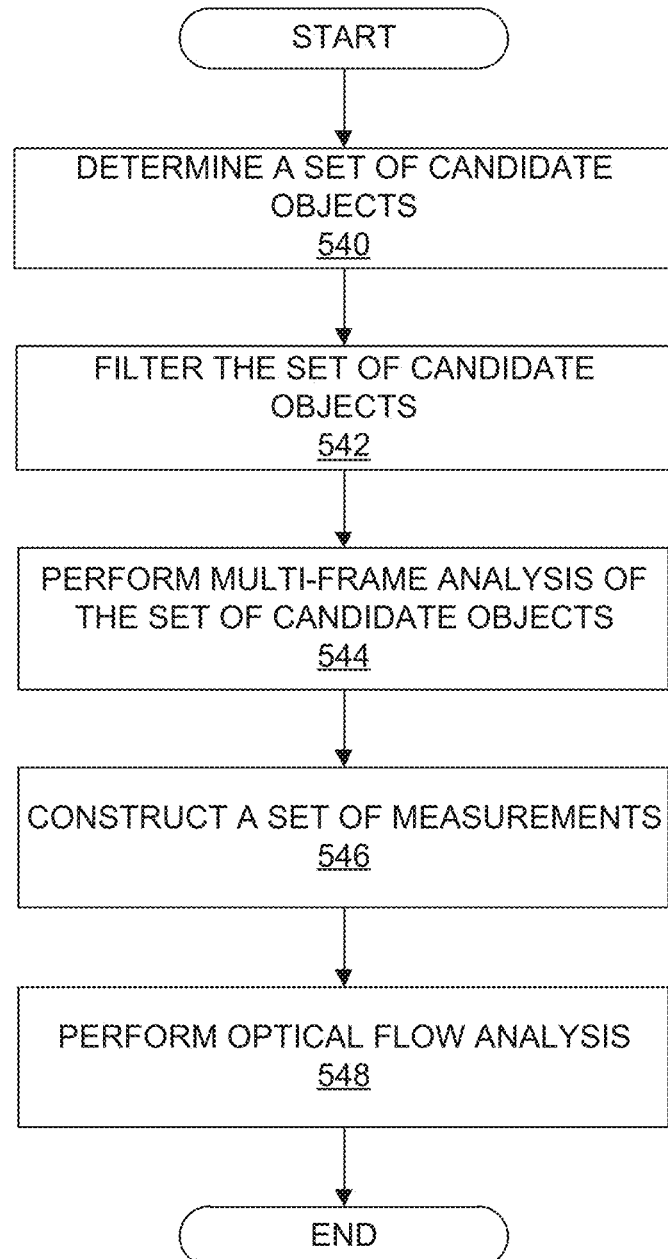
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
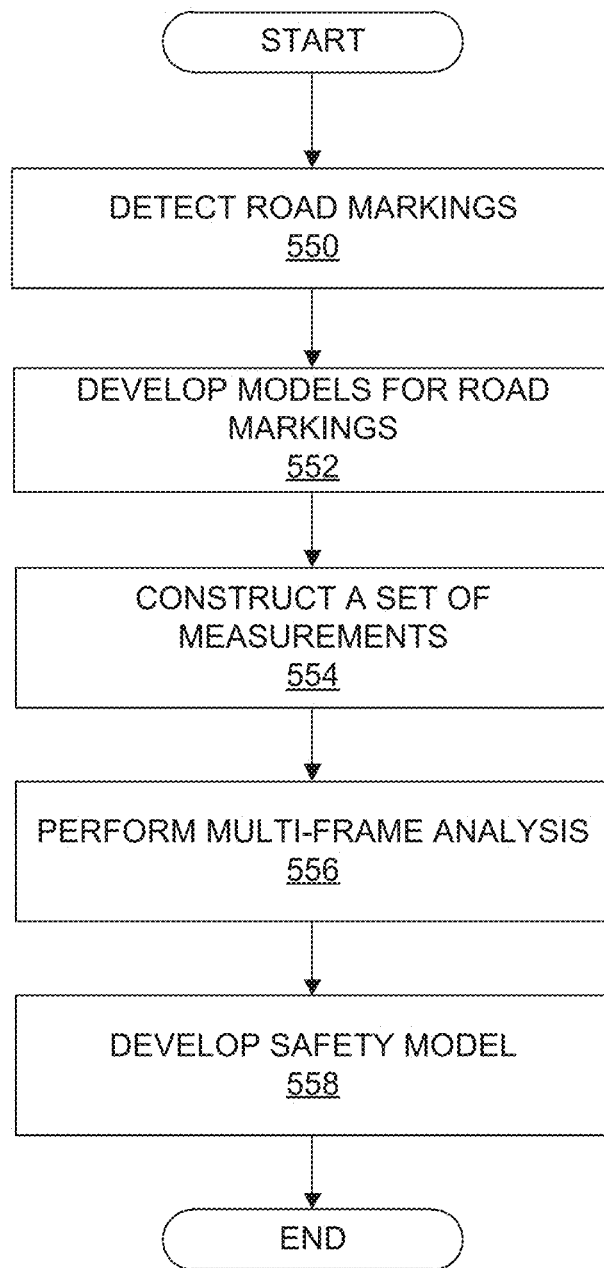
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
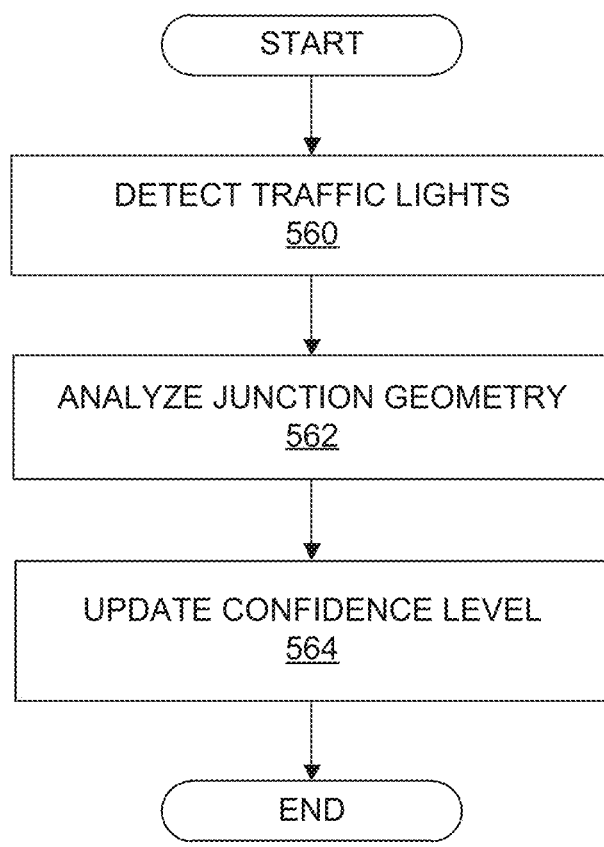
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
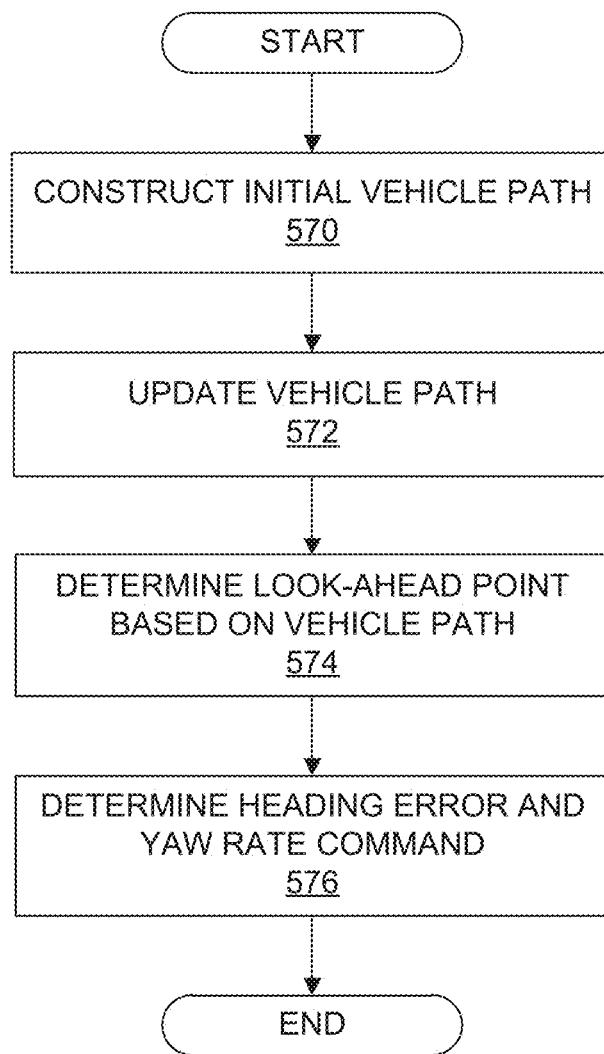
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
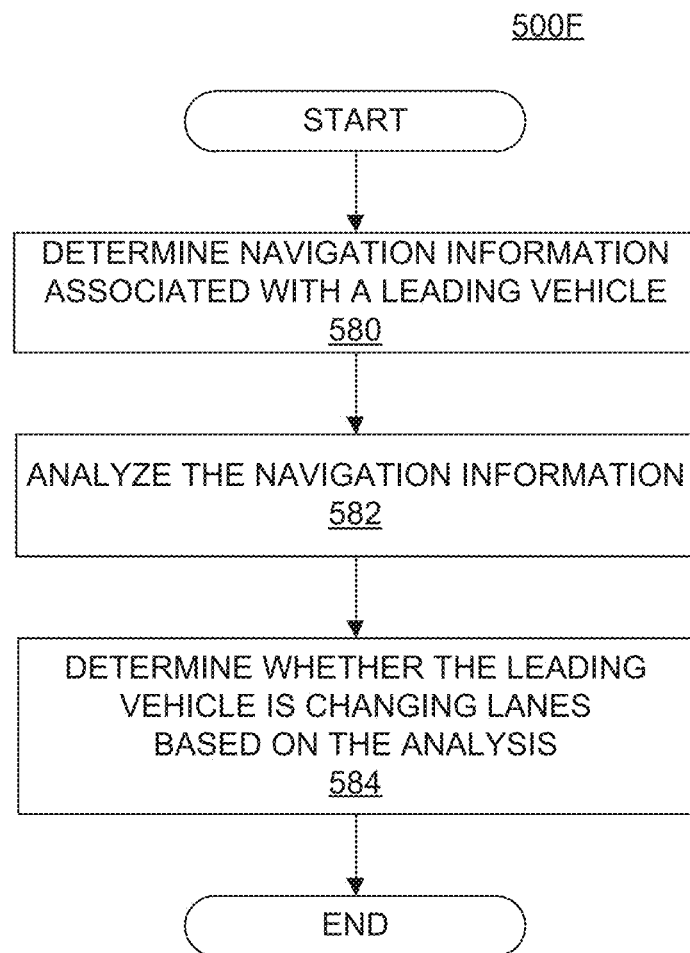
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
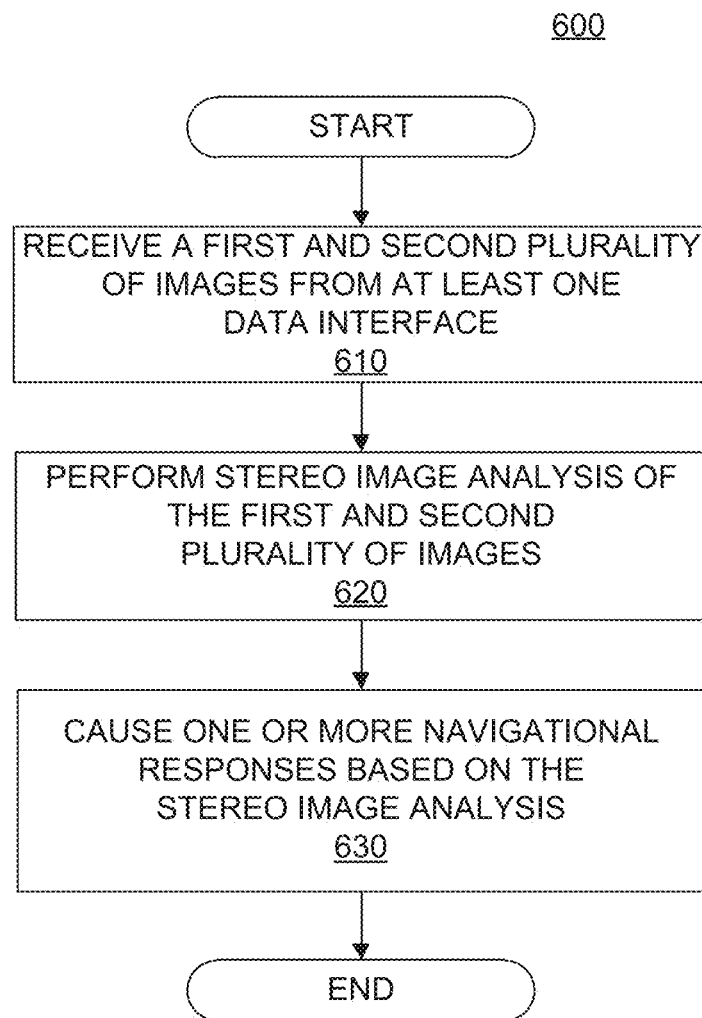
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
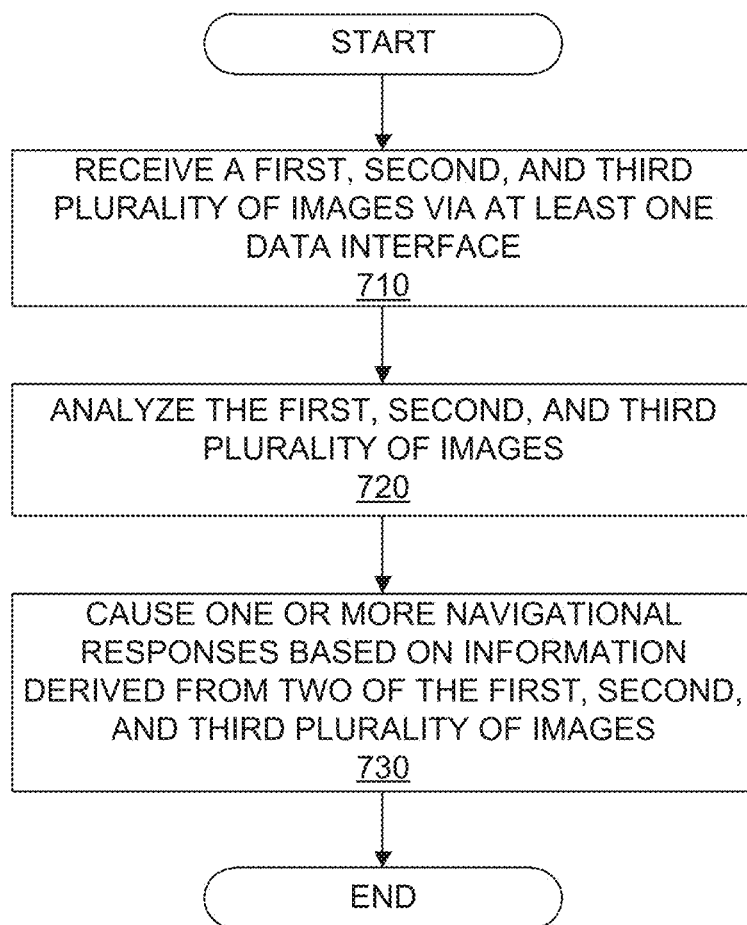
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8:
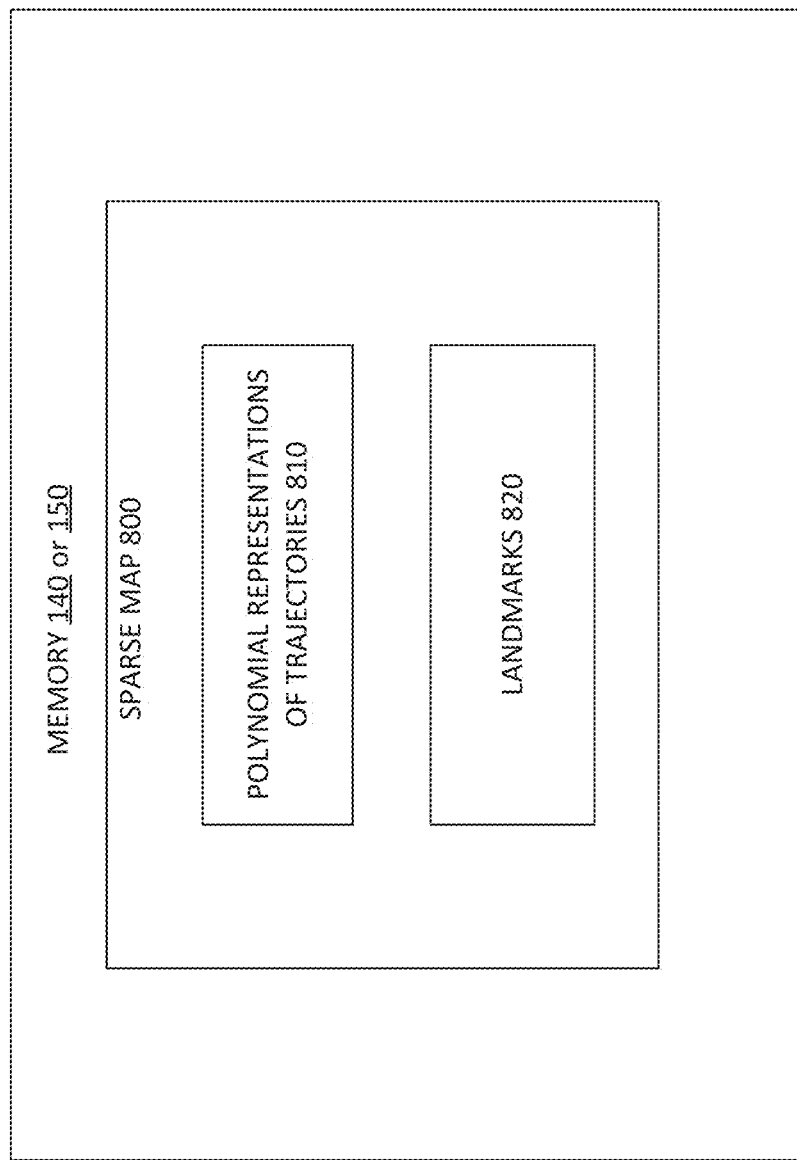
FIG. 8 shows a sparse map for providing autonomous vehicle navigation, consistent with the disclosed embodiments.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps that may be used in navigating a vehicle. Such sub-maps may be referred to as local maps, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of during navigation by dead reckoning may be minimized.

Figure 9A:
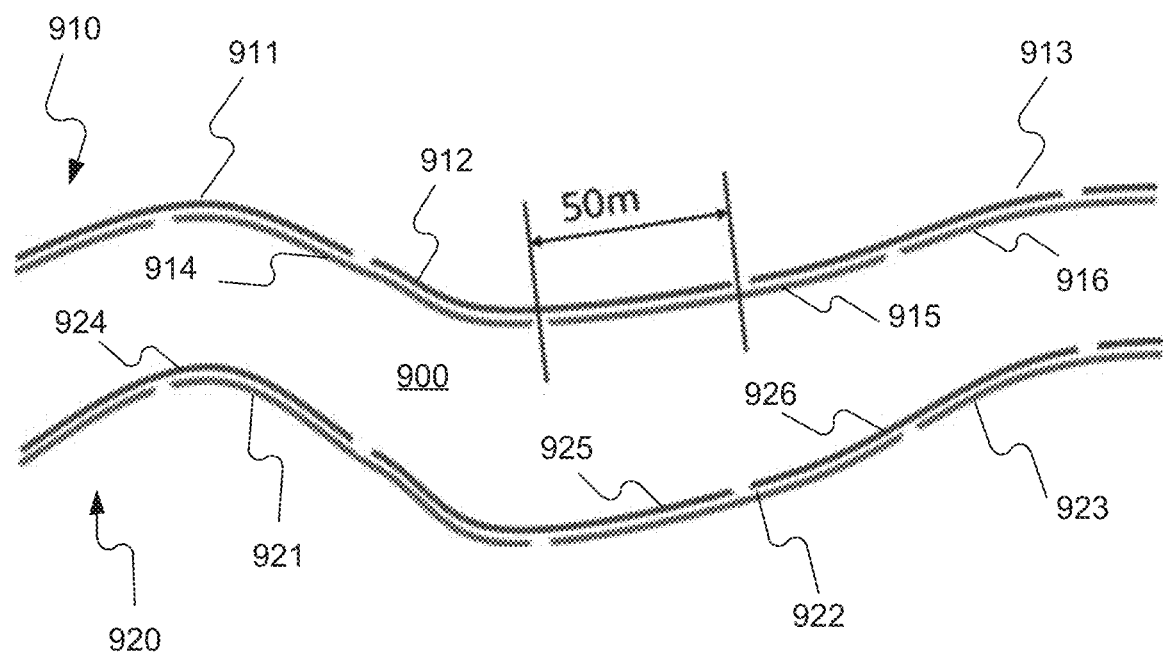
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
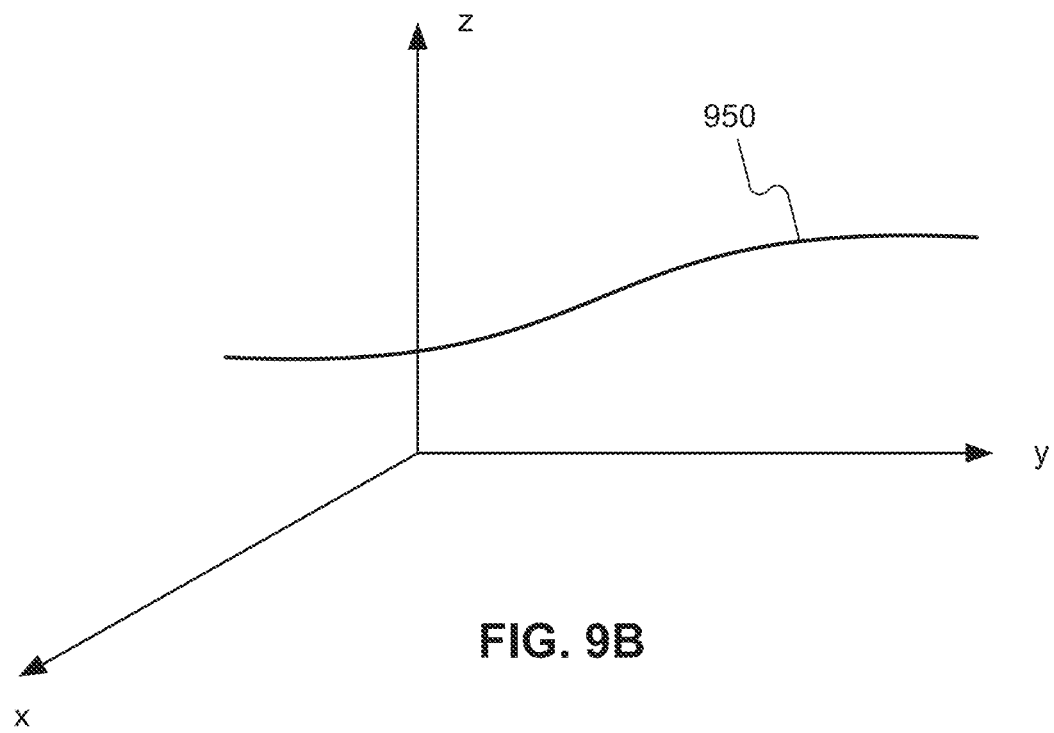
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
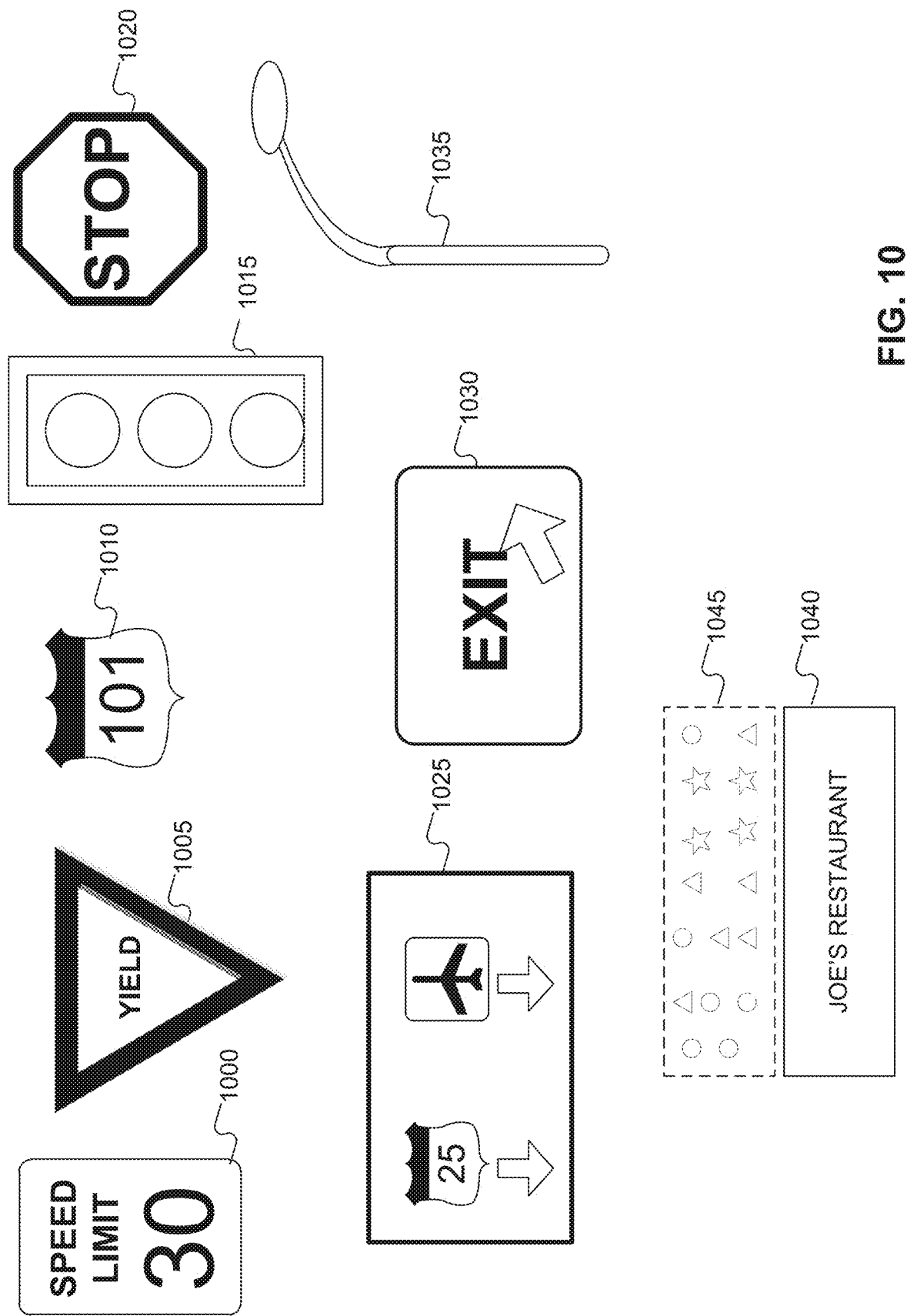
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type—what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 800 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature (e.g., condensed image signature 1045) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
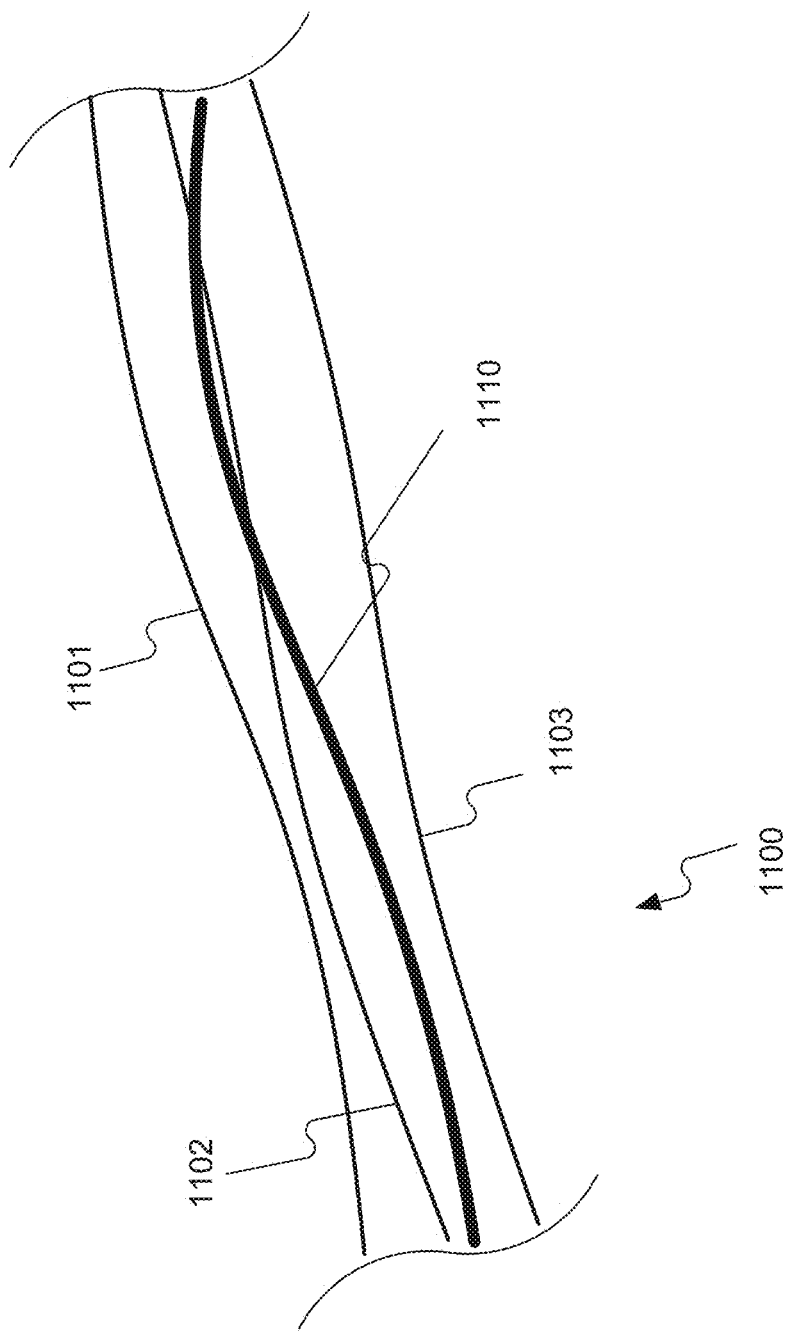
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

Figure 11B:
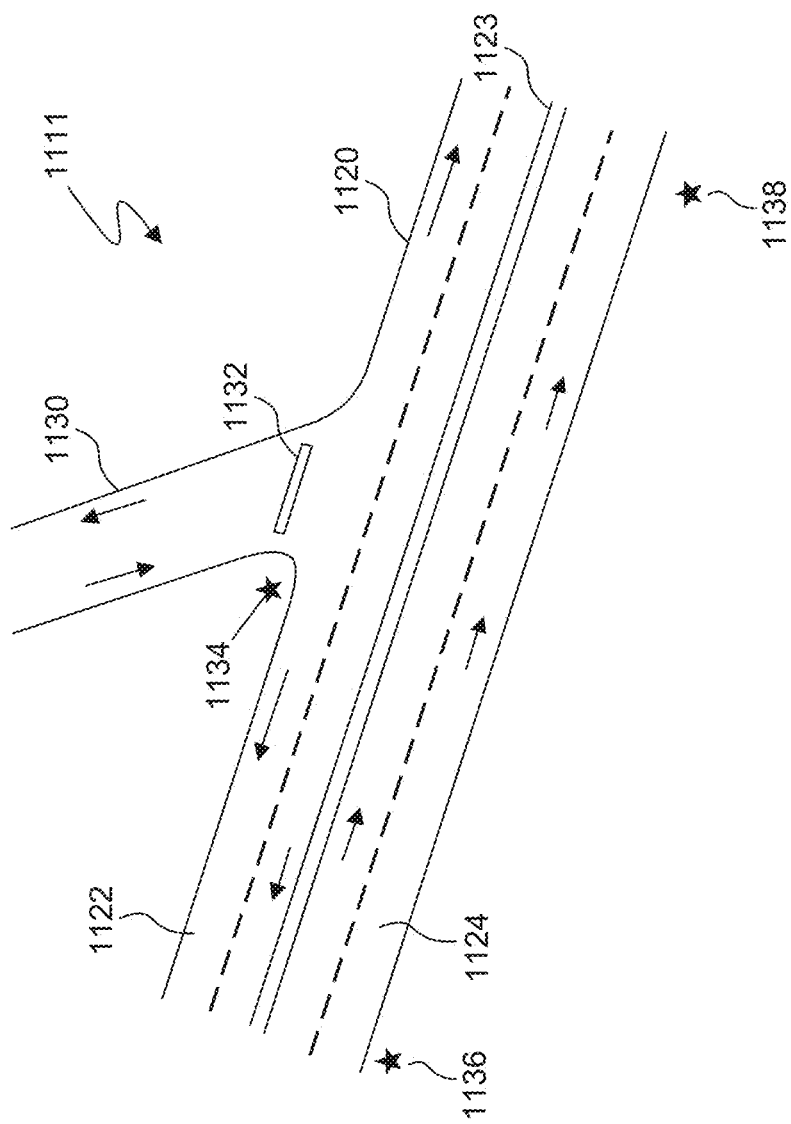
FIGS. 11B and 11C show target trajectories along a multi-lane road consistent with disclosed embodiments.
Figure 11C:
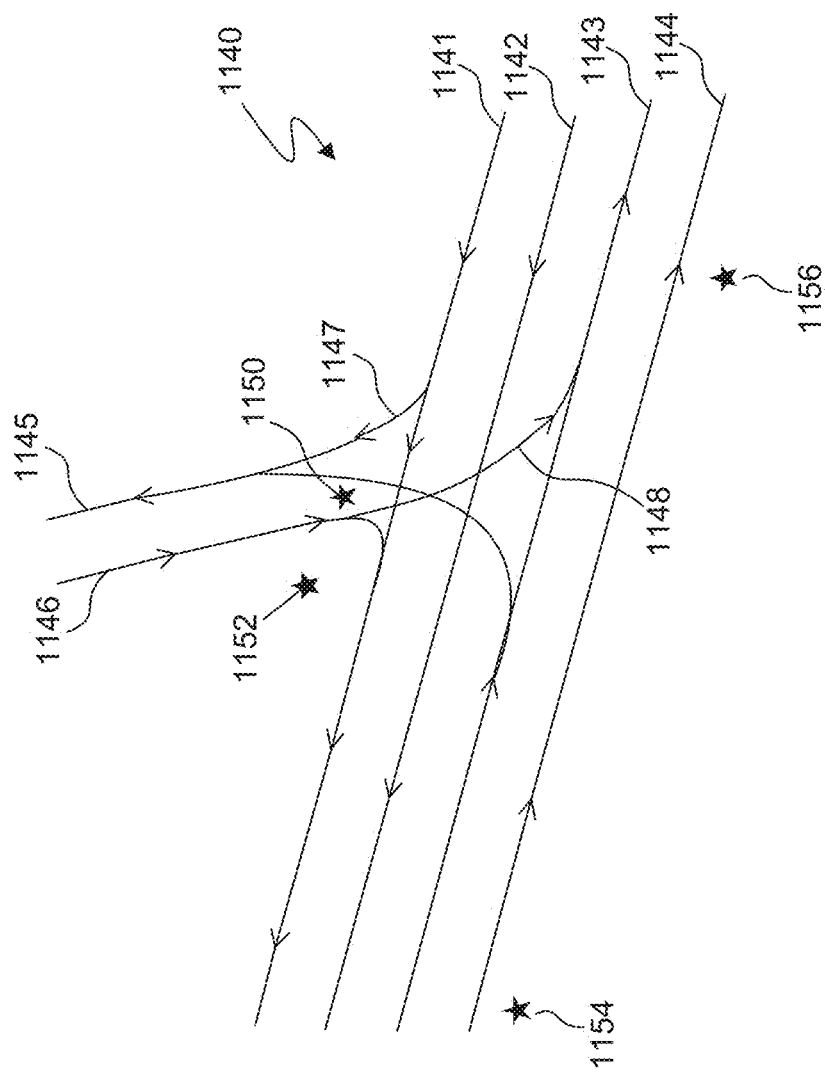

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
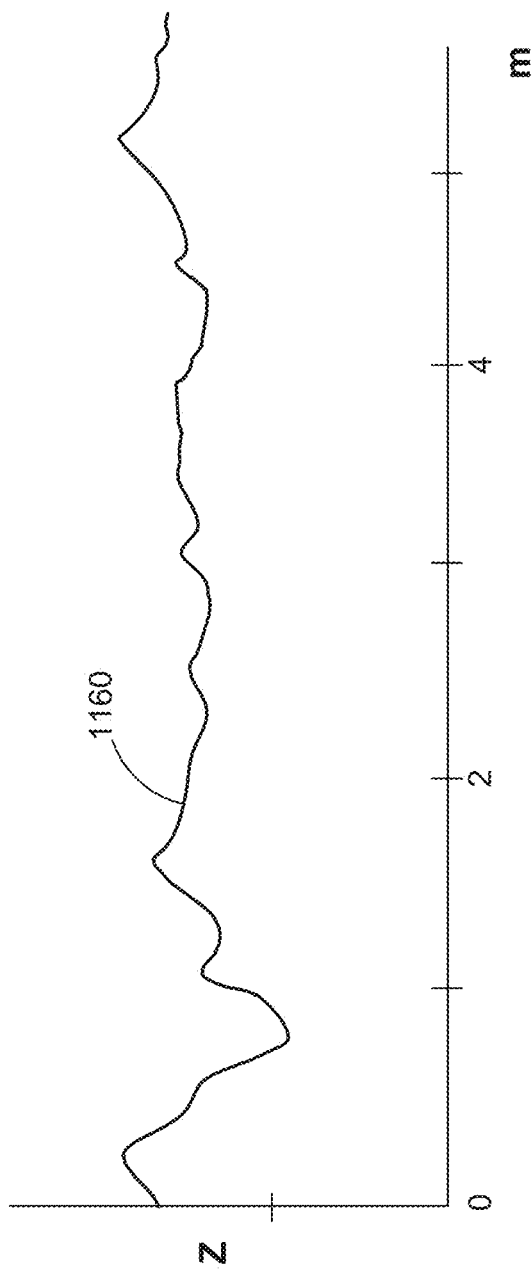
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

In some embodiments, the disclosed systems and methods may generate a sparse map for autonomous vehicle navigation. For example, disclosed systems and methods may use crowdsourced data for generation of a sparse that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral potion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
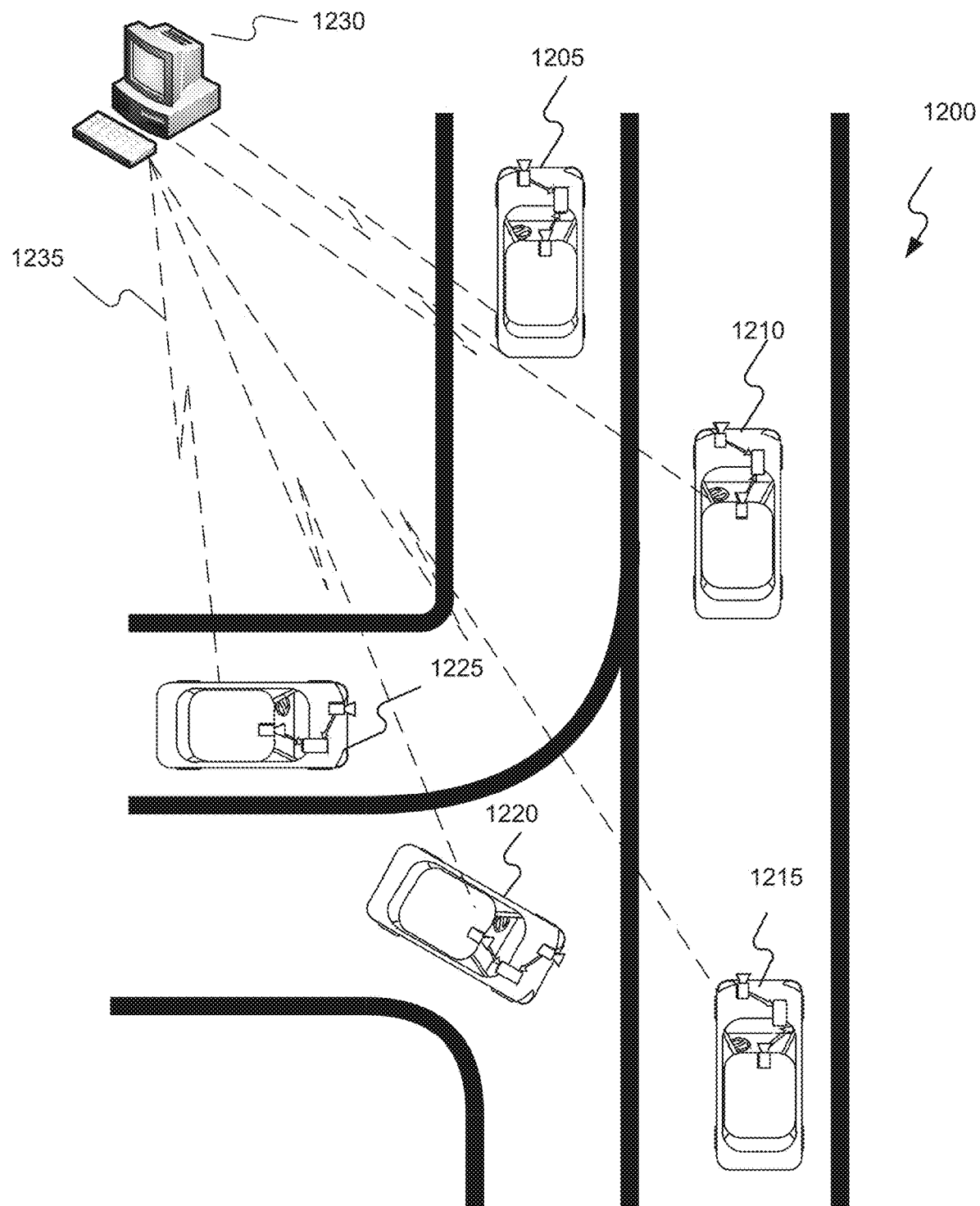
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta/\omega^2+f*\Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
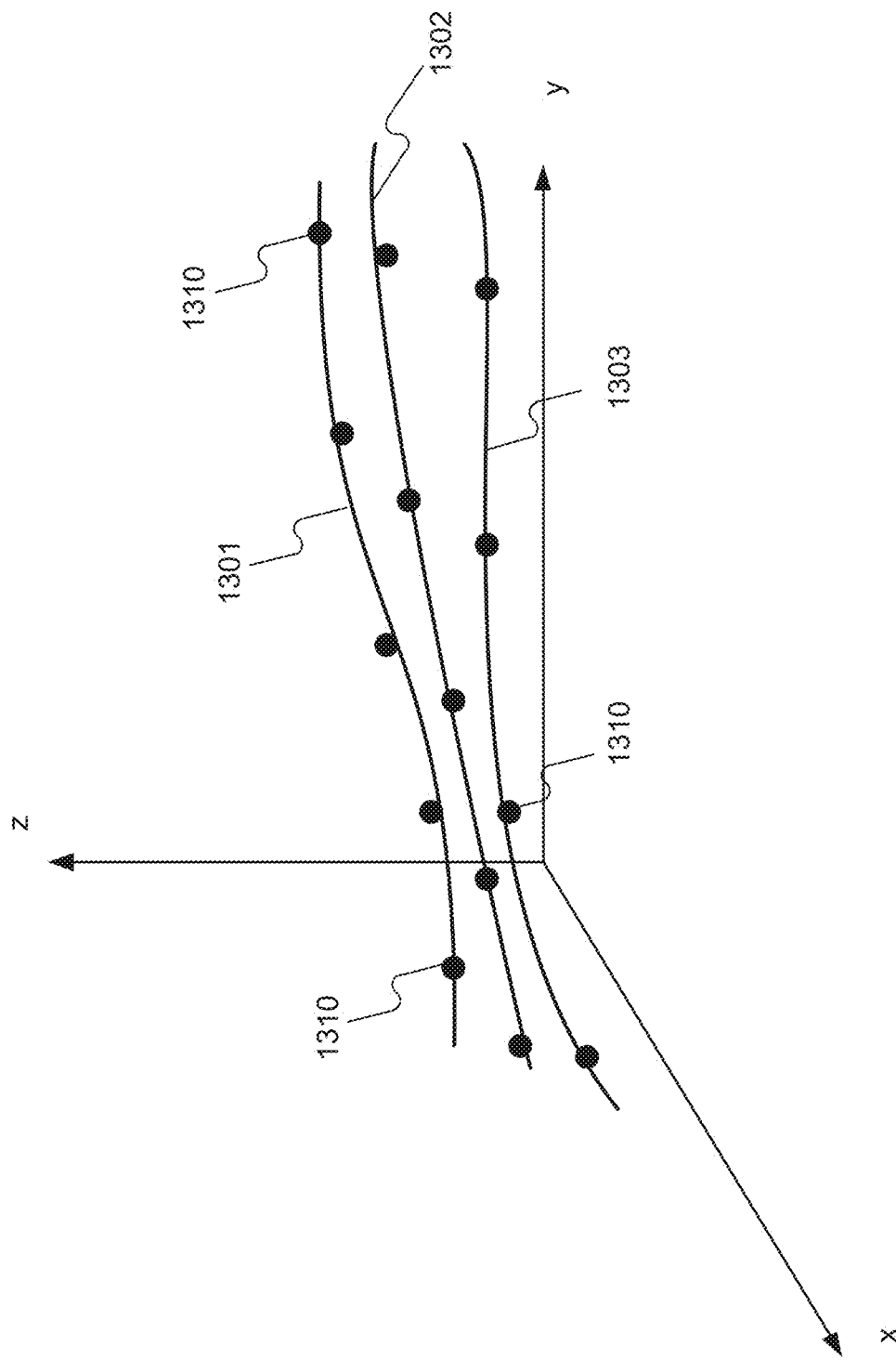
FIG. 13 illustrates an example autonomous vehicle road navigation model represented by a plurality of three-dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
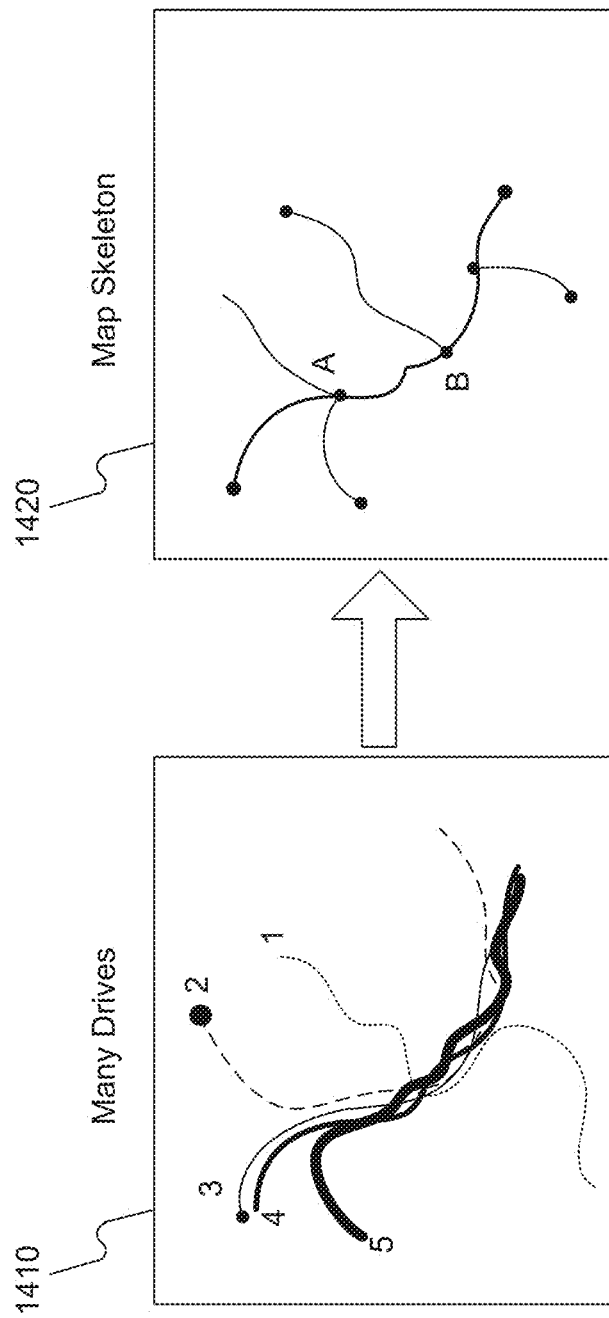
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
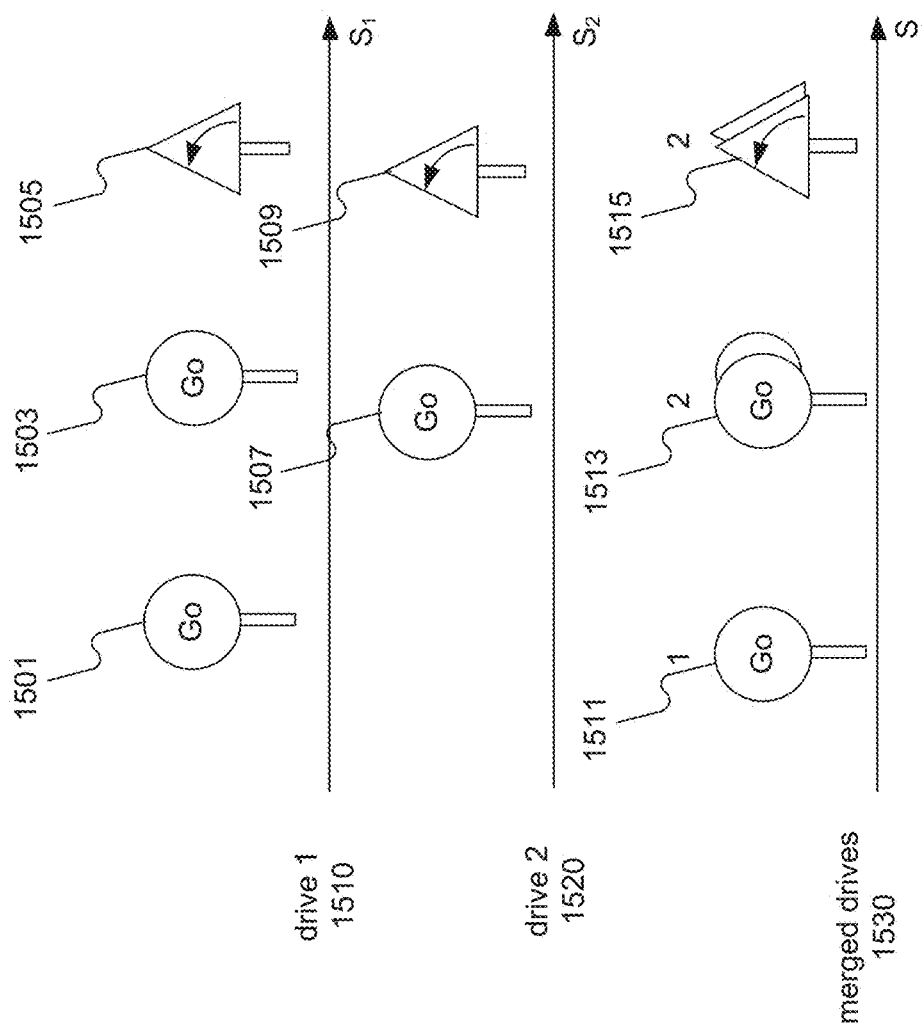
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
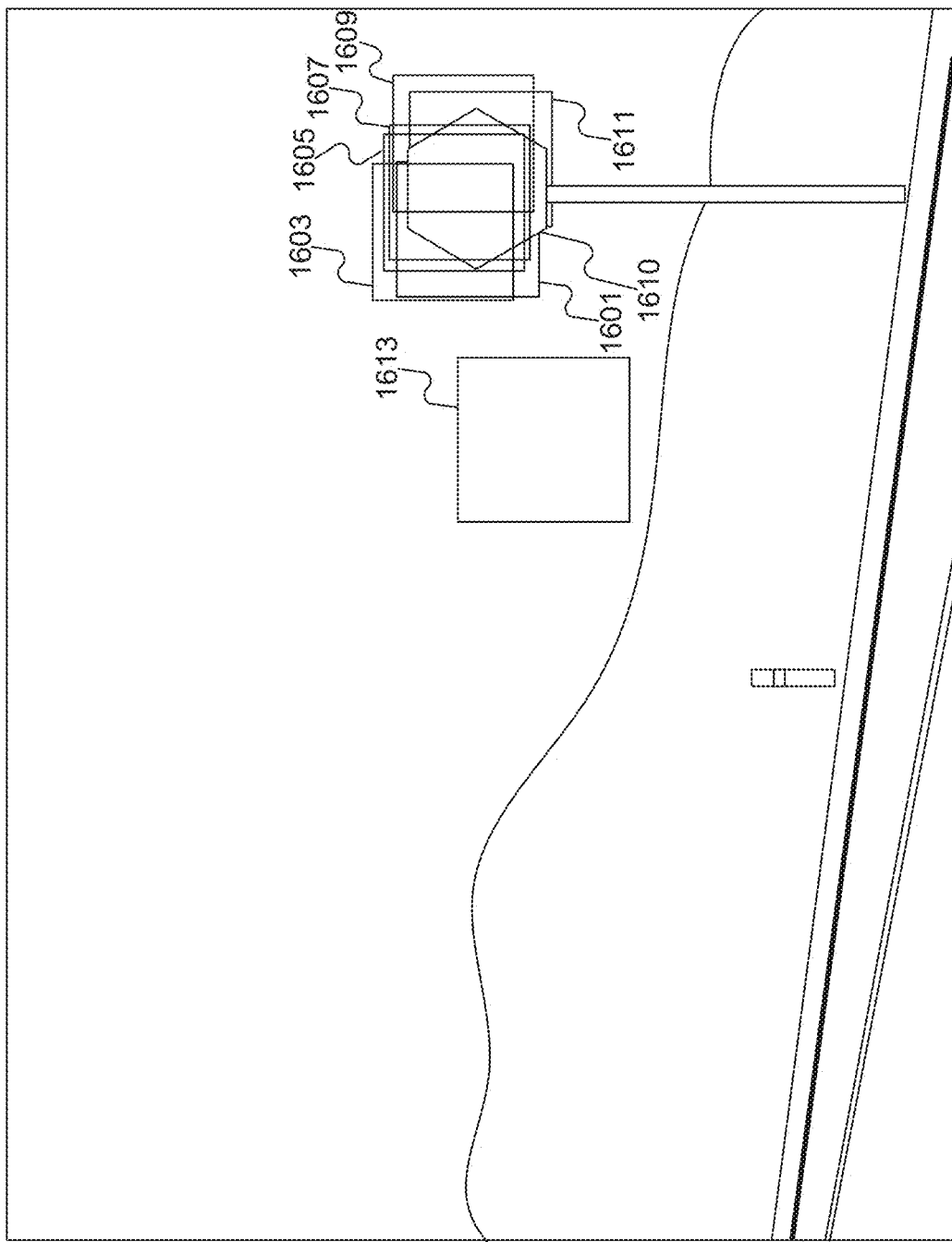
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
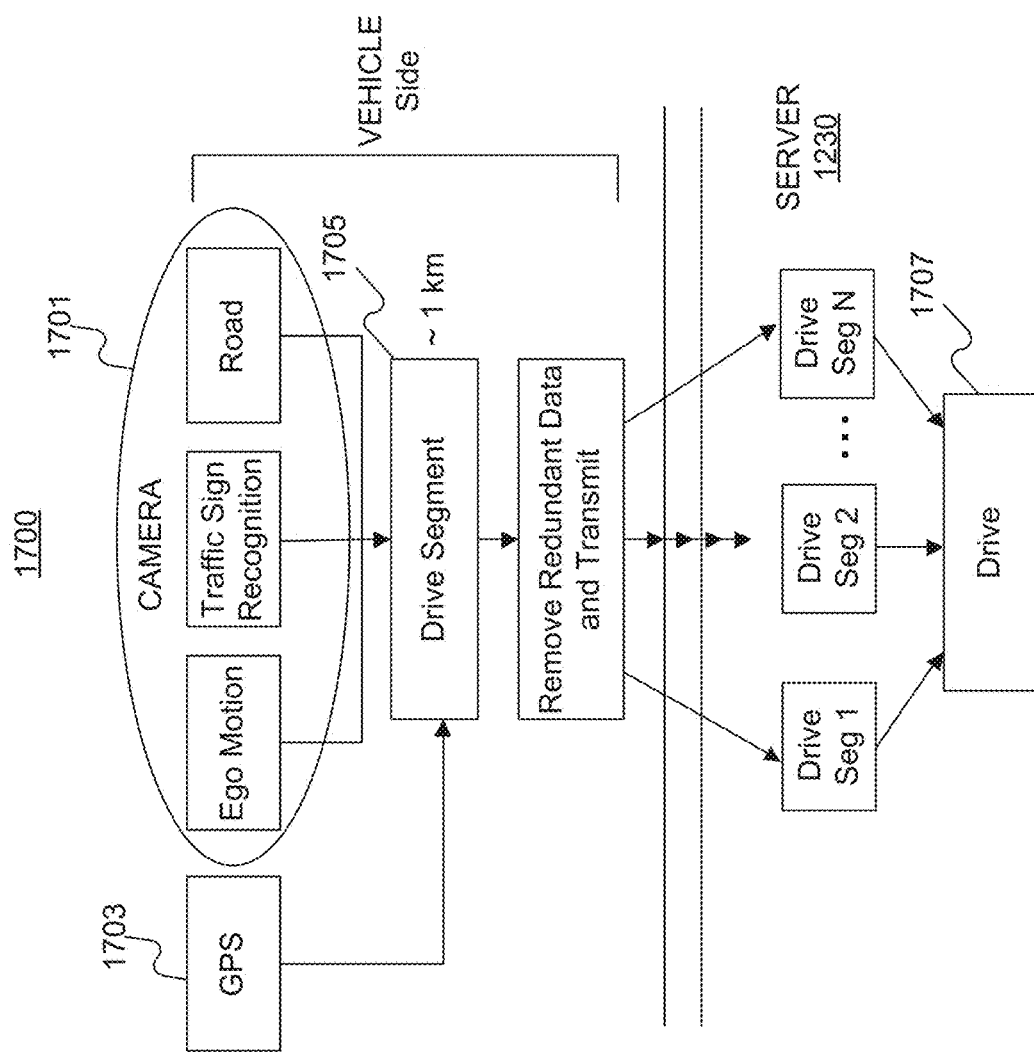
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
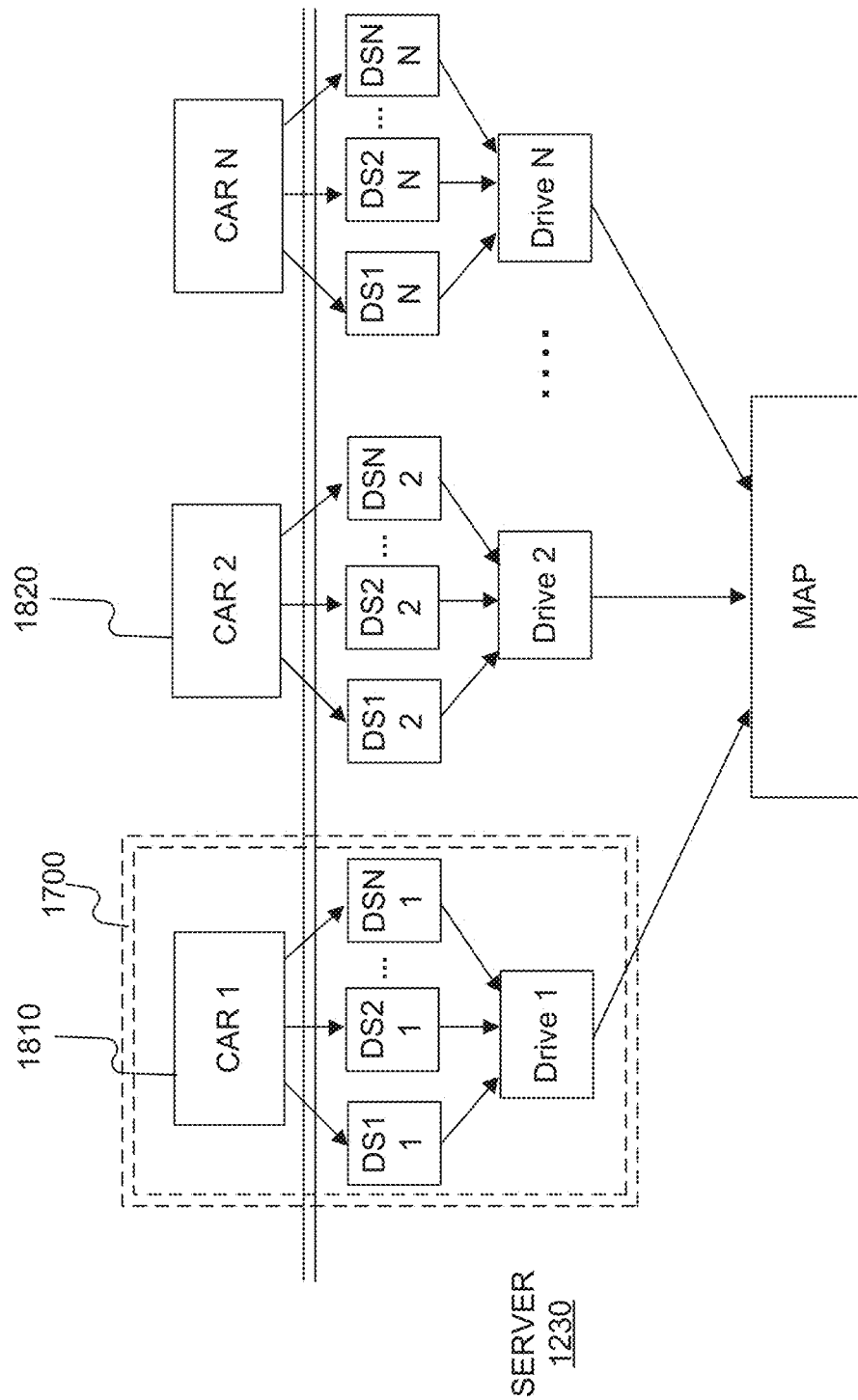
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
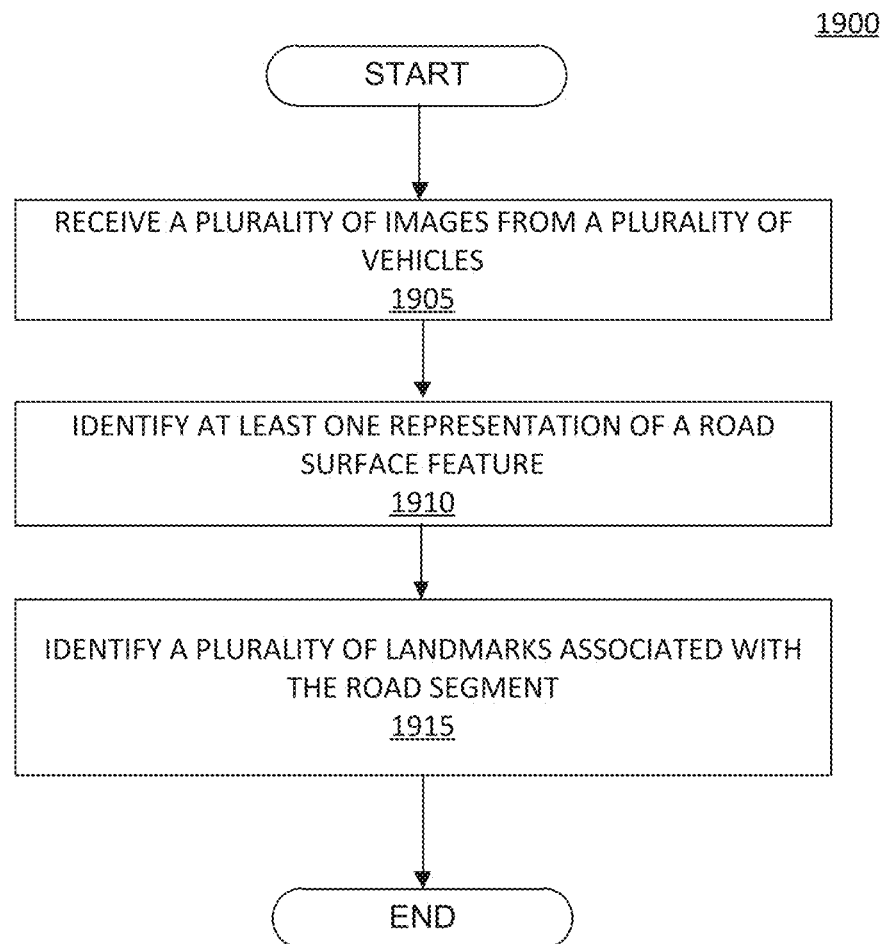
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowd-sourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
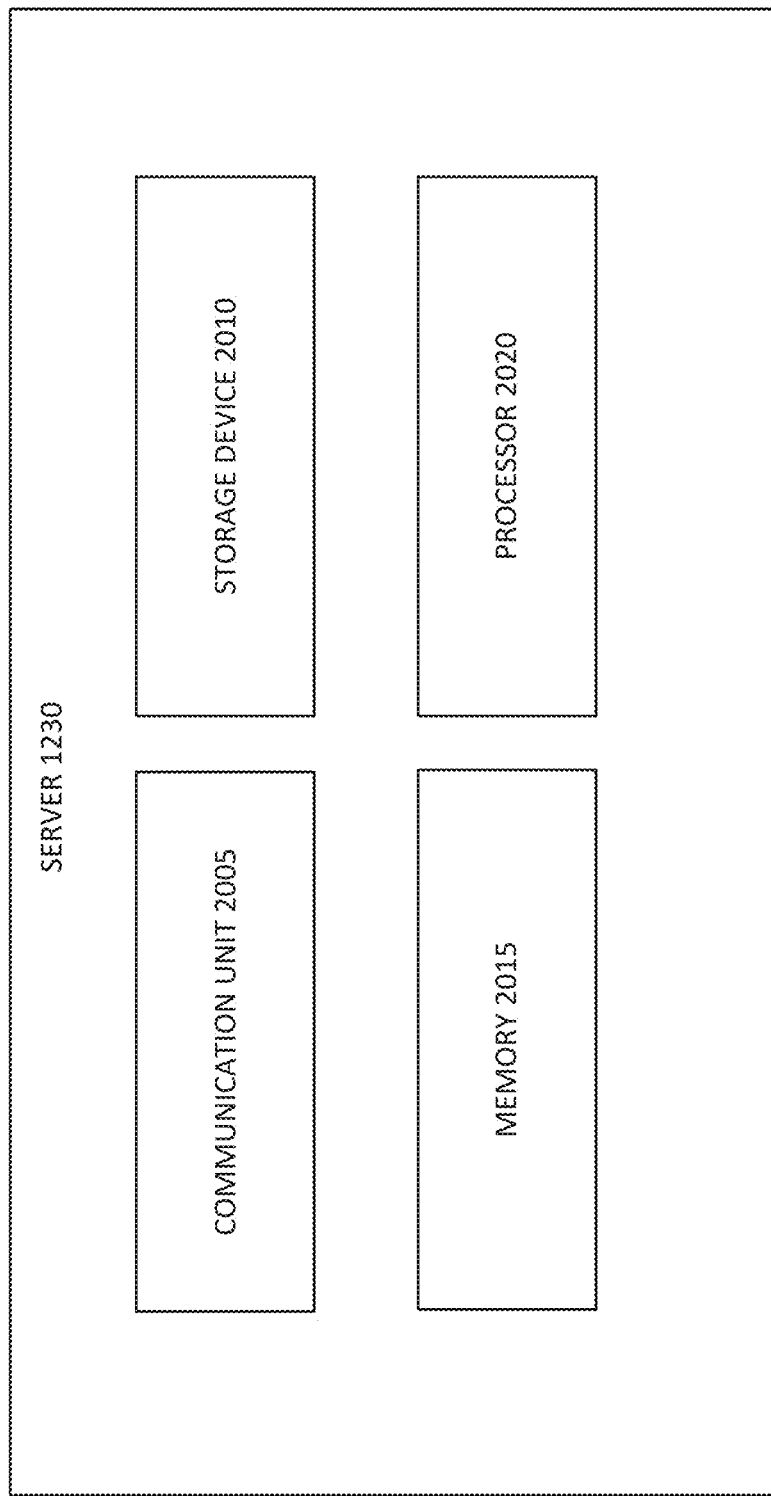
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
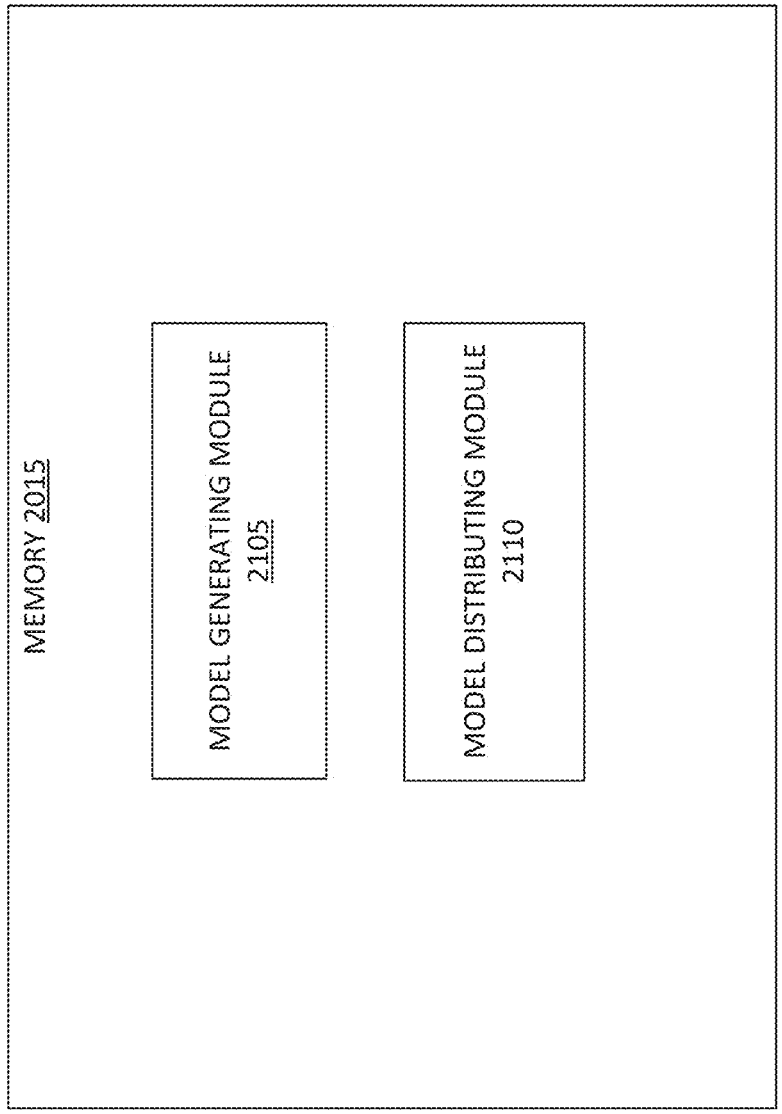
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning. Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, ..., Cn), server 1230 may find a rigid transformation that maps Ci to C0, where i=1, 2, ..., n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
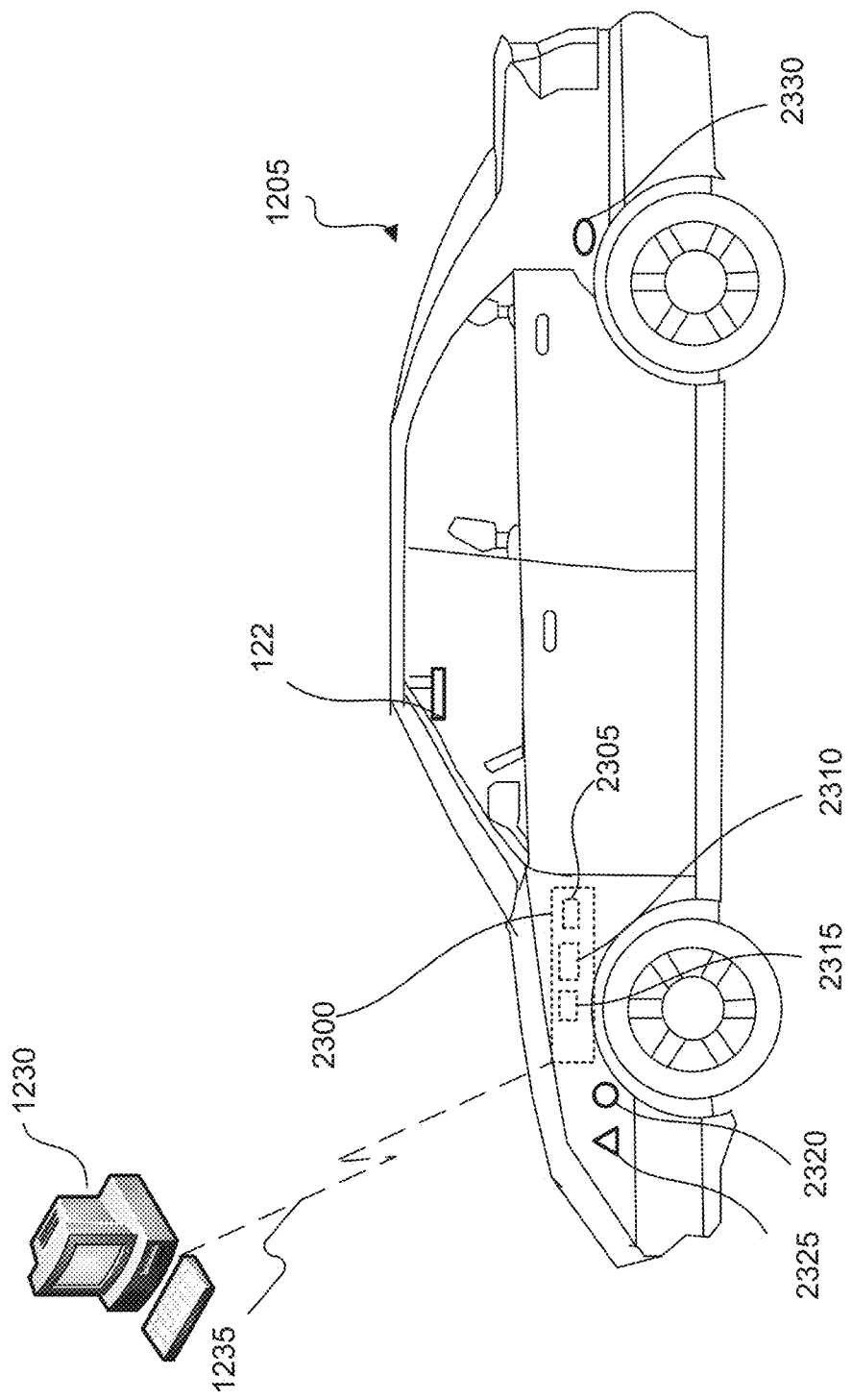
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Mapping Lane Marks and Navigation Based on Mapped Lane Marks

As previously discussed, the autonomous vehicle road navigation model and/or sparse map 800 may include a plurality of mapped lane marks associated with a road segment. As discussed in greater detail below, these mapped lane marks may be used when the autonomous vehicle navigates. For example, in some embodiments, the mapped lane marks may be used to determine a lateral position and/or orientation relative to a planned trajectory. With this position information, the autonomous vehicle may be able to adjust a heading direction to match a direction of a target trajectory at the determined position.

Vehicle 200 may be configured to detect lane marks in a given road segment. The road segment may include any markings on a road for guiding vehicle traffic on a roadway. For example, the lane marks may be continuous or dashed lines demarking the edge of a lane of travel. The lane marks may also include double lines, such as a double continuous lines, double dashed lines or a combination of continuous and dashed lines indicating, for example, whether passing is permitted in an adjacent lane. The lane marks may also include freeway entrance and exit markings indicating, for example, a deceleration lane for an exit ramp or dotted lines indicating that a lane is turn-only or that the lane is ending. The markings may further indicate a work zone, a temporary lane shift, a path of travel through an intersection, a median, a special purpose lane (e.g., a bike lane, HOV lane, etc.), or other miscellaneous markings (e.g., crosswalk, a speed hump, a railway crossing, a stop line, etc.).

Vehicle 200 may use cameras, such as image capture devices 122 and 124 included in image acquisition unit 120, to capture images of the surrounding lane marks. Vehicle 200 may analyze the images to detect point locations associated with the lane marks based on features identified within one or more of the captured images. These point locations may be uploaded to a server to represent the lane marks in sparse map 800. Depending on the position and field of view of the camera, lane marks may be detected for both sides of the vehicle simultaneously from a single image. In other embodiments, different cameras may be used to capture images on multiple sides of the vehicle. Rather than uploading actual images of the lane marks, the marks may be stored in sparse map 800 as a spline or a series of points, thus reducing the size of sparse map 800 and/or the data that must be uploaded remotely by the vehicle.

Figure 24C:
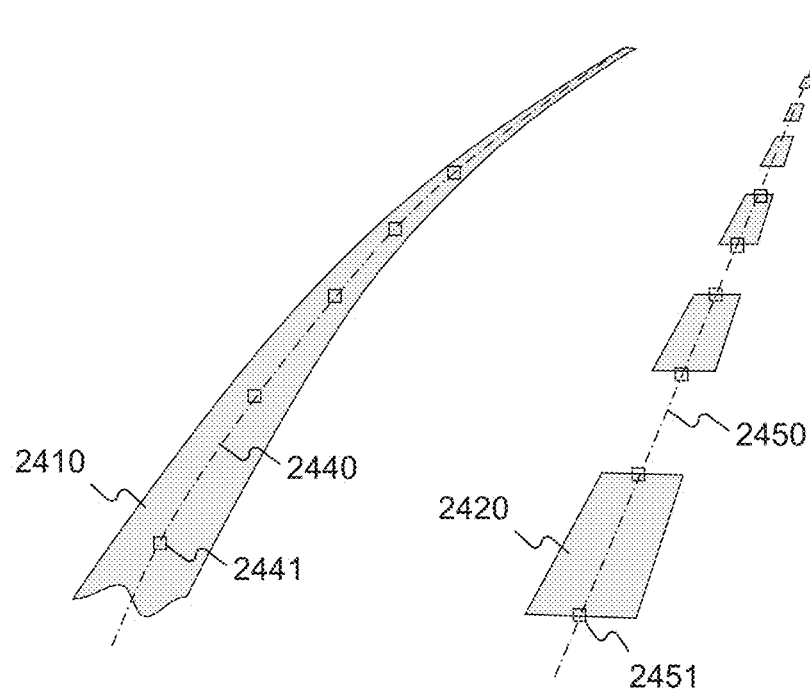

FIGS. 24A-24D illustrate exemplary point locations that may be detected by vehicle 200 to represent particular lane marks. Similar to the landmarks described above, vehicle 200 may use various image recognition algorithms or software to identify point locations within a captured image. For example, vehicle 200 may recognize a series of edge points, corner points or various other point locations associated with a particular lane mark. FIG. 24A shows a continuous lane mark 2410 that may be detected by vehicle 200. Lane mark 2410 may represent the outside edge of a roadway, represented by a continuous white line. As shown in FIG. 24A, vehicle 200 may be configured to detect a plurality of edge location points 2411 along the lane mark. Location points 2411 may be collected to represent the lane mark at any intervals sufficient to create a mapped lane mark in the sparse map. For example, the lane mark may be represented by one point per meter of the detected edge, one point per every five meters of the detected edge, or at other suitable spacings. In some embodiments, the spacing may be determined by other factors, rather than at set intervals such as, for example, based on points where vehicle 200 has a highest confidence ranking of the location of the detected points. Although FIG. 24A shows edge location points on an interior edge of lane mark 2410, points may be collected on the outside edge of the line or along both edges. Further, while a single line is shown in FIG. 24A, similar edge points may be detected for a double continuous line. For example, points 2411 may be detected along an edge of one or both of the continuous lines.

Vehicle 200 may also represent lane marks differently depending on the type or shape of lane mark. FIG. 24B shows an exemplary dashed lane mark 2420 that may be detected by vehicle 200. Rather than identifying edge points, as in FIG. 24A, vehicle may detect a series of corner points 2421 representing corners of the lane dashes to define the full boundary of the dash. While FIG. 24B shows each corner of a given dash marking being located, vehicle 200 may detect or upload a subset of the points shown in the figure. For example, vehicle 200 may detect the leading edge or leading corner of a given dash mark, or may detect the two corner points nearest the interior of the lane. Further, not every dash mark may be captured, for example, vehicle 200 may capture and/or record points representing a sample of dash marks (e.g., every other, every third, every fifth, etc.) or dash marks at a predefined spacing (e.g., every meter, every five meters, every 10 meters, etc.) Corner points may also be detected for similar lane marks, such as markings showing a lane is for an exit ramp, that a particular lane is ending, or other various lane marks that may have detectable corner points. Corner points may also be detected for lane marks consisting of double dashed lines or a combination of continuous and dashed lines.

In some embodiments, the points uploaded to the server to generate the mapped lane marks may represent other points besides the detected edge points or corner points. FIG. 24C illustrates a series of points that may represent a centerline of a given lane mark. For example, continuous lane 2410 may be represented by centerline points 2441 along a centerline 2440 of the lane mark. In some embodiments, vehicle 200 may be configured to detect these center points using various image recognition techniques, such as convolutional neural networks (CNN), scale-invariant feature transform (SIFT), histogram of oriented gradients (HOG) features, or other techniques. Alternatively, vehicle 200 may detect other points, such as edge points 2411 shown in FIG. 24A, and may calculate centerline points 2441, for example, by detecting points along each edge and determining a midpoint between the edge points. Similarly, dashed lane mark 2420 may be represented by centerline points 2451 along a centerline 2450 of the lane mark. The centerline points may be located at the edge of a dash, as shown in FIG. 24C, or at various other locations along the centerline. For example, each dash may be represented by a single point in the geometric center of the dash. The points may also be spaced at a predetermined interval along the centerline (e.g., every meter, 5 meters, 10 meters, etc.). The centerline points 2451 may be detected directly by vehicle 200, or may be calculated based on other detected reference points, such as corner points 2421, as shown in FIG. 24B. A centerline may also be used to represent other lane mark types, such as a double line, using similar techniques as above.

Figure 24D:
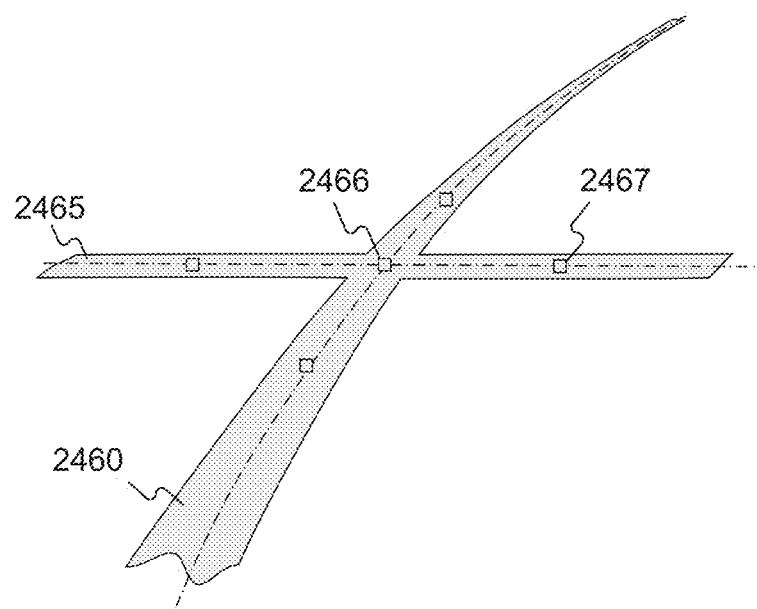

In some embodiments, vehicle 200 may identify points representing other features, such as a vertex between two intersecting lane marks. FIG. 24D shows exemplary points representing an intersection between two lane marks 2460 and 2465. Vehicle 200 may calculate a vertex point 2466 representing an intersection between the two lane marks. For example, one of lane marks 2460 or 2465 may represent a train crossing area or other crossing area in the road segment. While lane marks 2460 and 2465 are shown as crossing each other perpendicularly, various other configurations may be detected. For example, the lane marks 2460 and 2465 may cross at other angles, or one or both of the lane marks may terminate at the vertex point 2466. Similar techniques may also be applied for intersections between dashed or other lane mark types. In addition to vertex point 2466, various other points 2467 may also be detected, providing further information about the orientation of lane marks 2460 and 2465.

Vehicle 200 may associate real-world coordinates with each detected point of the lane mark. For example, location identifiers may be generated, including coordinate for each point, to upload to a server for mapping the lane mark. The location identifiers may further include other identifying information about the points, including whether the point represents a corner point, an edge point, center point, etc. Vehicle 200 may therefore be configured to determine a real-world position of each point based on analysis of the images. For example, vehicle 200 may detect other features in the image, such as the various landmarks described above, to locate the real-world position of the lane marks. This may involve determining the location of the lane marks in the image relative to the detected landmark or determining the position of the vehicle based on the detected landmark and then determining a distance from the vehicle (or target trajectory of the vehicle) to the lane mark. When a landmark is not available, the location of the lane mark points may be determined relative to a position of the vehicle determined based on dead reckoning. The real-world coordinates included in the location identifiers may be represented as absolute coordinates (e.g., latitude/longitude coordinates), or may be relative to other features, such as based on a longitudinal position along a target trajectory and a lateral distance from the target trajectory. The location identifiers may then be uploaded to a server for generation of the mapped lane marks in the navigation model (such as sparse map 800). In some embodiments, the server may construct a spline representing the lane marks of a road segment. Alternatively, vehicle 200 may generate the spline and upload it to the server to be recorded in the navigational model.

Figure 24E:
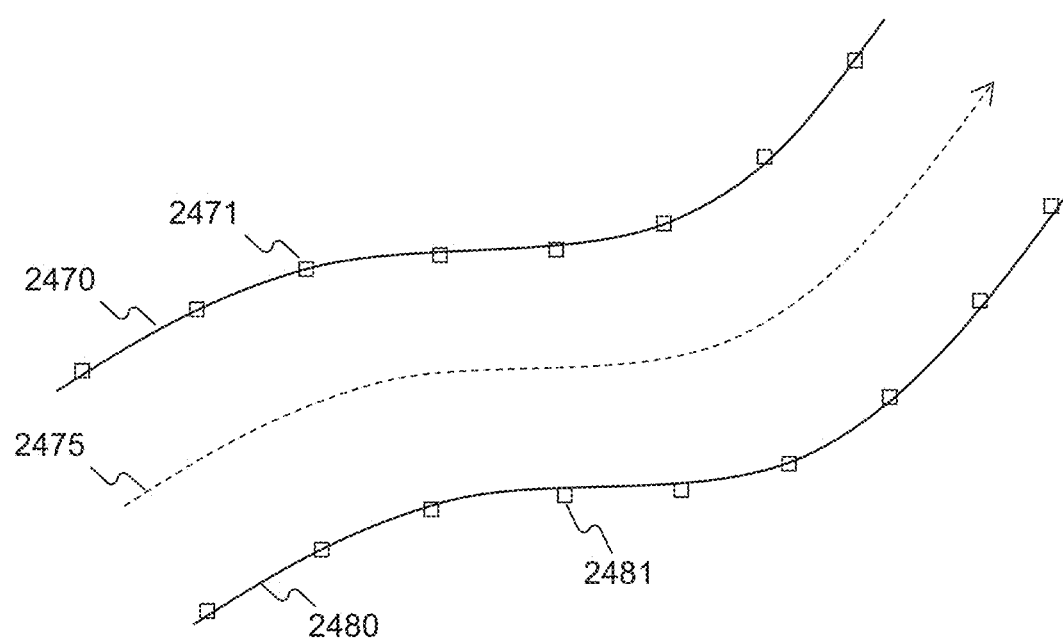
FIG. 24E shows exemplary mapped lane marks consistent with the disclosed embodiments.

FIG. 24E shows an exemplary navigation model or sparse map for a corresponding road segment that includes mapped lane marks. The sparse map may include a target trajectory 2475 for a vehicle to follow along a road segment. As described above, target trajectory 2475 may represent an ideal path for a vehicle to take as it travels the corresponding road segment, or may be located elsewhere on the road (e.g., a centerline of the road, etc.). Target trajectory 2475 may be calculated in the various methods described above, for example, based on an aggregation (e.g., a weighted combination) of two or more reconstructed trajectories of vehicles traversing the same road segment.

In some embodiments, the target trajectory may be generated equally for all vehicle types and for all road, vehicle, and/or environment conditions. In other embodiments, however, various other factors or variables may also be considered in generating the target trajectory. A different target trajectory may be generated for different types of vehicles (e.g., a private car, a light truck, and a full trailer). For example, a target trajectory with relatively tighter turning radii may be generated for a small private car than a larger semi-trailer truck. In some embodiments, road, vehicle and environmental conditions may be considered as well. For example, a different target trajectory may be generated for different road conditions (e.g., wet, snowy, icy, dry, etc.), vehicle conditions (e.g., tire condition or estimated tire condition, brake condition or estimated brake condition, amount of fuel remaining, etc.) or environmental factors (e.g., time of day, visibility, weather, etc.). The target trajectory may also depend on one or more aspects or features of a particular road segment (e.g., speed limit, frequency and size of turns, grade, etc.). In some embodiments, various user settings may also be used to determine the target trajectory, such as a set driving mode (e.g., desired driving aggressiveness, economy mode, etc.).

The sparse map may also include mapped lane marks 2470 and 2480 representing lane marks along the road segment. The mapped lane marks may be represented by a plurality of location identifiers 2471 and 2481. As described above, the location identifiers may include locations in real world coordinates of points associated with a detected lane mark. Similar to the target trajectory in the model, the lane marks may also include elevation data and may be represented as a curve in three-dimensional space. For example, the curve may be a spline connecting three dimensional polynomials of suitable order the curve may be calculated based on the location identifiers. The mapped lane marks may also include other information or metadata about the lane mark, such as an identifier of the type of lane mark (e.g., between two lanes with the same direction of travel, between two lanes of opposite direction of travel, edge of a roadway, etc.) and/or other characteristics of the lane mark (e.g., continuous, dashed, single line, double line, yellow, white, etc.). In some embodiments, the mapped lane marks may be continuously updated within the model, for example, using crowdsourcing techniques. The same vehicle may upload location identifiers during multiple occasions of travelling the same road segment or data may be selected from a plurality of vehicles (such as 1205, 1210, 1215, 1220, and 1225) travelling the road segment at different times. Sparse map 800 may then be updated or refined based on subsequent location identifiers received from the vehicles and stored in the system. As the mapped lane marks are updated and refined, the updated road navigation model and/or sparse map may be distributed to a plurality of autonomous vehicles.

Figure 24F:
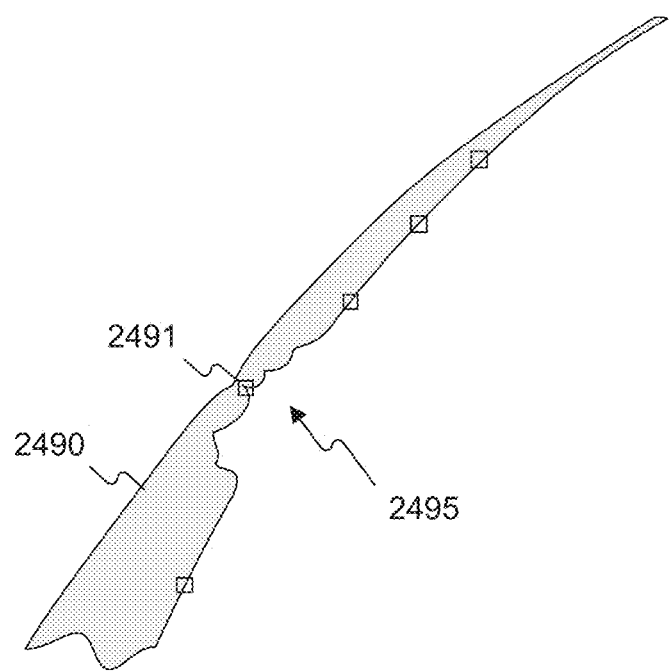
FIG. 24F shows an exemplary anomaly associated with detecting a lane mark consistent with the disclosed embodiments.

Generating the mapped lane marks in the sparse map may also include detecting and/or mitigating errors based on anomalies in the images or in the actual lane marks themselves. FIG. 24F shows an exemplary anomaly 2495 associated with detecting a lane mark 2490. Anomaly 2495 may appear in the image captured by vehicle 200, for example, from an object obstructing the camera's view of the lane mark, debris on the lens, etc. In some instances, the anomaly may be due to the lane mark itself, which may be damaged or worn away, or partially covered, for example, by dirt, debris, water, snow or other materials on the road. Anomaly 2495 may result in an erroneous point 2491 being detected by vehicle 200. Sparse map 800 may provide the correct the mapped lane mark and exclude the error. In some embodiments, vehicle 200 may detect erroneous point 2491 for example, by detecting anomaly 2495 in the image, or by identifying the error based on detected lane mark points before and after the anomaly. Based on detecting the anomaly, the vehicle may omit point 2491 or may adjust it to be in line with other detected points. In other embodiments, the error may be corrected after the point has been uploaded, for example, by determining the point is outside of an expected threshold based on other points uploaded during the same trip, or based on an aggregation of data from previous trips along the same road segment.

The mapped lane marks in the navigation model and/or sparse map may also be used for navigation by an autonomous vehicle traversing the corresponding roadway. For example, a vehicle navigating along a target trajectory may periodically use the mapped lane marks in the sparse map to align itself with the target trajectory. As mentioned above, between landmarks the vehicle may navigate based on dead reckoning in which the vehicle uses sensors to determine its ego motion and estimate its position relative to the target trajectory. Errors may accumulate over time and vehicle's position determinations relative to the target trajectory may become increasingly less accurate. Accordingly, the vehicle may use lane marks occurring in sparse map 800 (and their known locations) to reduce the dead reckoning-induced errors in position determination. In this way, the identified lane marks included in sparse map 800 may serve as navigational anchors from which an accurate position of the vehicle relative to a target trajectory may be determined.

Figure 25A:
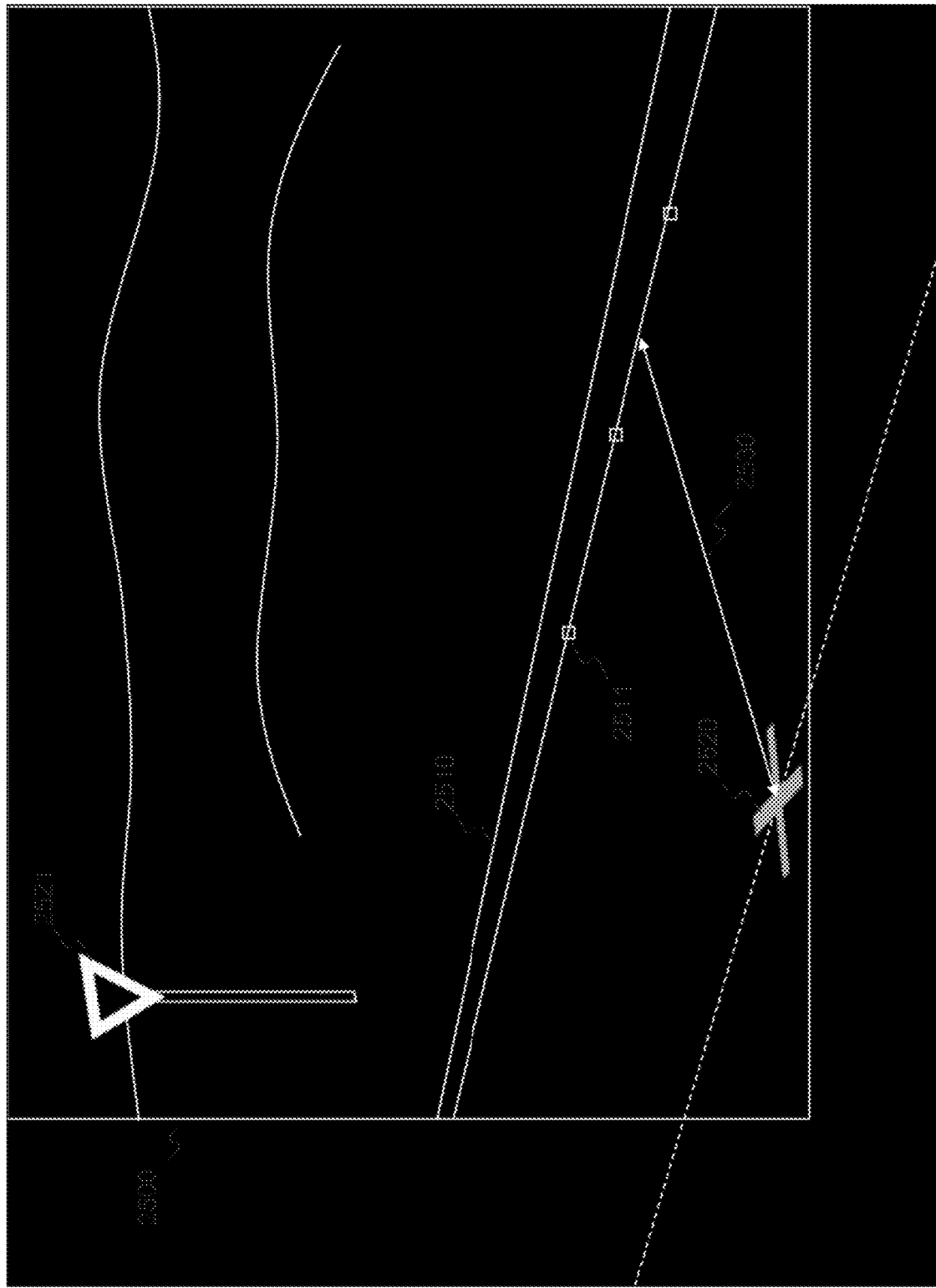
FIG. 25A shows an exemplary image of a vehicle's surrounding environment for navigation based on the mapped lane marks consistent with the disclosed embodiments.

FIG. 25A shows an exemplary image 2500 of a vehicle's surrounding environment that may be used for navigation based on the mapped lane marks. Image 2500 may be captured, for example, by vehicle 200 through image capture devices 122 and 124 included in image acquisition unit 120. Image 2500 may include an image of at least one lane mark 2510, as shown in FIG. 25A Image 2500 may also include one or more landmarks 2521, such as road sign, used for navigation as described above. Some elements shown in FIG. 25A, such as elements 2511, 2530, and 2520 which do not appear in the captured image 2500 but are detected and/or determined by vehicle 200 are also shown for reference.

Using the various techniques described above with respect to FIGS. 24A-D and 24F, a vehicle may analyze image 2500 to identify lane mark 2510. Various points 2511 may be detected corresponding to features of the lane mark in the image. Points 2511, for example, may correspond to an edge of the lane mark, a corner of the lane mark, a midpoint of the lane mark, a vertex between two intersecting lane marks, or various other features or locations. Points 2511 may be detected to correspond to a location of points stored in a navigation model received from a server. For example, if a sparse map is received containing points that represent a centerline of a mapped lane mark, points 2511 may also be detected based on a centerline of lane mark 2510.

The vehicle may also determine a longitudinal position represented by element 2520 and located along a target trajectory. Longitudinal position 2520 may be determined from image 2500, for example, by detecting landmark 2521 within image 2500 and comparing a measured location to a known landmark location stored in the road model or sparse map 800. The location of the vehicle along a target trajectory may then be determined based on the distance to the landmark and the landmark's known location. The longitudinal position 2520 may also be determined from images other than those used to determine the position of a lane mark. For example, longitudinal position 2520 may be determined by detecting landmarks in images from other cameras within image acquisition unit 120 taken simultaneously or near simultaneously to image 2500. In some instances, the vehicle may not be near any landmarks or other reference points for determining longitudinal position 2520. In such instances, the vehicle may be navigating based on dead reckoning and thus may use sensors to determine its ego motion and estimate a longitudinal position 2520 relative to the target trajectory. The vehicle may also determine a distance 2530 representing the actual distance between the vehicle and lane mark 2510 observed in the captured image(s). The camera angle, the speed of the vehicle, the width of the vehicle, or various other factors may be accounted for in determining distance 2530.

Figure 25B:
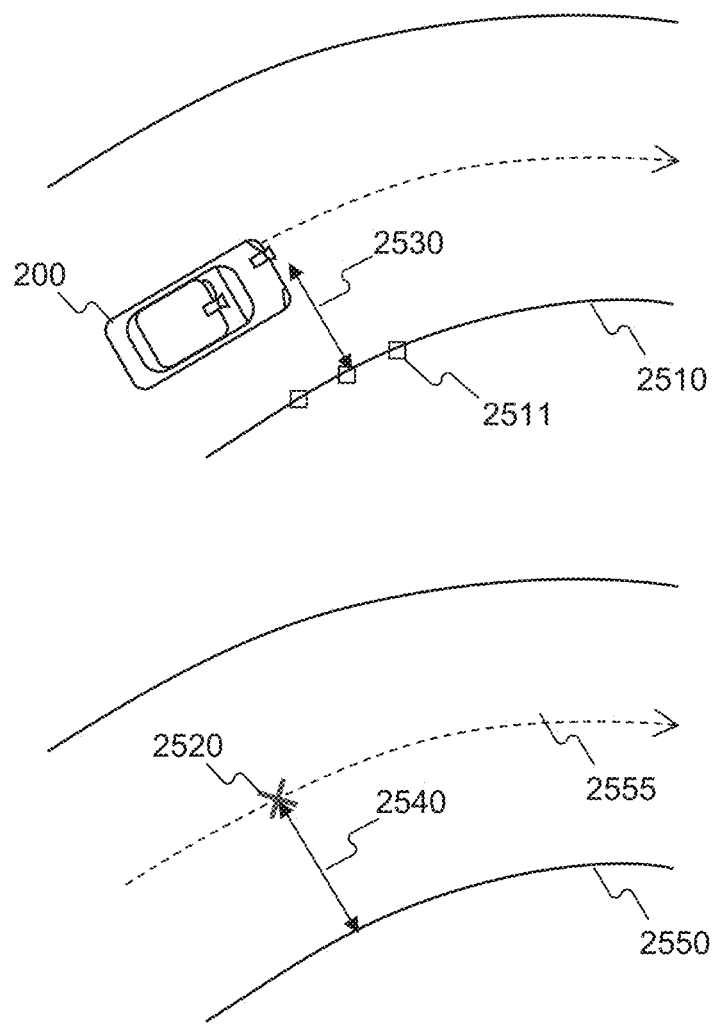
FIG. 25B illustrates a lateral localization correction of a vehicle based on mapped lane marks in a road navigation model consistent with the disclosed embodiments.

FIG. 25B illustrates a lateral localization correction of the vehicle based on the mapped lane marks in a road navigation model. As described above, vehicle 200 may determine a distance 2530 between vehicle 200 and a lane mark 2510 using one or more images captured by vehicle 200. Vehicle 200 may also have access to a road navigation model, such as sparse map 800, which may include a mapped lane mark 2550 and a target trajectory 2555. Mapped lane mark 2550 may be modeled using the techniques described above, for example using crowdsourced location identifiers captured by a plurality of vehicles. Target trajectory 2555 may also be generated using the various techniques described previously. Vehicle 200 may also determine or estimate a longitudinal position 2520 along target trajectory 2555 as described above with respect to FIG. 25A. Vehicle 200 may then determine an expected distance 2540 based on a lateral distance between target trajectory 2555 and mapped lane mark 2550 corresponding to longitudinal position 2520. The lateral localization of vehicle 200 may be corrected or adjusted by comparing the actual distance 2530, measured using the captured image(s), with the expected distance 2540 from the model.

Figure 26A:
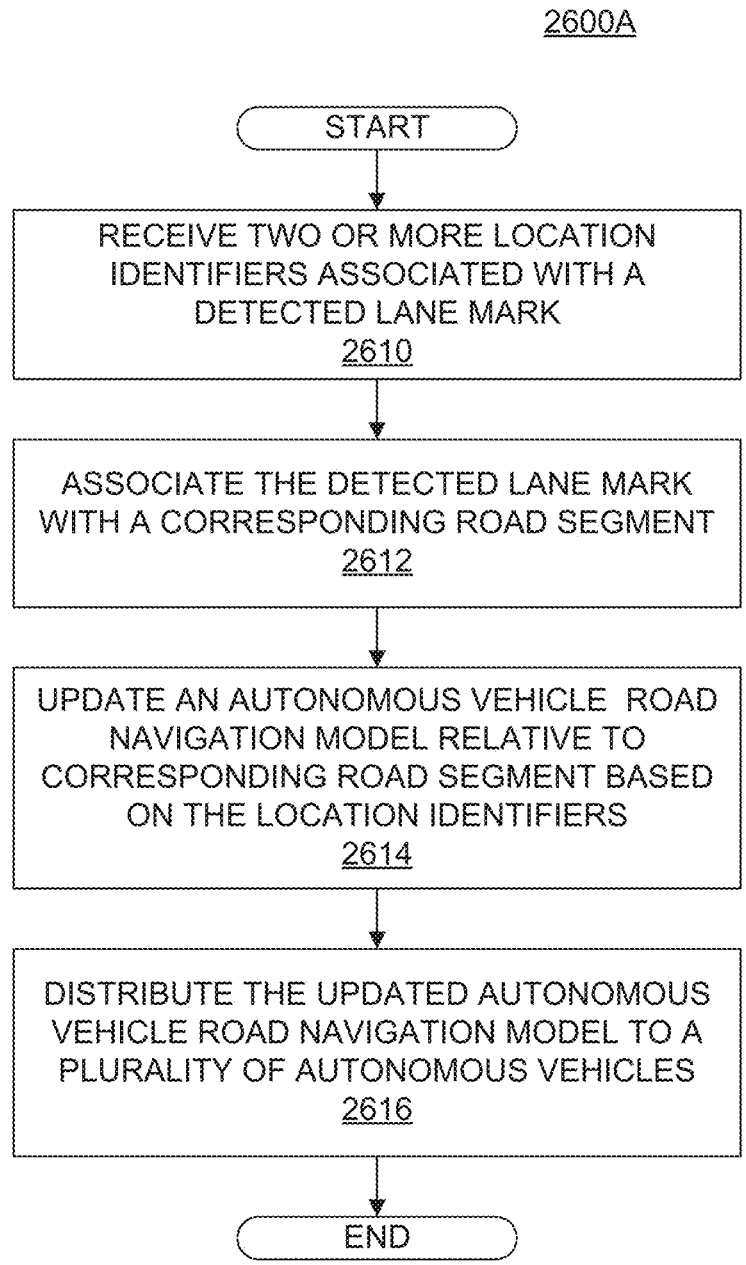
FIG. 26A is a flowchart showing an exemplary process for mapping a lane mark for use in autonomous vehicle navigation consistent with disclosed embodiments.

FIG. 26A is a flowchart showing an exemplary process 2600A for mapping a lane mark for use in autonomous vehicle navigation, consistent with disclosed embodiments. At step 2610, process 2600A may include receiving two or more location identifiers associated with a detected lane mark. For example, step 2610 may be performed by server 1230 or one or more processors associated with the server. The location identifiers may include locations in real-world coordinates of points associated with the detected lane mark, as described above with respect to FIG. 24E. In some embodiments, the location identifiers may also contain other data, such as additional information about the road segment or the lane mark. Additional data may also be received during step 2610, such as accelerometer data, speed data, landmarks data, road geometry or profile data, vehicle positioning data, ego motion data, or various other forms of data described above. The location identifiers may be generated by a vehicle, such as vehicles 1205, 1210, 1215, 1220, and 1225, based on images captured by the vehicle. For example, the identifiers may be determined based on acquisition, from a camera associated with a host vehicle, of at least one image representative of an environment of the host vehicle, analysis of the at least one image to detect the lane mark in the environment of the host vehicle, and analysis of the at least one image to determine a position of the detected lane mark relative to a location associated with the host vehicle. As described above, the lane mark may include a variety of different marking types, and the location identifiers may correspond to a variety of points relative to the lane mark. For example, where the detected lane mark is part of a dashed line marking a lane boundary, the points may correspond to detected corners of the lane mark. Where the detected lane mark is part of a continuous line marking a lane boundary, the points may correspond to a detected edge of the lane mark, with various spacings as described above. In some embodiments, the points may correspond to the centerline of the detected lane mark, as shown in FIG. 24C, or may correspond to a vertex between two intersecting lane marks and at least one two other points associated with the intersecting lane marks, as shown in FIG. 24D.

At step 2612, process 2600A may include associating the detected lane mark with a corresponding road segment. For example, server 1230 may analyze the real-world coordinates, or other information received during step 2610, and compare the coordinates or other information to location information stored in an autonomous vehicle road navigation model. Server 1230 may determine a road segment in the model that corresponds to the real-world road segment where the lane mark was detected.

At step 2614, process 2600A may include updating an autonomous vehicle road navigation model relative to the corresponding road segment based on the two or more location identifiers associated with the detected lane mark. For example, the autonomous road navigation model may be sparse map 800, and server 1230 may update the sparse map to include or adjust a mapped lane mark in the model. Server 1230 may update the model based on the various methods or processes described above with respect to FIG. 24E. In some embodiments, updating the autonomous vehicle road navigation model may include storing one or more indicators of position in real world coordinates of the detected lane mark. The autonomous vehicle road navigation model may also include a at least one target trajectory for a vehicle to follow along the corresponding road segment, as shown in FIG. 24E.

At step 2616, process 2600A may include distributing the updated autonomous vehicle road navigation model to a plurality of autonomous vehicles. For example, server 1230 may distribute the updated autonomous vehicle road navigation model to vehicles 1205, 1210, 1215, 1220, and 1225, which may use the model for navigation. The autonomous vehicle road navigation model may be distributed via one or more networks (e.g., over a cellular network and/or the Internet, etc.), through wireless communication paths 1235, as shown in FIG. 12.

In some embodiments, the lane marks may be mapped using data received from a plurality of vehicles, such as through a crowdsourcing technique, as described above with respect to FIG. 24E. For example, process 2600A may include receiving a first communication from a first host vehicle, including location identifiers associated with a detected lane mark, and receiving a second communication from a second host vehicle, including additional location identifiers associated with the detected lane mark. For example, the second communication may be received from a subsequent vehicle travelling on the same road segment, or from the same vehicle on a subsequent trip along the same road segment. Process 2600A may further include refining a determination of at least one position associated with the detected lane mark based on the location identifiers received in the first communication and based on the additional location identifiers received in the second communication. This may include using an average of the multiple location identifiers and/or filtering out "ghost" identifiers that may not reflect the real-world position of the lane mark.

Figure 26B:
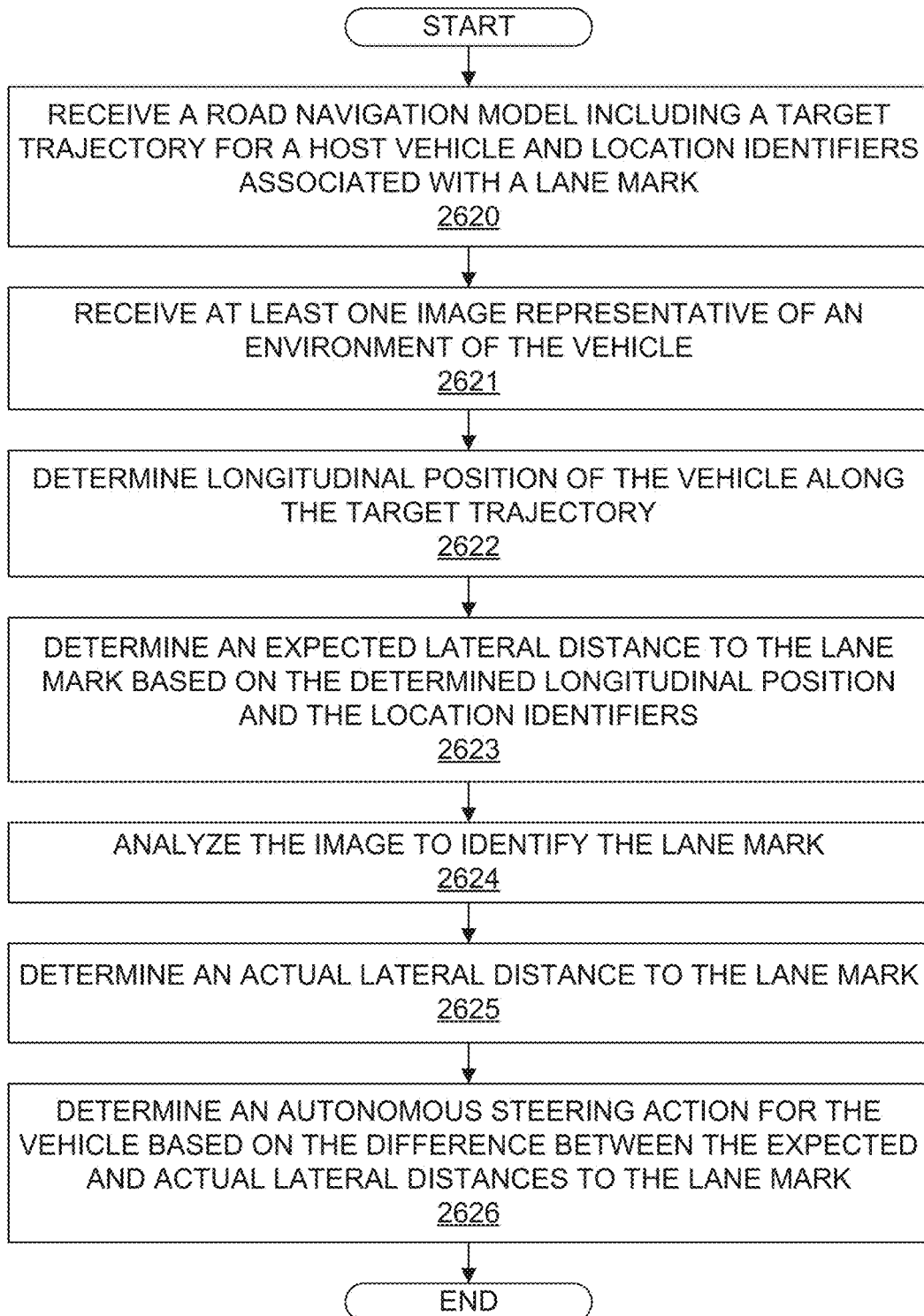
FIG. 26B is a flowchart showing an exemplary process for autonomously navigating a host vehicle along a road segment using mapped lane marks consistent with disclosed embodiments.

FIG. 26B is a flowchart showing an exemplary process 2600B for autonomously navigating a host vehicle along a road segment using mapped lane marks. Process 2600B may be performed, for example, by processing unit 110 of autonomous vehicle 200. At step 2620, process 2600B may include receiving from a server-based system an autonomous vehicle road navigation model. In some embodiments, the autonomous vehicle road navigation model may include a target trajectory for the host vehicle along the road segment and location identifiers associated with one or more lane marks associated with the road segment. For example, vehicle 200 may receive sparse map 800 or another road navigation model developed using process 2600A. In some embodiments, the target trajectory may be represented as a three-dimensional spline, for example, as shown in FIG. 9B. As described above with respect to FIGS. 24A-F, the location identifiers may include locations in real world coordinates of points associated with the lane mark (e.g., corner points of a dashed lane mark, edge points of a continuous lane mark, a vertex between two intersecting lane marks and other points associated with the intersecting lane marks, a centerline associated with the lane mark, etc.).

At step 2621, process 2600B may include receiving at least one image representative of an environment of the vehicle. The image may be received from an image capture device of the vehicle, such as through image capture devices 122 and 124 included in image acquisition unit 120. The image may include an image of one or more lane marks, similar to image 2500 described above.

At step 2622, process 2600B may include determining a longitudinal position of the host vehicle along the target trajectory. As described above with respect to FIG. 25A, this may be based on other information in the captured image (e.g., landmarks, etc.) or by dead reckoning of the vehicle between detected landmarks.

At step 2623, process 2600B may include determining an expected lateral distance to the lane mark based on the determined longitudinal position of the host vehicle along the target trajectory and based on the two or more location identifiers associated with the at least one lane mark. For example, vehicle 200 may use sparse map 800 to determine an expected lateral distance to the lane mark. As shown in FIG. 25B, longitudinal position 2520 along a target trajectory 2555 may be determined in step 2622. Using spare map 800, vehicle 200 may determine an expected distance 2540 to mapped lane mark 2550 corresponding to longitudinal position 2520.

At step 2624, process 2600B may include analyzing the at least one image to identify the at least one lane mark. Vehicle 200, for example, may use various image recognition techniques or algorithms to identify the lane mark within the image, as described above. For example, lane mark 2510 may be detected through image analysis of image 2500, as shown in FIG. 25A.

At step 2625, process 2600B may include determining an actual lateral distance to the at least one lane mark based on analysis of the at least one image. For example, the vehicle may determine a distance 2530, as shown in FIG. 25A, representing the actual distance between the vehicle and lane mark 2510. The camera angle, the speed of the vehicle, the width of the vehicle, the position of the camera relative to the vehicle, or various other factors may be accounted for in determining distance 2530.

At step 2626, process 2600B may include determining an autonomous steering action for the host vehicle based on a difference between the expected lateral distance to the at least one lane mark and the determined actual lateral distance to the at least one lane mark. For example, as described above with respect to FIG. 25B, vehicle 200 may compare actual distance 2530 with an expected distance 2540. The difference between the actual and expected distance may indicate an error (and its magnitude) between the vehicle's actual position and the target trajectory to be followed by the vehicle. Accordingly, the vehicle may determine an autonomous steering action or other autonomous action based on the difference. For example, if actual distance 2530 is less than expected distance 2540, as shown in FIG. 25B, the vehicle may determine an autonomous steering action to direct the vehicle left, away from lane mark 2510.

Thus, the vehicle's position relative to the target trajectory may be corrected. Process 2600B may be used, for example, to improve navigation of the vehicle between landmarks.

Virtual Stop Line Mapping and Navigation

As described elsewhere in this disclosure, a vehicle or a driver may navigate the vehicle according to the environment. For example, an autonomous vehicle may navigate and stop at an intersection according to a marking of a stop line on a road segment. Sometimes, however, a road segment on which a vehicle is driving may include no markings (or inadequate markings due to the poor maintenance) indicating a location for stopping at an intersection, and the vehicle may not be able to navigate properly at the intersection. As another example, an intersection may not be easily detected by a driver or vehicle due to various factors, such as the geometry of the road or intersection or poor visibility conditions (e.g., the sight being blocked by another vehicle, certain weather conditions), etc. Under such circumstances, it may be desirable to determine a virtual stop line (e.g., an unmarked location) at which vehicles can stop to navigate through the intersection (by, for example, slowing down or stopping at the intersection). The systems and methods disclosed herein may allow the determination of a virtual stop line based on images captured by a plurality of devices associated with a plurality of vehicles. The systems and methods may also update a road navigation model based on one or more virtual stop lines and distribute the updated road navigation model to vehicles. The systems and methods may further allow vehicles to perform one or more navigation actions (e.g., slowing, stopping, etc.) based on virtual stop lines included in a road navigation model.

Figure 27:
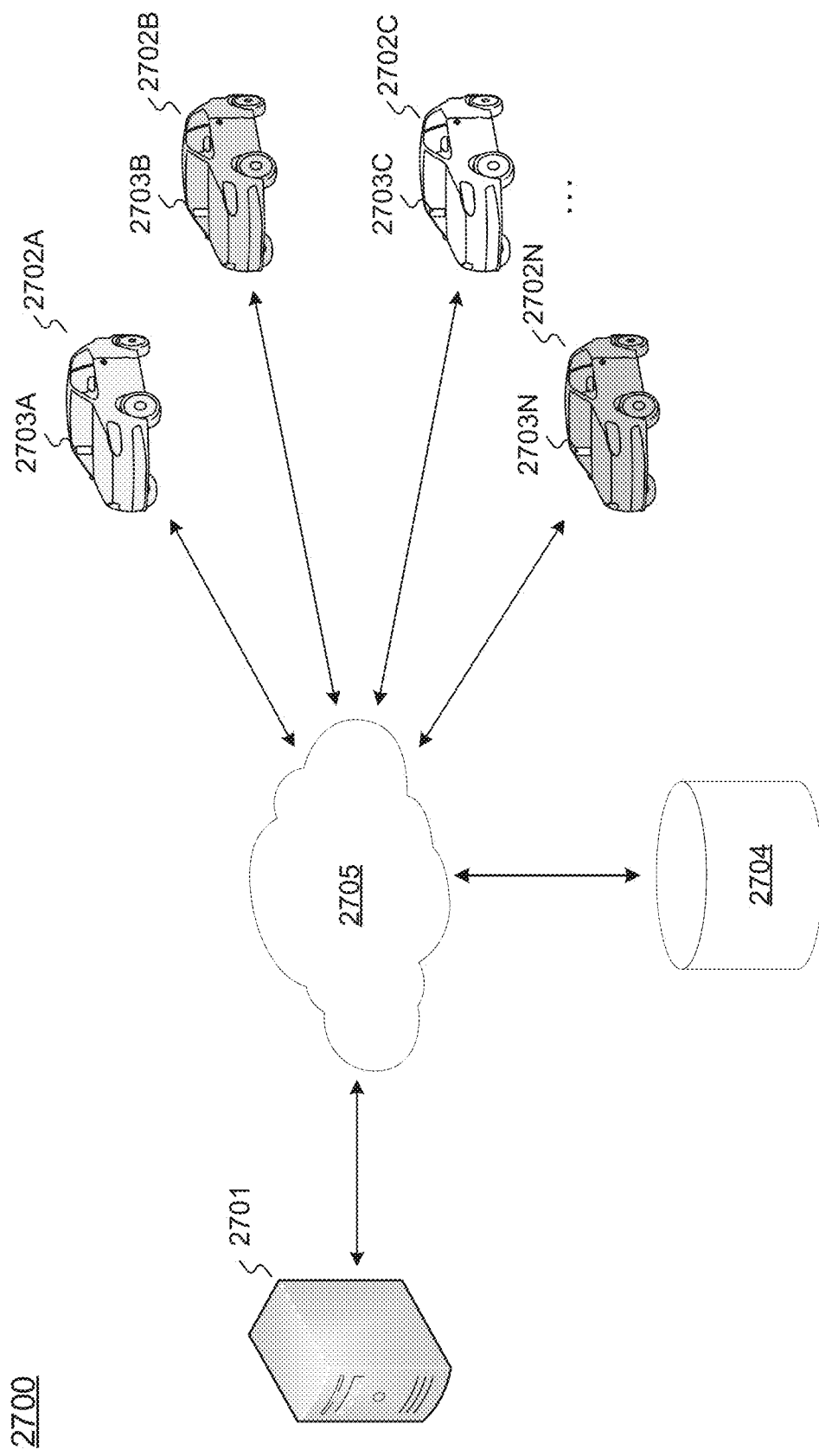
FIG. 27 illustrates an exemplary system for vehicle navigation, consistent with the disclosed embodiments.

FIG. 27 illustrates an exemplary system 2700 for vehicle navigation, consistent with the disclosed embodiments. As illustrated in FIG. 27, system 2700 may include a server 2701, one or more vehicles 2702 (e.g., vehicles 2702A, 2702B, 2702C, . . . , 2702N) and one or more vehicle devices 2703 associated with a vehicle (e.g., vehicle devices 2703A, 2703B, 2703C, . . . , 2703N), a database 2704, and a network 2705. Server 2701 may be configured to update a road navigation model based on drive information received from one or more vehicles (and/or one or more vehicle devices associated with a vehicle). For example, vehicle 2702 and/or vehicle device 2703 may be configured to collect drive information and transmit the drive information to server 2701 for updating a road navigation model. Database 2704 may be configured to store information for the components of system 2700 (e.g., server 2701, vehicle 2702, and/or vehicle device 2703). Network 2705 may be configured to facilitate communications among the components of system 2700.

Server 2701 may be configured to receive drive information from each of a plurality of vehicles. The drive information may include a stopping location at which a particular vehicle from among the plurality of vehicles stopped relative to an intersection during a drive along the road segment. Server 2701 may also be configured to aggregate the stopping locations in the drive information received from the plurality of vehicles and determine, based on the aggregated stopping locations, a stop line location relative to the intersection. Server 2701 may further be configured to update the road navigation model to include the stop line location. In some embodiments, server 2701 may also be configured to distribute the updated road navigation model to one or more vehicles. For example, server 2701 may be a cloud server that performs the functions disclosed herein. The term "cloud server" refers to a computer platform that provides services via a network, such as the Internet. In this example configuration, server 2701 may use virtual machines that may not correspond to individual hardware. For example, computational and/or storage capabilities may be implemented by allocating appropriate portions of desirable computation/storage power from a scalable repository, such as a data center or a distributed computing environment. In one example, server 2701 may implement the methods described herein using customized hard-wired logic, one or more Application Specific Integrated Circuits (ASICs) or Field Programmable Gate Arrays (FPGAs), firmware, and/or program logic which, in combination with the computer system, cause server 2701 to be a special-purpose machine.

Vehicle 2702 and/or vehicle device 2703 may be configured to collect drive information and transmit the drive information to server 2701 for updating a road navigation model. For example, vehicle 2702A and/or vehicle device 2703A may be configured to receive one or more images captured from an environment of vehicle 2702A. Vehicle 2702A and/or vehicle device 2703A may also be configured to analyze the one or more images to detect an indicator of an intersection. Vehicle 2702A and/or vehicle device 2703A may further be configured to determine, based on output received from at least one sensor of vehicle 2702A, a stopping location of vehicle 2702A relative to the detected intersection. Vehicle 2702A and/or vehicle device 2703A may also be configured to analyze the one or more images to determine an indicator of whether one or more other vehicles are in front of vehicle 2702A. Vehicle 2702A and/or vehicle device 2703A may further be configured to send the stopping location of vehicle 2702A and the indicator of whether one or more other vehicles are in front of vehicle 2702A to server 2701 for use in updating a road navigation model.

In some embodiments, vehicle 2702 and/or vehicle device 2703 may be configured to receive an updated road navigation model and cause vehicle 2702 to perform at least one navigational action based on the updated road navigation model. For example, vehicle 2702B and/or vehicle device 2703B may be configured to receive, from a camera of vehicle 2702B, one or more images captured from an environment of vehicle 2702B. Vehicle 2702B and/or vehicle device 2703B may also be configured to detect an indicator of an intersection in an environment of vehicle 2702B. Vehicle 2702B and/or vehicle device 2703B may further be configured to receive map information including a stop line location relative to the intersection from server 2701. Vehicle 2702B and/or vehicle device 2703B may also be configured to plan a routing path and/or navigate vehicle 2702B according to the map information. For example, vehicle 2702B and/or vehicle device 2703B may be configured to take the stop line location account when planning a route to a destination (e.g., adding the stop time into the estimated arrival time if passing the intersection, selecting a different route by not to pass the intersection, etc.). As another example, vehicle 2702B and/or vehicle device 2703B may be configured to take the stop line location into account as part of long-term planning well ahead of approaching the stop line location. For example, vehicle 2702B and/or vehicle device 2703B may be configured to deaccelerate the vehicle when the vehicle reaches within a predetermined distance from the stop line location. Alternatively or additionally, vehicle 2702B and/or vehicle device 2703B may be configured to brake and stop vehicle 2702B before reaching the stop line location.

In some embodiments, vehicle 2702 may include a device having a similar configuration and/or performing similar functions as system 100 described above. Alternatively or additionally, vehicle device 2703 may have a similar configuration and/or performing similar functions as system 100 described above.

Database 2704 may include a map database configured to store map data for the components of system 2700 (e.g., server 2701, vehicle 2702, and/or vehicle device 2703). In some embodiments, server 2701, vehicle 2702, and/or vehicle device 2703 may be configured to access database 2704, and obtain data stored from and/or upload data to database 2704 via network 2705. For example, server 2701 may transmit data relating to one or more road navigation models to database 2704 for storage. Vehicle 2702 and/or vehicle device 2703 may download a road navigation model from database 2704. In some embodiments, database 2704 may include data relating to the position, in a reference coordinate system, of various items, including roads, water features, geographic features, businesses, points of interest, restaurants, gas stations, or the like, or a combination thereof. In some embodiments, database 2704 may include a database similar to map database 160 described elsewhere in this disclosure.

Network 2705 may be any type of network (including infrastructure) that provides communications, exchanges information, and/or facilitates the exchange of information between the components of system 2700. For example, network 2705 may include or be part of the Internet, a Local Area Network, wireless network (e.g., a Wi-Fi/302.11 network), or other suitable connections. In other embodiments, one or more components of system 2700 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

Figure 28:
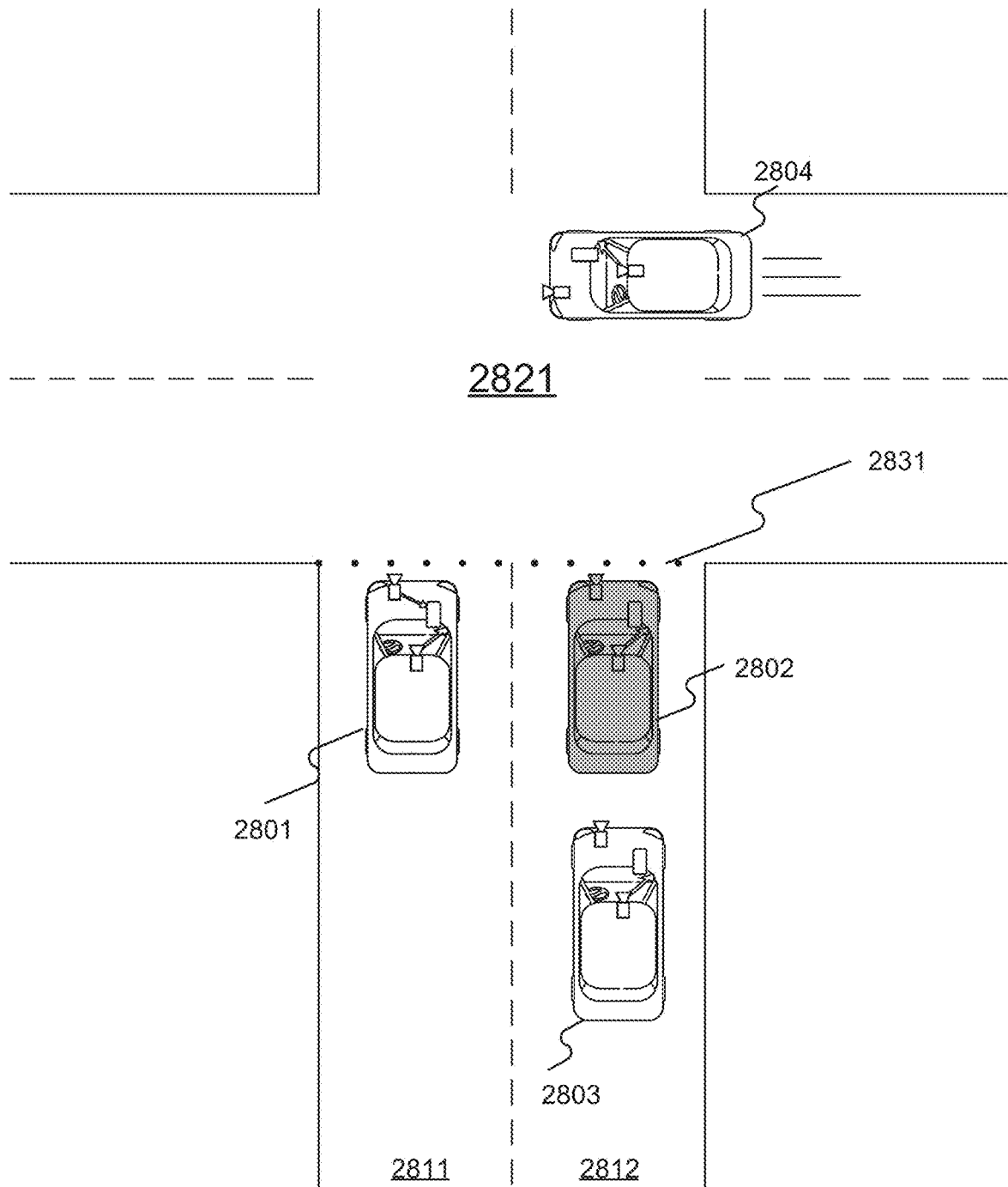
FIG. 28 is a schematic illustration of exemplary vehicles at an intersection consistent with the disclosed embodiments.

FIG. 28 is a schematic illustration of exemplary vehicles at an intersection consistent with the disclosed embodiments. As illustrated in FIG. 28, a vehicle 2801 may drive in lane 2811, a vehicle 2802 and a vehicle 2803 may drive in lane 2812. Vehicle 2801, vehicle 2802, and/or vehicle 2803 may include one more cameras configured to capture one or more images from the environment and may include one or more devices (e.g., vehicle device 2703) configured to detect an indicator of intersection 2821 based on the analysis of the one or more images. An indicator of an intersection may include one or more road markings, one or more traffic lights, one or more stop signs, one or more crosswalks, one or more vehicles crossing in front of the host vehicle, one or more vehicles stopping at a location close to the host vehicle (e.g., within a predetermined distance threshold from the host vehicle), or the like, or a combination thereof. For example, vehicle 2801 may be configured to analyze the one or more images and detect a traffic light in the forward direction in at least one of the one or more images. As another example, vehicle 2802 (similar to vehicle 2702) may analyze the one or more images from the environment of vehicle 2802 and detect vehicle 2804 crossing (in this example, moving from the right to the left) in front of vehicle 2802 based on the image analysis. As another example, vehicle 2803 may analyze the one or more images from the environment of vehicle 2803 and detect a road sign indicating an intersection. For example, vehicle 2803 may analyze the one or more images and detect a stop sign, and based on the facing direction of the stop sign, determine whether the stop sign is indicative of an intersection. As another example, vehicle 2803 may analyze the one or more images and detect a cross walk, and based on an orientation of the cross walk relative to vehicle 2803 (e.g., a cross walk spanning a lane ahead of vehicle 2803 may indicate an intersection is near), determine whether the cross walk is indicative of an intersection.

Vehicle 2801, vehicle 2802, and/or vehicle 2803 may also be configured to determine, based on output received from at least one sensor of the host vehicle, a stopping location of the host vehicle relative to the detected intersection. For example, vehicle 2801 may receive a signal output from a sensor (e.g., a GPS device, a speed sensor, an accelerometer, a suspension sensor, or the like, or a combination thereof) and determine that vehicle 2801 stops at a location relative to intersection 2821. The position of vehicle 2801 may be determined based on GPS information, map information, such as using the mapping techniques described elsewhere in this disclosure, or a combination thereof). Vehicle 2801, vehicle 2802, and/or vehicle 2803 may further be configured to analyze the one or more images to determine an indicator of whether one or more other vehicles are in front of the host vehicle. For example, vehicle 2801 and vehicle 2802 may determine that no vehicles are in front of them based on the image analysis. As another example, vehicle 2803 may determine that there is one or more vehicles in front of it. By way of example, vehicle 2803 may determine that there is a vehicle that is in front of it along the same path where the host vehicle travels (e.g., vehicle 2802) and/or there is a vehicle that is in front of it along a path parallel to or a path sharing the same virtual stop line in the path where the host vehicle is traveling (e.g., vehicle 2801). In instances when or more other vehicles are in front of a host vehicle, it may be appropriate to conclude that the host vehicle is not located a stop line location. Similarly, in instances when a host vehicle is stopped and no other vehicles are located in front of host vehicle (or no other vehicles are located within a predetermined threshold distance in front of the host vehicle), it may be appropriate to conclude that the host vehicle is located at a stop line location. Vehicle 2801, vehicle 2802, and/or vehicle 2803 may also be configured to transmit drive information relating to their stopping locations and intersection 2821 to server 2701. For example, a host vehicle may transmit a stopping location of the host vehicle and an indicator of whether one or more other vehicles are in front of the host vehicle. The indicator of whether one or more other vehicles are in front of the host vehicle may include any appropriate information, such as any identifier (e.g., an alphanumeric identifier). In some embodiments, the indicator of whether one or more other vehicles are in front of the host vehicle may include an image and/or a portion of an image. Server 2701 may be configured to determine a stop line location (e.g., represented by dotted line 2831) based on the drive information received from the vehicles (and/or other vehicles) and update a road navigation model to include the stop line location.

Figure 29A:
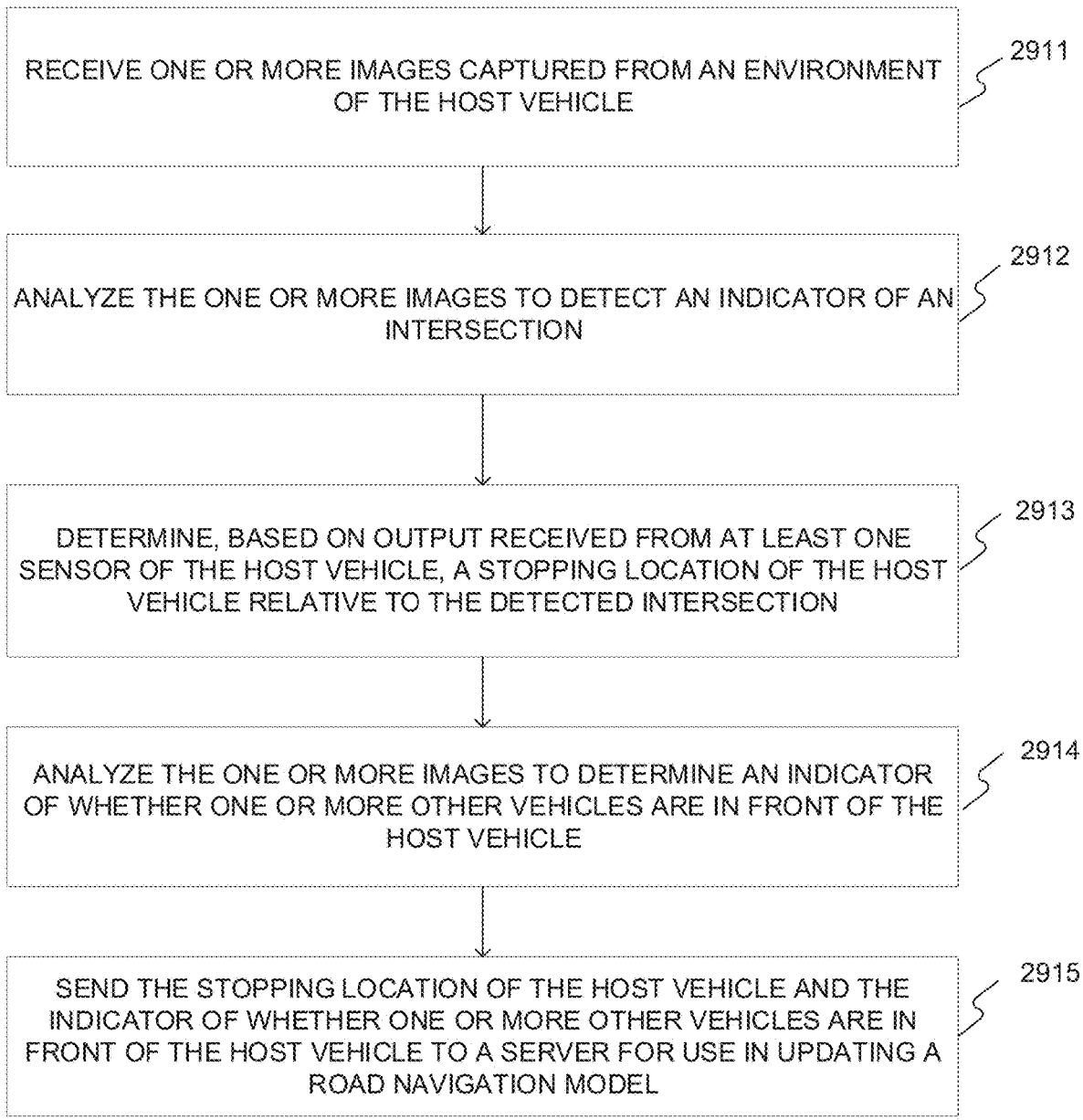
FIG. 29A is a flowchart showing an exemplary process for vehicle navigation, consistent with the disclosed embodiments.

FIG. 29A is a flowchart showing an exemplary process 2910 for vehicle navigation, consistent with the disclosed embodiments. One or more steps of process 2910 may be performed by a vehicle (e.g., vehicle 2702), a device associated with the host vehicle (e.g., vehicle device 2703), and/or a server (e.g., server 2701). While the descriptions of process 2910 provided below use vehicle 2702 as an example, one skilled in the art would appreciate that one or more steps of process 2910 may be performed by a vehicle device (e.g., vehicle device 2703) and/or a server (e.g., server 2701).

At step 2911, vehicle 2702 may be configured to receive one or more images captured from an environment of the host vehicle. For example, a camera associated with vehicle 2702 (e.g., a camera or image capture device of image acquisition device 120) may capture one or more images of an environment of the vehicle, as described elsewhere in this disclosure. Vehicle 2702 may receive the one or more images from the image capture device. In some embodiments, the camera may capture one or more images continuously, and vehicle 2702 may receive the images continuously or intermittently. For example, the camera may capture one or more images from the environment of vehicle 2702 prior to the host vehicle reaching a stopping location. As another example, the camera may capture one or more images during a predetermined time threshold prior to the host vehicle reaching a stopping location. Alternatively, or additionally, the camera may capture one or more images starting at a certain distance from the stopping location. Alternatively or additionally, the camera may capture one or more images upon or after a trigger event. For example, vehicle 2702 may detect that vehicle 2702 stops (e.g., at a stopping location) based on a signal from a sensor (e.g., a global positioning system (GPS) device, a speed sensor, an accelerometer, a suspension sensor, or the like, or a combination thereof). Vehicle 2702 may instruct the camera to capture one or more images of the environment of vehicle 2702. The camera may capture one or more images while the host vehicle is stopped at a stopping location. Alternatively or additionally, the camera may capture one or more images after the host vehicle reaches a stopping location. The capture of the images related to the stopping location may be associated with other factors such as the vehicle speed and/or ambient conditions (light level, precipitation, etc.). Thus, for example, if the vehicle is traveling at a relatively high rate of speed when the capture of images begins, the vehicle may further away from the stopping location compared to a similar scenario in which the vehicle is traveling more slowly.

At step 2912, vehicle 2702 may be configured to analyze the one or more images to detect an indicator of an intersection. An indicator of an intersection may include one or more road markings, one or more traffic lights, one or more stop signs, one or more cross walks, one or more vehicles crossing in front of the host vehicle, one or more vehicles stopping at a location close to the host vehicle, or the like, or a combination thereof. For example, vehicle 2702 may be configured to analyze the one or more images and detect a traffic light in the forward direction in at least one of the one or more images. As another example, vehicle 2702 may be configured to detect a road marking, such as a lane marking, a turn lane marking, etc., in at least one of the one or more images. By way of example, as illustrated in FIG. 28, vehicle 2802 (similar to vehicle 2702) may analyze the one or more images from the environment of vehicle 2802 and detect vehicle 2804 crossing (moving from the right to the left) in front of vehicle 2802 based on the image analysis. As another example, vehicle 2801 (similar to vehicle 2702) may analyze the one or more images from the environment of vehicle 2801 and detect vehicle 2802 stopping in a lane parallel to the land where vehicle 2802 drives based on the image analysis. In some embodiments, a surface of the road segment corresponding to the stop location is free of markings designating where vehicles should stop relative to the intersection. For example, lane 2811 may have no markings designating where vehicles should stop relative to intersection 2821. By way of example, a surface of the road segment in a lane forward of the host vehicle may not include a marking indicating a stop line.

Alternatively or additionally, vehicle 2702 may be configured to receive information distinguishing an intersection from another vehicle or an infrastructure object. By way of example, as illustrated in FIG. 28, vehicle 2803 may receive a signal (or message) distinguishing intersection 2821 from vehicle 2801 and/or vehicle 2802. Alternatively or additionally, vehicle 2803 may receive a signal (or message) distinguishing intersection 2821 from a signal post (not shown).

In some embodiments, alternatively or additionally, vehicle 2702 may transmit the one or more images to server 2701, which may be configured to analyze the one or more images to detect an indicator of an intersection.

In some embodiments, vehicle 2702 and/or server 2701 may use a machine learning algorithm to analyze the one or more images and detect an indicator of an intersection. For example, vehicle 2702 may obtain or use a trained machine learning algorithm for detecting an indicator of an intersection. In some embodiments, the machine learning algorithm may be trained based on a supervised training process. For example, the machine learning algorithm may be trained using a large number of training samples in which one or more stopping locations are labeled (manually or automatically by a computer) in a paired image. Vehicle 2702 may also input the one or more images into the machine learning algorithm, which may output an indicator of an intersection based on the input.

At step 2913, vehicle 2702 may be configured to determine, based on output received from at least one sensor of the host vehicle, a stopping location of the host vehicle relative to the detected intersection. For example, vehicle 2702 may receive a signal output from a sensor (e.g., a GPS device, a speed sensor, an accelerometer, a suspension sensor, or the like, or a combination thereof) and determine that vehicle 2702 stops at a location relative to the detected intersection. Vehicle 2702 may also be configured to determine the stop location at which vehicle 2702 stops. By way of example, as illustrated in FIG. 28, vehicle 2801 may receive a signal from a GPS sensor and determine that the vehicle stops at a location close to intersection 2821. Vehicle 2801 may also be configured to determine the stopping location of vehicle 2801 (e.g., GPS coordinates of the stopping location). As another example, as illustrated in FIG. 28, vehicles 2802 and 2803 may stop in lane 2812. Vehicle 2802 may determine the stopping location of vehicle 2802 in relative to intersection 2821 based on output received from at least one sensor of vehicle 2802, and vehicle 2803 may determine the stopping location of vehicle 2803 in relative to intersection 2821 based on output received from at least one sensor of vehicle 2803.

At step 2914, vehicle 2702 may be configured to analyze the one or more images to determine an indicator of whether one or more other vehicles are in front of the host vehicle. For example, vehicle 2702 may be configured to analyze the one or more images to determine an indicator indicating whether there is one or more vehicles within a predetermined threshold distance in front of the host vehicle. By way of example, as illustrated in FIG. 28, vehicle 2801 may analyze one or more images to determine an indicator indicating that no vehicles are within a predetermined threshold (e.g., 2 meters) distance in front of vehicle 2801. Vehicle 2802 may analyze one or more images to determine an indicator indicating that no vehicles are within a predetermined threshold (e.g., 2 meters) distance in front of vehicle 2802, while vehicle 2803 may analyze one or more images to determine an indicator indicating that there is another vehicle (i.e., vehicle 2802) within a predetermined threshold (e.g., 2 meters) distance in front of vehicle 2803. The threshold distance may be in the range of 10 centimeters to 10 meters. In some embodiments, the threshold distance may be restricted into subranges of 10 to 50 centimeters, 50 centimeters to 1 meter, 1 to 2 meters, 2 to 5 meters, and 5 to 10 meters.

In some embodiments, alternatively or additionally, vehicle 2702 may be configured to determine an indicator of whether one or more other vehicles are in front of the host vehicle based on information received from another vehicle, an infrastructure object, and/or server 2701. By way of example, as illustrated in FIG. 28, vehicle 2803 may receive a signal (or message) from vehicle 2801 (and/or vehicle 2802) indicating that another vehicle (vehicle 2801 and/or vehicle 2802) is in front of it. Alternatively or additionally, vehicle 2803 may receive a signal (or message) from a signal post indicating that indicating that another vehicle (vehicle 2801 and/or vehicle 2802) is in front of it. Alternatively or additionally, vehicle 2803 may receive a signal (or message) from server 3301 indicating that indicating that another vehicle (vehicle 2801 and/or vehicle 2802) is in front of it. In any of these examples, the signal (or message) may also include a position of a vehicle in front of the host vehicle. For example, the position information may include map information relative to a coordinate system for identifying a location of the leading vehicle relative to the host vehicle.

In some embodiments, vehicle 2702 and/or server 2701 may use a machine learning algorithm to determine an indicator of whether one or more other vehicles are in front of the host vehicle. For example, vehicle 2702 may obtain or use a trained machine learning algorithm for determining an indicator of whether one or more other vehicles are in a front area of the vehicle and possibly also whether such vehicles are in front of the host vehicle, e.g., within the same lane as the vehicle. Vehicle 2702 may also input the one or more images into the machine learning algorithm, which may output an indicator of whether one or more other vehicles are in front of the host vehicle based on the input.

At step 2915, vehicle 2702 may be configured to send the stopping location of the host vehicle to a server. Optionally, vehicle 3302 may also be configured to send the indicator of whether one or more other vehicles are in front of the host vehicle to the server. For example, vehicle 2702 may transmit the stopping location of vehicle 2702 and the indicator of whether one or more other vehicles are in front of vehicle 2702 to server 2701 for use in updating a road navigation model via network 2705. By way of example, as illustrated in FIG. 28, vehicle 2801 may transmit data indicating the stopping location of vehicle 2801 (e.g., GPS coordinates) and an indicator that no vehicles are in front of vehicle 2801 to server 2701 via network 2705. As another example, vehicle 2803 may transmit data indicating the stopping location of vehicle 2803 (e.g., GPS coordinates) and an indicator that there are one or more vehicles in front of vehicle 2803 to server 2701 via network 2705.

In some embodiments, vehicle 2702 may also transmit location information relating to the intersection to server 2701. For example, vehicle 2702 may also transmit to server 2701 location information relating to the intersection, such as the GPS coordinates of the intersection, the size of the intersection, the boundaries of the intersection, the shape or structure of the intersection, lane information relating to the intersection (e.g., driving direction, the number of the lanes crossing the interaction), one or more landmarks in and/or around the intersection, one or more infrastructure objects in and/or around the intersection, or the like, or a combination thereof.

In some embodiments, vehicle 2702 may transmit the stopping location of vehicle 2702 to server 2701 when the number of vehicles that are in front it is equal to or less than a threshold number. For example, vehicle 2702 may transmit the stopping location of vehicle 2702 to server 2701 only when there are two or fewer vehicles in front of it. As another example, vehicle 2702 may transmit the stopping location of vehicle 2702 to server 2701 only when there is no vehicle in front of vehicle 2702.

In some embodiments, vehicle 2702 may be configured to transmit the stopping location of vehicle 2702 to server 2701 when no vehicles are in front of the host vehicle. For example, vehicle 2702 may determine that no vehicles are in front of the host vehicle based on the analysis of the one or more images (as described elsewhere in this disclosure). Vehicle 2702 may also transmit the stopping location of the host vehicle to the server in response to the determination that no vehicles are in front of the host vehicle. In some embodiments, vehicle 2702 may transmit the stopping location of the host vehicle to the server only when no vehicles are in front of the host vehicle.

FIG. 29B is a flowchart showing an exemplary process 2920 for updating a road navigation model, consistent with the disclosed embodiments. One or more steps of process 2920 may be performed by a vehicle (e.g., vehicle 2702), a device associated with the host vehicle (e.g., vehicle device 2703), and/or a server (e.g., server 2701). While the descriptions of process 2910 provided below use server 2701 as an example, one skilled in the art would appreciate that one or more steps of process 2920 may be performed by a vehicle and/or a vehicle device.

At step 2921, server 2701 may be configured to receive drive information from each of a plurality of vehicles. The drive information may include a stopping location at which a particular vehicle from among the plurality of vehicles stopped relative to an intersection during a drive along the road segment. For example, server 2701 may be configured to receive driving information from vehicle 2801, vehicle 2802, and vehicle 2803, which may include the stopping location of each of the vehicles relative to intersection 2821 (as illustrated in FIG. 28 and described elsewhere in this disclosure) during the drive along the corresponding road segment (e.g., lane 2811 for vehicle 2801, lane 2812 for vehicle 2802 and vehicle 2803). In some embodiments, a surface of the road segment corresponding to the stop location is free of markings designating where vehicles should stop relative to the intersection. For example, lane 2811 may have no markings designating where vehicles should stop relative to intersection 2821.

In some embodiments, the drive information received from a vehicle may also include an indicator indicating whether at least one other vehicle resided between the intersection and the stopping location of the vehicle. Alternatively or additionally, the drive information received from a vehicle may include one or more images relating to the stopping location of the vehicle and/or the intersection. Alternatively or additionally, the drive information may include location information relating to the intersection. For example, the drive information received from a vehicle may include the location information of the intersection such as the GPS coordinates of the intersection, the size of the intersection, the boundaries of the intersection, the shape of the intersection, or the like, or a combination thereof.

At step 2922, server 2701 may be configured to aggregate the stopping locations in the drive information received from the plurality of vehicles. In some embodiments, aggregating the stopping locations may include computing an average of the stopping locations. For example, server 2701 may be configured to aggregate the stopping locations of vehicle 2801, vehicle 2802, and/or vehicle 2803 (and/or the stopping locations of other vehicles) in relative to intersection 2821. As another example, server 2701 may aggregate the stopping location of a first vehicle along a road segment at an intersection at a first time and the stopping locations of a second vehicle along the same road segment at the same intersection at a second time (and/or the stopping locations of other vehicles).

In some embodiments, in aggregating the stopping locations, server 2701 may be configured to eliminate at least one stopping location received from one of the plurality of vehicles based on a determination that the at least one stopping location is greater than a predetermined threshold distance away from at least one other stopping location received from another of the plurality of vehicles. For example, server 2701 may determine that the stopping location of vehicle 2803 is greater than a predetermined threshold (e.g., 2 meters) distance away from the stopping location of vehicle 2801 and/or the stopping location of vehicle 2802. Server 2701 may also eliminate the stopping location of vehicle 2803 based on the determination. The threshold distance may be in the range of 10 centimeters to 10 meters. In some embodiments, the threshold distance may be restricted into subranges of 10 to 50 centimeters, 50 centimeters to 1 meter, 1 to 2 meters, 2 to 5 meters, and 5 to 10 meters.

Alternatively or additionally, in aggregating the stopping locations, server 2701 may be configured to eliminate a particular stopping location received from a particular one of the plurality of vehicles based on an indicator that at least one other vehicle resided between the intersection and the particular stopping location of the particular one of the plurality of vehicles. For example, server 2701 may determine an indicator indicating that vehicle 2802 resided between intersection 2821 and the stopping location of vehicle 2803. Server 2701 may also eliminate the stopping location received from vehicle 2803 when aggregating the stopping locations received from the vehicles. In some embodiments, an indicator indicating whether at least one other vehicle resided between the intersection and the particular stopping location of the particular one of the plurality of vehicles may be included in the drive information received from the particular vehicle. Alternatively or additionally, the indicator may be determined based on analysis of at least one image captured by a camera on board the particular one of the plurality of vehicles. For example, server 2701 may be configured to receive one or more images captured by a camera associated with vehicle 2803 and determine that there is a vehicle (e.g., vehicle 2802) resided between intersection 2821 and the stopping location of vehicle 2803 as illustrated in FIG. 28.

At step 2923, server 2701 may be configured to determine, based on the aggregated stopping locations, a stop line location relative to the intersection. For example, as illustrated in FIG. 28 server 2701 may be configured to determine a stop line location (e.g., represented by dotted line 2831 or a part thereof) relative to intersection 2821 based on the aggregated stopping locations including at least one of the stopping locations of vehicle 2801 and vehicle 2802. By way of example, server 2701 may be configured to determine a stop line location by averaging (or by computing a weighted average of) the distances of the stopping location of vehicle 2801 relative to intersection 2821 and the stopping location of vehicle 2802 relative to intersection 2821. In some embodiments, server 3301 may also be configured to take other factors, such as ambient conditions when the images were captured, into account when determining a stop line location. For example, server 2701 may be configured to determine a stop line location by computing a weighted average of the distance of a first stopping location relative to the intersection determined based on a first image and the distance of a second stopping location relative to the intersection determined based on a second image by giving more weight to the first stopping location if the ambient condition when the first image was capture is more optimal than the second image (e.g., the first image is brighter than the second image).

In some embodiments, server 2701 may also determine location information of the stop line location (e.g., GPS coordinates associated with the stop line location, position of the stop line location relative to one or more known references, such as lane markings, road signs, highway exit ramps, traffic lights, and any other feature, etc.). In some embodiments, server 2701 may also determine location information relating to the intersection such as the GPS coordinates of the intersection, the size of the intersection, the boundaries of the intersection, the shape and/or structure of the intersection, lane information relating to the intersection (e.g., driving direction, the number of the lanes crossing the interaction), one or more landmarks in and/or around the intersection, one or more infrastructure objects in and/or around the intersection, or the like, or a combination thereof.

In some embodiments, server 2701 may determine a confidence score for each of the determined stopping locations relative to the intersection based on the images received from the vehicles. For example, server 2701 may assign a first confidence score for a first stopping location determined based on the first image received from the first vehicle. Server 2701 may also assign a second confidence score for a second stopping location determined based on the second image received from the second vehicle. To determine a final stop location in relative to the intersection, server 2701 may be configured to take the confidence scores into account. For example, server 2701 may be configured to compute a weighted average based on the first and second stopping locations by giving more weight to the first stopping location than the second stopping location if the first confidence score is higher than the second confidence score.

At step 2924, server 2701 may be configured to update the road navigation model to include the stop line location. For example, server 2701 may be configured to add the stop line location into a navigation map (i.e., a road navigation model or part thereof). In some embodiments, server 2701 may also include information relating to the intersection into the road navigation model. In some embodiments, server 2701 may add descriptions of the stop line location and/or the intersection into the road navigation model. Alternatively or additionally, server 2701 may update navigation instructions according to the stop line location. For example, server 2701 may update the navigation instruction relating to the intersection to instruct a vehicle to stop at the stop line location and/or slow down when approaching the stop line or the intersection.

In some embodiments, server 2701 may be configured to distribute the updated road navigation model to at least one vehicle. For example, server 2701 may be configured to transmit the updated road navigation model to a plurality of vehicles via network 2705. Alternatively or additionally, server 2701 may store the updated road navigation model into database 2704, and one or more vehicles may obtain the updated road navigation model from database 2704.

Figure 29C:
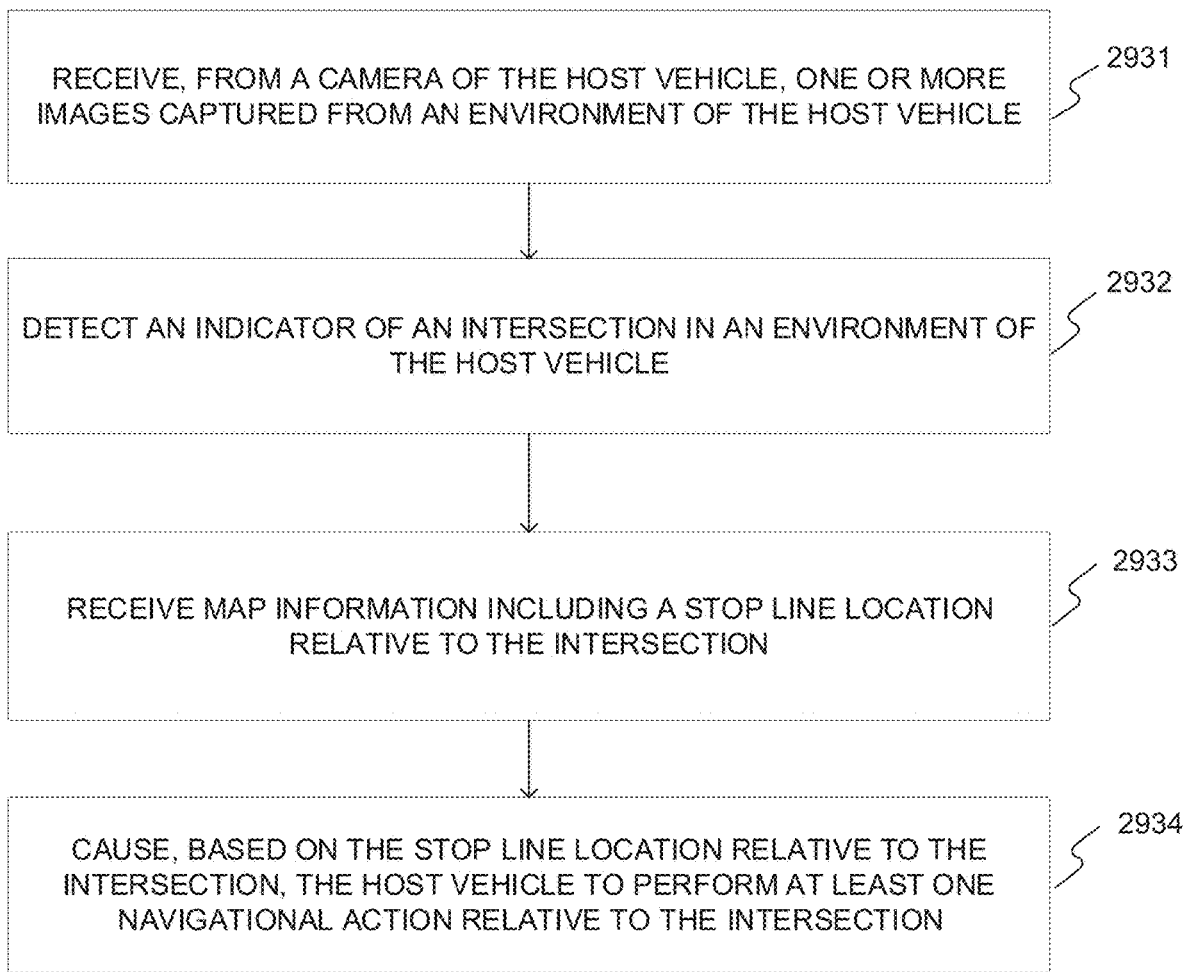
FIG. 29C is a flowchart showing an exemplary process for vehicle navigation, consistent with the disclosed embodiments.

FIG. 29C is a flowchart showing an exemplary process for vehicle navigation, consistent with the disclosed embodiments. One or more steps of process 2930 may be performed by a vehicle (e.g., vehicle 2702), a device associated with the host vehicle (e.g., vehicle device 2703), and/or a server (e.g., server 2701). While the descriptions of process 2930 provided below use vehicle 2702 as an example, one skilled in the art would appreciate that one or more steps of process 2930 may be performed by a vehicle device and/or a server.

At step 2931, vehicle 2702 may be configured to receive, from a camera of the host vehicle, one or more images captured from an environment of the host vehicle (as described elsewhere in this disclosure).

At step 2932, vehicle device 2703 may be configured to detect an indicator of an intersection in an environment of the host vehicle (as described elsewhere in this disclosure). In some embodiments, a surface of road segment in a lane forward of the host vehicle includes no markings indicating a location for stopping.

At step 2933, vehicle device 2703 may be configured to receive map information including a stop line location relative to the intersection. For example, vehicle device 2703 may receive map information including a stop line location (e.g., dotted line 2831 illustrated in FIG. 28) from server 2701. In some embodiments, vehicle 2702 may receive the map information before it approaches the intersection. For example, vehicle 2702 may receive the map information after server 2701 updates the map information relating to the intersection (e.g., as part of regular updates of the road navigation model).

At step 2934, vehicle 2702 may be configured to cause, based on the stop line location relative to the intersection, the host vehicle to perform at least one navigational action relative to the intersection. For example, vehicle 2702 may cause vehicle 2702 to brake and stop vehicle 2702 before reaching dotted line 2831 illustrated in FIG. 28. Alternatively or additionally, vehicle 2702 may cause vehicle 2702 to slow down when approaching the intersection (e.g., within a predetermined distance from the stop line location).

Infrastructure Mapping and Layered Output

An accurate, comprehensive, up-to-date digital map may be essential for autonomous vehicles and drivers to navigate along roads. The driving environment, however, is often subject to constant changes, and a map relied on by a vehicle or a driver may not capture the information the vehicle or driver needs to navigate in the environment. For example, a map may not be updated in time to reflect a new traffic light installed at an intersection. Thus, it may be desirable to generate or update a map to include changes to the environment In addition, a map may not have information relating to the precise positions of infrastructure objects, such as manhole covers, because it may be time consuming and costly to acquire the information. It may be desirable to include the information relating to infrastructure objects in a map to help a driver or vehicle to navigate (e.g., avoiding some potential hazard posed by a manhole cover). Having such information may also help a municipality for urban development and planning.

The systems and methods disclosed herein may identify one or more objects associated with a road segment in images captured by a plurality of vehicles (or an image capture device associated with a vehicle) when they drive along the road segment. The systems and methods may also determine position indicators of each of the identified objects. The systems and methods may further correlate the position indicators for each of the identified objects and determine a refined position for each of the identified objects. The systems and methods may also generate a map including representation of the refined position of at least one of the objects.

Figure 30:
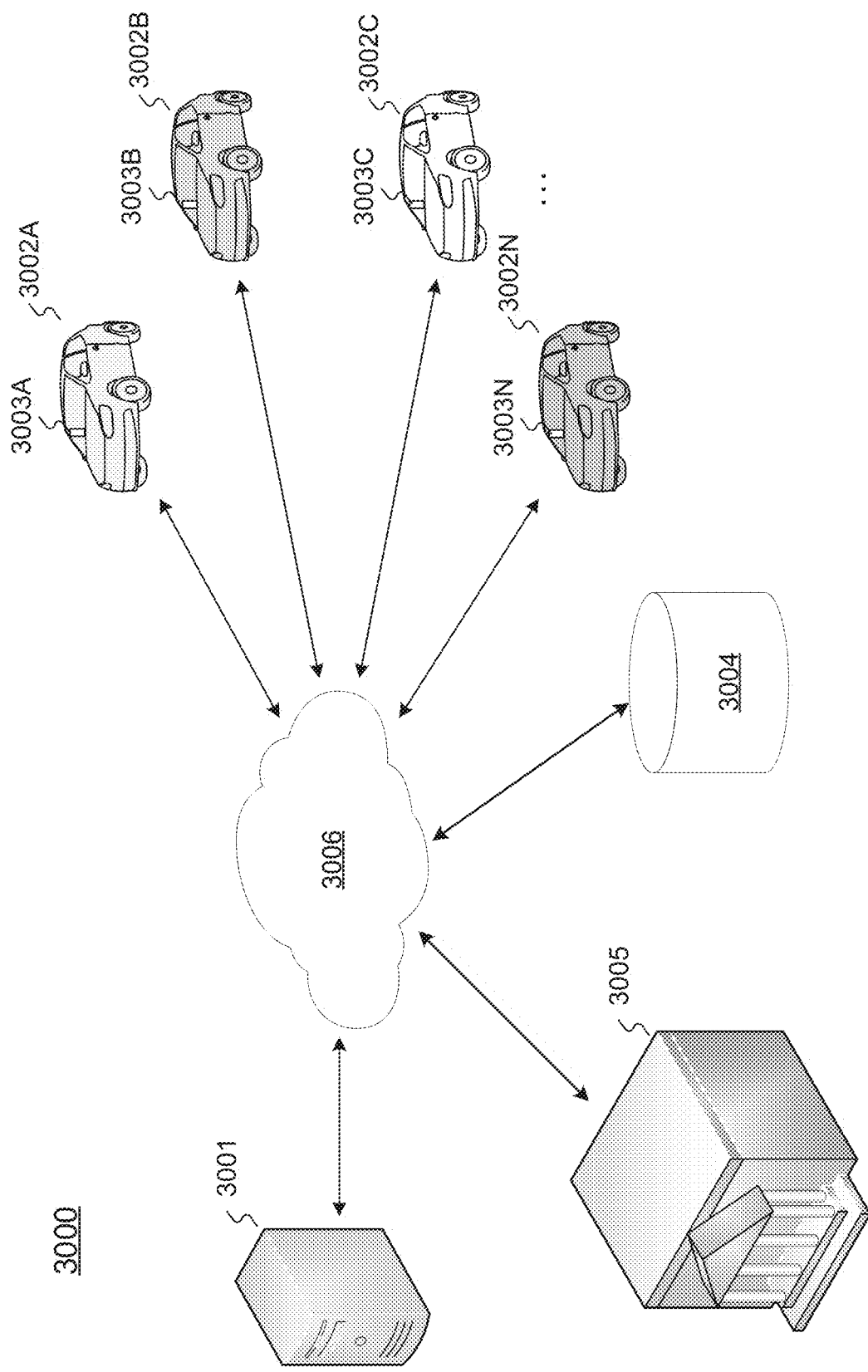
FIG. 30 is a illustrates an exemplary system for generating map information, consistent with the disclosed embodiments.

FIG. 30 illustrates an exemplary system 3000 for generating map information, consistent with the disclosed embodiments. As illustrated in FIG. 30, system 3000 may include a server 3001, one or more vehicles 3002 (e.g., vehicles 3002A, 3002B, 3002C, . . . , 3002N) and one or more vehicle devices 3003 associated with a vehicle (e.g., vehicle devices 3003A, 3003B, 3003C, . . . , 3003N), a database 3004, an external entity 3005, and a network 3006. Server 3001 may be configured to general map information based on information received from one or more vehicles (or a device associated with a vehicle). Vehicle 3002 and/or vehicle device 3003 may be configured to capture one or more images from the environment and transmit the one or more images to server 3001. Database 3004 may be configured to store information for the components of system 3000 (e.g., server 3001, vehicle 3002, vehicle device 3003, and/or external entity 3005). Network 3006 may be configured to facilitate communications among the components of system 3000.

Server 3001 may be configured to receive one or more images (or a plurality of images) from each of a plurality of vehicles 3002 (and/or vehicles 3002). Server 3001 may also be configured to analyze the images and identify representations of a plurality of objects that belong to at least one predetermined category of objects. Server 3001 may further be configured to determine position indicators for each of the plurality of objects relative to the road segment. Server 3001 may also be configured to correlate the position indicators for each of the plurality of objects. In some embodiments, the correlating may include determining refined positions of each object based on the determined position indicators. Server 3001 may further be configured to generate a map including representations of the refined positions of one or more of the plurality objects that belong to the particular predetermined category of objects based on the refined positions of objects belonging to a particular predetermined category of objects. In some embodiments, server 3001 may transmit the generated map to one or more vehicles 3002 and/or an external entity 3005. In some embodiments, server 3001 may be a cloud server that performs the functions disclosed herein. The term "cloud server" refers to a computer platform that provides services via a network, such as the Internet. In this example configuration, server 3001 may use virtual machines that may not correspond to individual hardware. For example, computational and/or storage capabilities may be implemented by allocating appropriate portions of desirable computation/storage power from a scalable repository, such as a data center or a distributed computing environment. In one example, server 3001 may implement the methods described herein using customized hard-wired logic, one or more Application Specific Integrated Circuits (ASICs) or Field Programmable Gate Arrays (FPGAs), firmware, and/or program logic which, in combination with the computer system, cause server 3001 to be a special-purpose machine.

Vehicle 3002 and/or vehicle device 3003 may be configured to capture one or more images when vehicle 3002 drives along a road segment. Vehicle 3002 and/or vehicle device 3003 may also be configured to transmit the one or more images to server 3001 for identifying one or more objects in the image(s).

Database 3004 may include a map database configured to store map data for the components of system 3000 (e.g., server 3001, vehicle 3002, vehicle device 3003, and/or external entity 3005). In some embodiments, server 3001, vehicle 3002, vehicle device 3003, and/or external entity 3005 may be configured to access database 3004, and obtain data stored from and/or upload data to database 3004 via network 3006. For example, server 3001 may transmit data relating to one or more maps to database 3004 for storage. Vehicle 3002, vehicle device 3003, and/or external entity 3005 may download data relating to one or more maps from database 3004. In some embodiments, database 3004 may include data relating to objects, such as infrastructure objects, which may include manhole covers, traffic lights, utility boxes, bus stops, sewer entrances, buildings, or the like, or a combination thereof. In some embodiments, database 3004 may include a database similar to map database 160 described elsewhere in this application.

External entity 3005 (or a computing device associated with external entity 3005) may be configured to receive data from server 3001. For example, server 3001 may transmit a generated map as described elsewhere in this disclosure to external entity 3005 via, for example, network 3006. Alternatively or additionally, server 3001 may transmit information relating to one or more objects identified in one or more images as described elsewhere in this disclosure (e.g., a refined position of a bus stop along a road segment).

Network 3006 may be any type of network (including infrastructure) that provides communications, exchanges information, and/or facilitates the exchange of information between the components of system 3000. For example, network 3006 may include or be part of the Internet, a Local Area Network, wireless network (e.g., a Wi-Fi/302.11 network), or other suitable connections. In other embodiments, one or more components of system 3000 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

Figure 31:
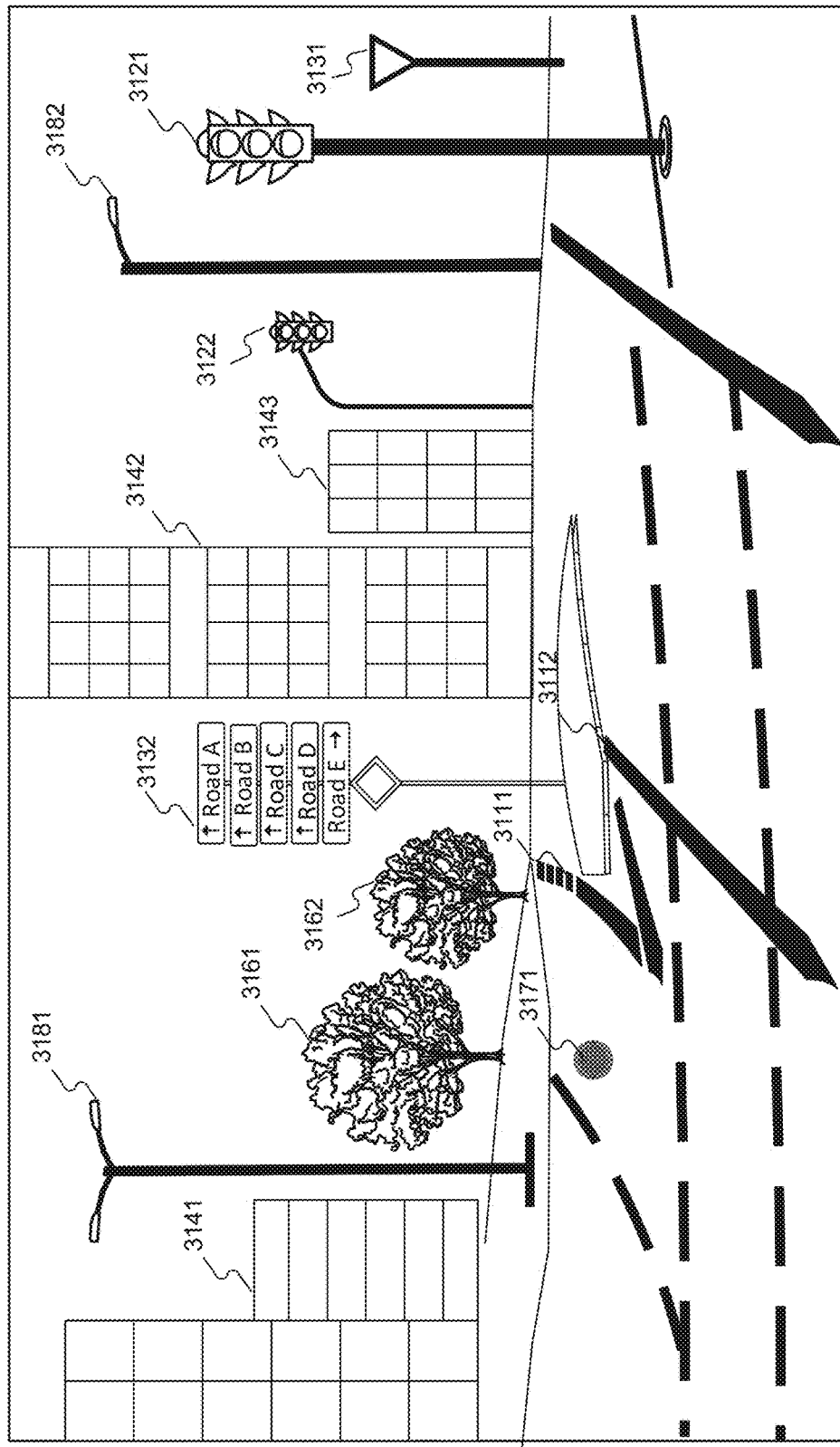
FIG. 31 shows an exemplary image of a vehicle's surrounding environment, consistent with the disclosed embodiments.

FIG. 31 illustrates an exemplary image 3100 captured by an imaging capture device Image 310 represents the environment of a vehicle. For example, vehicle 3002 may include a camera configured to capture one or more images from the environment when vehicle 3002 drives along a road segment. Vehicle 3002 may receive the one or more images from the camera. Vehicle 3002 may also transmit the image to server 3001. Server 3001 may be configured to analyze the image and identify lane markings 3111 and 3112 based on the analysis of the image. Server 3001 may also identify objects such as traffic lights 3121 and 3122, road signs 3131 and 3132, buildings 3141, 3142, and 3143, trees 3161 and 3162, manhole cover 3171, and streetlamps 3181 and 3182.

Figure 32:
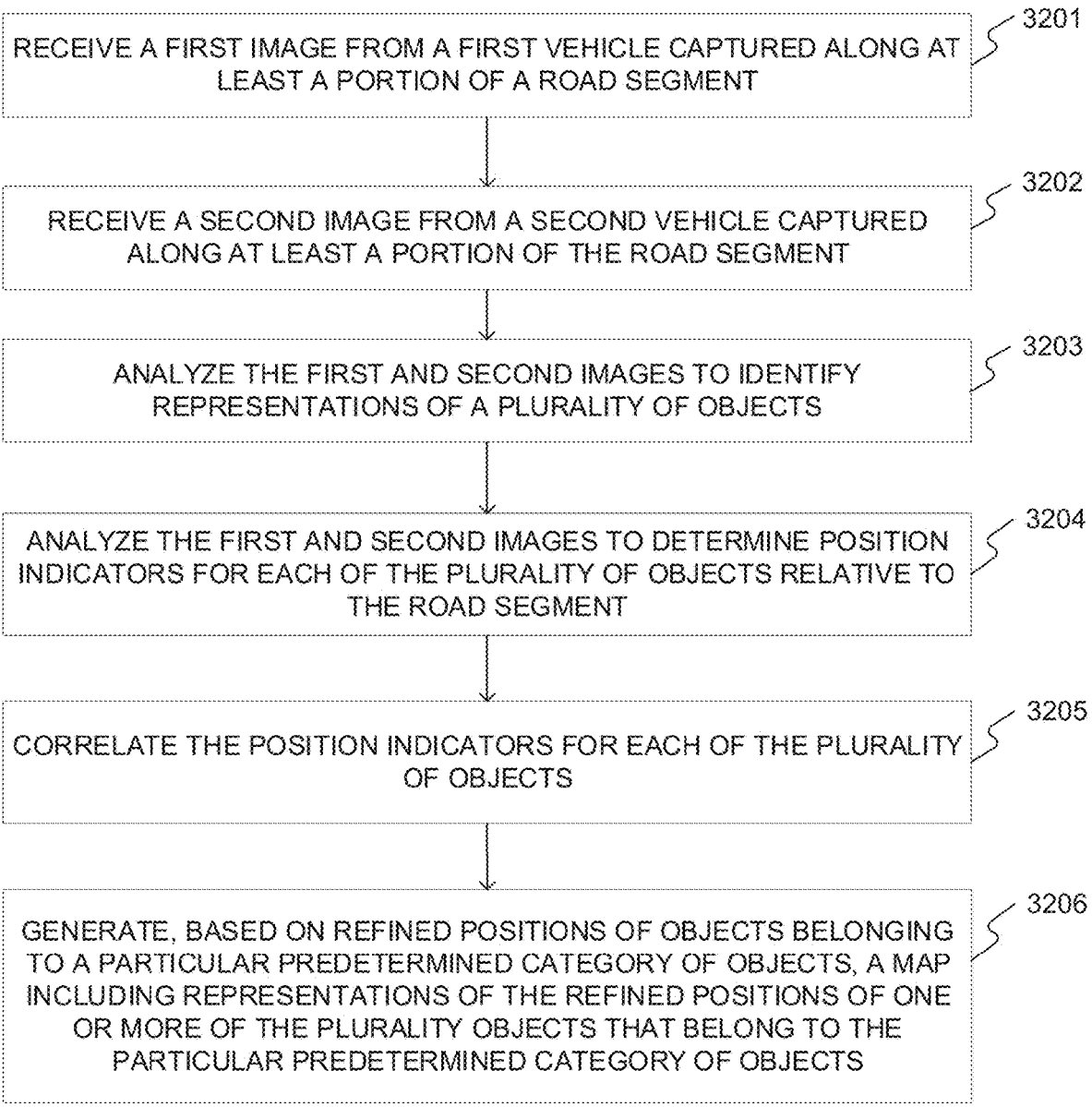
FIG. 32 is a flowchart showing an exemplary process for generating map information, consistent with disclosed embodiments.

FIG. 32 is a flowchart showing an exemplary process 3200 for generating map information, consistent with disclosed embodiments. One or more steps of process 3200 may be performed by a vehicle (e.g., vehicle 3002), a device associated with the vehicle (e.g., vehicle device 3003), a server (e.g., server 3001), and/or an external entity (e.g., external entity 3005). While the descriptions of process 3200 provided below use server 3001 as an example, one skilled in the art would appreciate that one or more steps of process 3200 may be performed by a vehicle, a vehicle device, and/or an external entity.

At step 3201, a first image captured by a camera associated with a first vehicle during a drive of the first vehicle along at least a portion of a road segment may be received. For example, when vehicle 3002A drives along a road segment, a camera installed on vehicle 3002A (which may be similar to image acquisition unit 120 as described elsewhere in this disclosure) may capture one or more images from the environment of vehicle 3002A. By way of example, exemplary image 3100 illustrated in FIG. 31 may be an image captured by a camera of vehicle 3002A during a drive of vehicle 3002A along a road segment. Vehicle 3002A may transmit the one or more images to server 3001. In some embodiments, vehicle 3002A may also transmit the information relating to the drive along the road segment. For example, vehicle 3002A may determine GPS coordinates of its position(s) when the one or more images were captured. In some embodiments, vehicle 3002A and/or server 3001 may associate the one or more images with the road segment.

In some embodiments, the camera may be configured to capture the images continuously or intermittently. Alternatively, the camera may be configured to capture the images based on a trigger event. For example, server 3001 may transmit an instruction to vehicle 3002A, which may instruct the camera to capture one or more images based on the capture instruction. By way of example, server 3001 may transmit an instruction to vehicle 3002A to capture one or more images around a particular area or along a particular road segment. The camera associated with vehicle 3002A may be configured to capture one or more images when vehicle 3002A drives in the area or along the road segment (e.g., based on GPS signals received from a GPS sensor of vehicle 3002).

In some embodiments, vehicle 3002A may transmit the one or more images to server 3001 continuously or intermittently. Alternatively, the vehicle may transmit the one or more images when it has access to a more reliable and/or faster network (e.g., via a WIFI connection). Alternatively or additionally, the vehicle may transmit the one or more images upon or after a request received from server 3001. For example, server 3001 may send a request to vehicle 3002A for one or more images relating to a particular area and/or a particular road segment. Vehicle 3002A may transmit to server 3001 one or more images captured during a drive in the area and/or along the road segment.

At step 3202, a second image captured by a camera associated with a second vehicle during a drive of the second vehicle along at least a portion of the road segment may be received. For example, when vehicle 3002B drives along the road segment (the same road segment along which vehicle 3002A drives described above in connection to step 3201), a camera installed on vehicle 3002B (which may be similar to image acquisition unit 120 as described elsewhere in this disclosure) may capture one or more images from the environment of vehicle 3002B. Vehicle 3002B may transmit the one or more images to server 3001. In some embodiments, vehicle 3002B may also transmit the information relating to the drive along the road segment as described above in connection to step 3201.

In some embodiments, the camera of the second vehicle may capture one or more images in a similar manner as the camera associated with the first vehicle described above in connection to step 3201. For example, the camera of vehicle 3002B may capture one or more images upon an instruction received from server 3001.

In some embodiments, the second vehicle may transmit the one or more images to server 3001 in a similar manner as the first vehicle described above in connection to step 3201. For example, the second vehicle may transmit the one or more images to server 3001 upon or after a request received from server 3001.

In some embodiments, server 3001 may receive one or more images captured by a camera associated with one or more additional vehicles (e.g., vehicle 3002B, 3002C, . . . , 3002N illustrated in FIG. 30) when each of the vehicles drives along at least a portion of the road segment.

At step 3203, the first and second images may be analyzed to identify representations of a plurality of objects that belong to at least one predetermined category of objects. For example, server 3001 may be configured to analyze the first and second images and identify representations of a plurality of objects in the images based on the analysis of the images. By way of example, image 3100 illustrated in FIG. 31 may be the first image captured by the camera of vehicle 3002A. Server 3001 may be configured to analyze the image and identify the representation of one or more objects in the image. For example, server 3001 may identify in the image the representations of lane markings 3111 and 3112 (e.g., the first category of objects), traffic lights 3121 and 3122 (e.g., the second category of objects), road signs 3131 and 3132 (e.g., the third category of objects), buildings 3141, 3142, and 3143 (e.g., the fourth category of objects), trees 3161 and 3162 (e.g., the fifth category of objects), manhole cover 3171 (e.g., the sixth category of objects), and streetlamps 3181 and 3182 (e.g., the seventh category of objects), based on the analysis of the image. Server 3001 may be configured to analyze the second image captured by the camera of vehicle 3002B and identify the representations of one or more objects included in the second image. For example, server 3001 may identify from the second image traffic light 3121, road sign 3132, building 3141, trees 3161 and 3162, manhole cover 3171, and streetlamp 3181, which correspond to the same objects identified in the first image (e.g., image 3100 illustrated in FIG. 31).

In some embodiments, at least one predetermined category of objects may include infrastructure objects. Exemplary infrastructure objects may include manhole covers, traffic lights, utility boxes, bus stops, sewer entrances, buildings, or the like, or a combination thereof.

In some embodiments, one type of object may belong to one object category. For example, manhole covers may belong to a first object category (e.g., the manhole category), traffic lights may belong to a second object category (e.g., the traffic-light category), and so on. In some embodiments, one type of object may be further divided into one or more sub-categories. For example, traffic lights for vehicles (e.g., red-orange-red traffic lights) may belong to a subcategory of traffic lights, and traffic lights for pedestrians (e.g., pedestrian traffic lights having countdown timers) may belong to another subcategory of traffic lights.

In some embodiments, server 3001 may use a machine learning model to identify one or more objects in an image. For example, server 3001 may obtain or use a trained machine learning model for identifying objects that belong to predetermined object categories in images. The trained machine learning model may be trained using training samples of labeled objects and images. Server 3001 may input the images received into the trained machine learning model, which may output one or more identified objects that belong a predetermined category of objects in the images. As another example, server 3001 may use an artificial neural network trained for identifying one or more objects in images.

In some embodiments, server 3001 may also be configured to obtain information relating to the identified object(s). For example, server 3001 may identify a traffic light and obtain information of the traffic light (e.g., the height of the traffic light) from database 3004 or a third party.

One skilled in the art would understand that, in some embodiments, server 3001 may receive an image (or a set of images) from one or more additional vehicles (e.g., vehicle 3002C, . . . , vehicle 3002N). Server 3001 may also analyze the images and identify one or more objects that belong to the predetermined category in the images.

At step 3204, the first and second images may be analyzed to determine position indicators for each of the plurality of objects relative to the road segment. For example, server 3001 may analyze the first and second images and determine a height for each of the identified objects relative to the road segment (e.g., a height of an object relative to the ground level of the road segment, or a height of an object relative to a road plane or a height of an object relative to a road surface) based on the image analysis. Alternatively or additionally, server 3001 may analyze the first and second images and determine position indicators for each of the plurality of objects relative to a planar surface having a slope that is an approximation of the road surface ahead of the vehicle based on the image analysis. This approximation may be achieved by fitting a road planar model to the surface of the road segment ahead of the vehicle and by smoothing the surface of the road ahead of the vehicle and calculating the slope of the road surface. The slope may be calculated relative to one or more reference planes (e.g., the ground plane).

Exemplary position indicators may include a height from a known reference point (e.g., the ground level of the road segment), a distance from a known reference point (e.g., one of side boundaries of the road segment), an orientation (or an angle) relative to a known reference point (e.g., facing one direction of the road segment), 2-dimensional (2D) and/or 3-dimensional (3D) coordinates of an object relative to the road segment, or the like, or a combination thereof.

In some embodiments, server 3001 may use a machine learning model to determine position indicators for each of the plurality of objects relative to the road segment. For example, server 3001 may obtain or use a trained machine learning model for determining position indicators for objects relative to the road segment. The trained machine learning model may be trained using training samples of labeled position indicators associated with objects, objects, and/or images. Server 3001 may input the images received into the trained machine learning model, which may output position indicators for each of the plurality of objects relative to the road segment. As another example, server 3001 may use an artificial neural network trained for determining position indicators for each of the plurality of objects relative to the road segment.

One skilled in the art would understand that, in some embodiments, server 3001 may determine position indicators for each of the plurality of objects relative to the road segment identified in one or more images received from one or more additional vehicles (e.g., vehicle 3002C, . . . , vehicle 3002N).

At step 3205, the position indicators for each of the plurality of objects may be correlated. In some embodiments, the correlating may include determining refined positions of each object based on the determined position indicators. For example, server 3001 may correlate a first position indicator for an identified object relative to the road segment determined based on the first image with a second position indicator for the same object relative to the road segment determined based on the second image. Server 3001 may also determine a final position indicator (or a refined position) for this object based on the first and second position indicators. For example, correlating may include averaging position information collected for a particular object. By way of example, server 3001 may determine a first height of a traffic light (i.e., an identified object) being 5 meters from the ground based on the analysis of the first image and determine a second height of the same traffic light being 4.5 meters from the ground based on the analysis of the second image. Server 3001 may determine a final height of the traffic light being 4.75 meters by averaging the first and second heights.

In some embodiments, server 3001 may determine a position indicator for each of the plurality of objects relative to the road segment identified in the images received from three or more vehicles as described elsewhere in this disclosure. Server 3001 may also correlate position indicators for each of the same objects identified in at least some of the images. For example, server 3001 may correlate position indicators for the same object identified in 20 images (or image sets) received from 20 different vehicles. Server 3001 may determine a refined position of the object by, for example, obtaining a mean or median of 20 position indicators. Alternatively, server 3001 may first filter out one or more outliers from 20 position indicators (e.g., by removing a position indicator that is 3.4 standard deviations above or below the median or mean of 20 position indicators). Server 3001 may then obtain a mean or median of the remaining position indicators as the refined position of the object.

In some embodiments, the correlating position indicators may include aggregating objects identified in the images. For example, server 3001 may aggregate one or more objects that belong to a first category of objects identified in the first image and one or more objects that belong to the same category of objects identified in the second image. Server 3001 may also remove one or more duplicate objects from the aggregated objects. Alternatively, server 3001 may keep one or more identified objects that appear in both the first and second images. Server 3001 may eliminate one or more identified objects that appear in only one of the first and second images. Server 3001 may also correlate position indicators for each of the aggregated objects as described elsewhere in this disclosure.

In some embodiments, server 3001 may aggregate the objects identified in the images received from three or more vehicles, including the first and second images. For example, server 3001 may aggregate one or more objects that belong to a first category of objects identified in the first image (received from, for example, vehicle 3002A), the second image (received from, for example, vehicle 3002B), and third image (received from, for example, vehicle 3002C). Server 3001 may also remove one or more duplicate objects from the aggregated objects. Alternatively, server 3001 may keep one or more identified objects that appear in all first, second, and third images. Server 3001 may eliminate one or more identified objects that appear in only a subset of the images (e.g., identified only in the first and third images, but not in the second image). Alternatively, server 3001 may determine a count number of the appearance of an identified object in the images. Server 3001 may keep the object if the count number equals or exceeds a threshold. For example, the threshold may be three, and server 3001 may determine that an identified object appears three times out of four images (e.g., four images received from four different vehicles). Server 3001 may keep this identified object. As another example, server 3001 may determine that another identified object appears only once among the four images and may eliminate this identified object. Server 3001 may also correlate position indicators for each of the aggregated objects as described elsewhere in this disclosure.

At step 3206, a map including representations of the refined positions of one or more of the plurality objects that belong to the particular predetermined category of objects may be generated based on the refined positions of objects belonging to a particular predetermined category of objects. For example, server 3001 may generate a map including representations of the refined positions of bus stops associated with the road segment based on the refined positions of the bus stops. By way of example, server 3001 may generate a 2D and/or 3D map by modifying a digital map by adding or updating the bus stops based on their refined positions. In some embodiments, server 3001 may add or modify information relating to the objects in the map. For example, server 3001 may add schedule information relating to the bus stops (e.g., estimated arrival time of a bus arriving at a bus stop) into the map.

In some embodiments, server 3001 may generate a map including representations of the refined positions of one or more of a plurality objects that belong to a first predetermined category of objects and representations of the refined positions of one or more of a plurality objects that belong to a second predetermined category of objects. For example, server 3001 may generate a map including representations of the refined positions of the bus stops and representations of the refined positions of the traffic lights identified in the images. In some embodiments, server 3001 may generate a first layer in the map associated with objects of the first object type (or category) and a second layer in the map associated with the second object type (or category). Optionally, server 3001 may include a setting for activating and deactivating one or more layers in the map. For example, the map may show the layer of streetlamps if the layer is activated based on the setting. On the other hand, if the layer of streetlamps is deactivated based on the setting, at least some of the streetlamps may not be shown in the.

In some embodiments, server 3001 may transmit the generated map to one or more vehicles 3002 (and/or a vehicle device 3003 associated with vehicle 3002) via, for example, network 3006. Alternatively or additionally, server 3001 may store the generated map into a database (e.g., database 3004). Vehicle 3002 (and/or vehicle 3002) may access the database and receive the generated map via network 3006.

In some embodiments, server 3001 may transmit the generated map to external entity 3005 (or a computing device associated with the external entity) via, for example, network 3006. In some embodiments, external entity 3005 may include a municipality. In some embodiments, external entity 3005 may include an entity acting on behalf or at the direction of a municipality or other governing entity.

Aggregation and Reporting of Observed Dynamic Conditions

As described above, the driving environment may often be subject to constant changes, which may pose challenges to drivers and autonomous vehicles. Identifying dynamic conditions and informing drives and vehicles of the conditions may help them to avoid unexpected conditions when navigating. Additionally, having such information may also help corporations, agencies, regulators, institutes, and/or municipalities for urban development and planning.

The systems and methods disclosed herein may identify one or more conditions that have at least one dynamic characteristic associated with a road segment in images received from one or more vehicles. The systems and methods may also determine an identifier associated with the condition(s) and update a database record to include the identifier.

Figure 33:
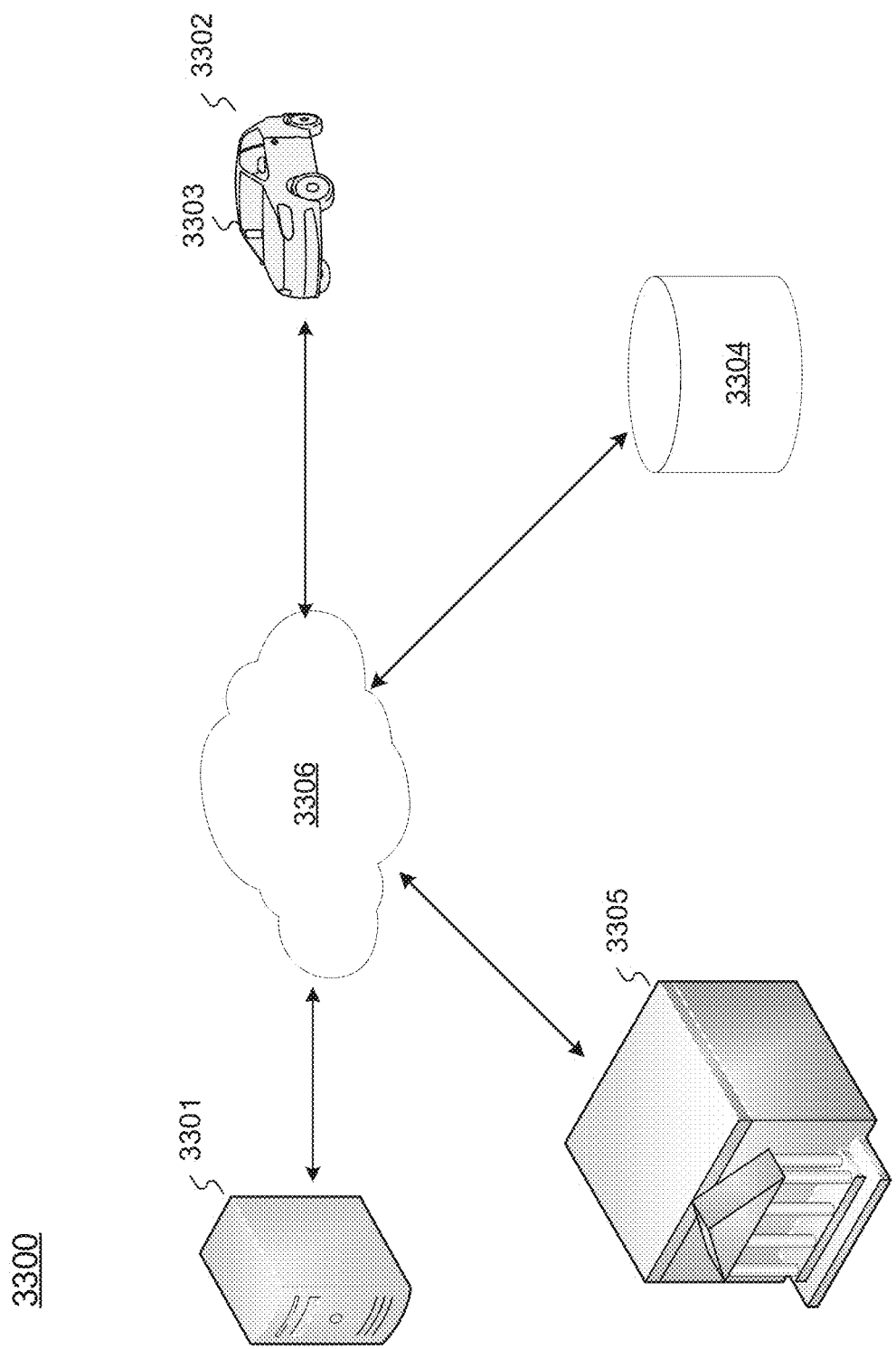
FIG. 33 illustrates an exemplary system for collecting condition information associated with a road segment, consistent with the disclosed embodiments.

FIG. 33 illustrates an exemplary system 3300 for collecting condition information associated with a road segment, consistent with the disclosed embodiments. As illustrated in FIG. 30, system 3300 may include a server 3301, one or more vehicles 3302 and one or more vehicle devices 3303 associated with vehicle 3302, a database 3304, an external entity 3305, and a network 3306. Server 3301 may be configured to update a database record to include an identifier associated with a condition that has at least one dynamic characteristic. The identifier and/or the condition may be determined based on one or more images captured by a camera associated with a vehicle. Vehicle 3302 and/or vehicle device 3303 may be configured to capture one or more images from the environment. Database 3304 may be configured to store information for the components of system 3300 (e.g., server 3301, vehicle 3302, vehicle device 3303, and/or external entity 3305). For example, vehicle device 3303 may be configured to store database records including one or more identifiers associated with one or more dynamical conditions. Network 3306 may be configured to facilitate communications among the components of system 3300.

Server 3301 may be configured to obtain an identifier associated with a condition that has at least one dynamic characteristic. Server 3301 may also be configured to update a database record to include the identifier and transmit the database record to at least one entity (e.g., vehicle 3302, vehicle device 3303, and/or external entity 3305). In some embodiments, server 3301 may be a cloud server that performs the functions disclosed herein. The term "cloud server" refers to a computer platform that provides services via a network, such as the Internet. In this example configuration, server 3301 may use virtual machines that may not correspond to individual hardware. For example, computational and/or storage capabilities may be implemented by allocating appropriate portions of desirable computation/storage power from a scalable repository, such as a data center or a distributed computing environment. In one example, server 3301 may implement the methods described herein using customized hard-wired logic, one or more Application Specific Integrated Circuits (ASICs) or Field Programmable Gate Arrays (FPGAs), firmware, and/or program logic which, in combination with the computer system, cause server 3301 to be a special-purpose machine.

Vehicle 3302 and/or vehicle device 3303 may be configured to capture one or more images representative of the environment of vehicle 3302. In some embodiments, vehicle 3302 and/or vehicle device 3303 may be configured to transmit the one or more images to server 3301 and/or external entity 3305. Alternatively or additionally, vehicle 3302 and/or vehicle device 3303 may be configured to analyze the one or more images to identify one or more conditions that have at least one dynamic characteristic. Vehicle 3302 and/or vehicle device 3303 may also be configured to analyze the one or more images to determine one or more identifiers associated with the condition(s). Vehicle 3302 and/or vehicle device 3303 may further be configured to transmit the identifier(s) and/or condition(s) to server 3301 and/or external entity 3305 via, for example, network 3306.

Database 3304 may be configured to store information and data for the components of system 3300 (e.g., server 3301, vehicle 3302, vehicle device 3303, and/or external entity 3305). For example, database 3304 may store images received from server 3301, vehicle 3302, vehicle 3302, and/or external entity 3305. As another example, database 3304 may store database records. In some embodiments, server 3301, vehicle 3302, vehicle device 3303, and/or external entity 3305 may be configured to access database 3304, and obtain data stored from and/or upload data to database 3304 via network 3306.

External entity 3305 (or a computing device associated with external entity 3305) may be configured to receive data from server 3301. For example, server 3301 may transmit database records as described elsewhere in this disclosure to external entity 3305 via, for example, network 3306.

Network 3306 may be any type of network (including infrastructure) that provides communications, exchanges information, and/or facilitates the exchange of information between the components of system 3300. For example, network 3306 may include or be part of the Internet, a Local Area Network, wireless network (e.g., a Wi-Fi/302.11 network), or other suitable connections. In other embodiments, one or more components of system 3300 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

Figure 34A:
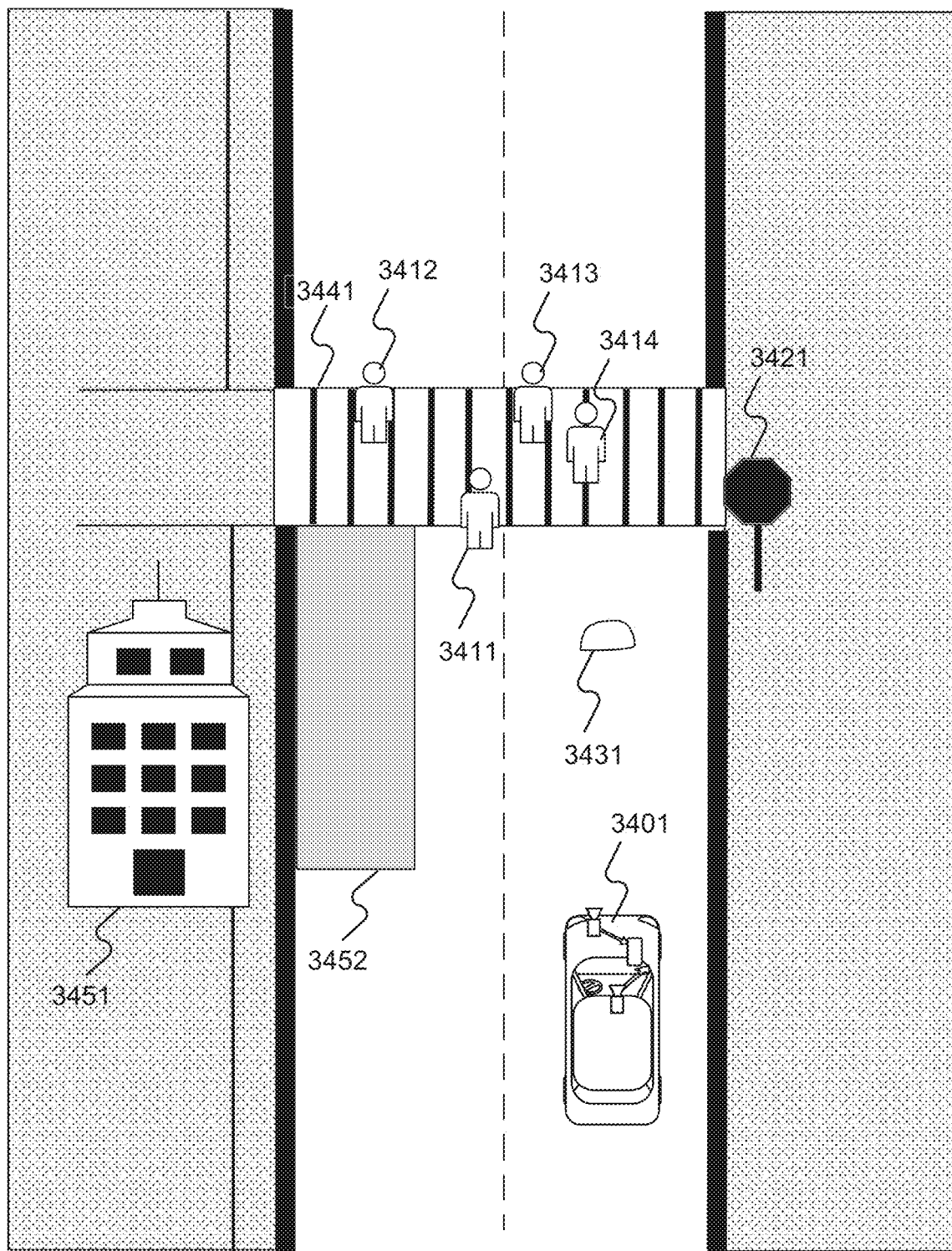
FIGS. 34A, 34B, and 34C illustrate exemplary environments of a vehicle, consistent with the disclosed embodiments.

FIG. 34A illustrates an exemplary environment 3400 of a vehicle, consistent with the disclosed embodiments. As illustrated in FIG. 34A, a vehicle 3401 may drive along a road segment. A camera of vehicle 3401 may capture an image representative of the environment of vehicle 3401 (e.g., environment 3400). The image may include representations of various objects in environment 3400. For example, the image may include representation of pedestrians 3411-3414, stop sign 3421, pothole 3431, crosswalk 3441, building 3451, and construction site 3452. Vehicle 3401 (and/or server 3301) may be configured to analyze the image to identify one or more conditions that have at least one dynamic characteristic as described elsewhere in this disclosure. Vehicle 3401 (and/or server 3301) may further be configured to analyze the image to determine at least one identifier associated with the identified condition(s) as described elsewhere in this disclosure.

Figure 35A:
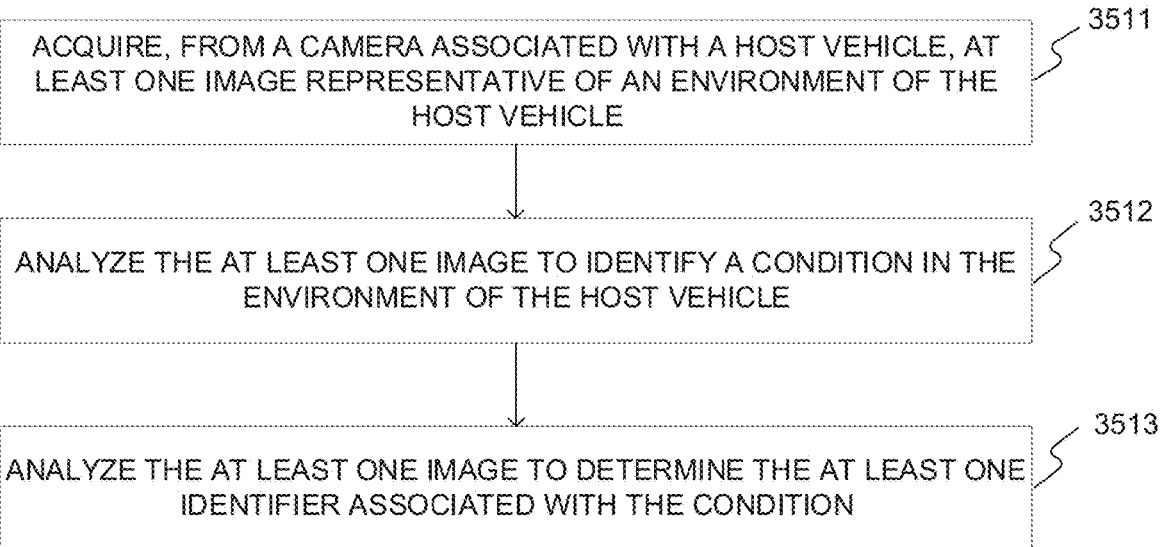
FIG. 35A is a flowchart showing an exemplary process for determining a condition having at least one dynamic characteristic, consistent with disclosed embodiments.

FIG. 35A is a flowchart showing an exemplary process 3510 for determining a condition having at least one dynamic characteristic, consistent with disclosed embodiments. One or more steps of process 3510 may be performed by a vehicle (e.g., vehicle 3302), a device associated with the vehicle (e.g., vehicle device 3303), a server (e.g., server 3301), and/or an external entity (e.g., external entity 3305). While the descriptions of process 3510 provided below use vehicle 3302 as an example, one skilled in the art would appreciate that one or more steps of process 3510 may be performed by a server, a vehicle device, and/or an external entity.

At step 3511, at least one image representative of an environment of a vehicle may be acquired. For example, at least one image representative of an environment of a vehicle may be acquired from a camera associated with the host vehicle. By way of example, as illustrated in FIG. 34, vehicle 3401 may drive along a road segment, and a camera installed on vehicle 3401 (which may be similar to image acquisition unit 120 as described elsewhere in this disclosure) may capture one or more images from the environment of vehicle 3401 (e.g., environment 3400).

In some embodiments, vehicle 3401 may transmit the one or more images to server 3301. In some embodiments, vehicle 3401 may also transmit the information relating to the drive along the road segment. For example, vehicle 3401 may determine GPS coordinates of its position(s) when the one or more images were captured. In some embodiments, vehicle 3401 and/or server 3301 may associate the one or more images with the road segment.

In some embodiments, the camera may be configured to capture the images continuously or intermittently. Alternatively, the camera may be configured to capture the images based on a trigger event. For example, server 3301 may transmit an instruction to vehicle 3401, which may instruct the camera to capture one or more images based on the capture instruction. By way of example, server 3301 may transmit an instruction to vehicle 3401 to capture one or more images around a particular area or along a particular road segment. The camera associated with vehicle 3401 may be configured to capture one or more images when vehicle 3401 drives in the area or along the road segment (e.g., based on GPS signals received from a GPS sensor of vehicle 3002).

In some embodiments, vehicle 3401 may transmit the one or more images to server 3301 continuously or intermittently. Alternatively, the vehicle may transmit the one or more images when it has access to a more reliable and/or faster network (e.g., via a WIFI connection). Alternatively or additionally, the vehicle may transmit the one or more images upon or after a request received from server 3301. For example, server 3301 may send a request to vehicle 3401 for one or more images relating to a particular area and/or a particular road segment. Vehicle 3401 may transmit to server 3301 one or more images captured during a drive in the area and/or along the road segment.

In some embodiments, server 3301 may receive one or more images (or one or more sets of images) representative of an environment of each of a plurality of vehicles from the vehicles (and/or a vehicle device associated with a vehicle) via, for example, network 3306.

At step 3512, the at least one image may be analyzed to identify a condition that has at least one dynamic characteristic in the environment of the host vehicle. A dynamic characteristic refers to any aspect of a condition that changes over a period of time (e.g., a week, a day, an hour, a minute, or seconds) and/or in response to a trigger event. In some embodiments, the at least one dynamic characteristic may include a positional characteristic, a temporal characteristic, or the like, or a combination thereof. The condition may relate to the presence in an environment of one or more objects, one or more persons, and/or one or more animals. A condition may also refer to an event such as a traffic jam. A dynamic characteristic may include a characteristic of an object that is capable of moving or changing over a period of time, and/or in response to a trigger event. For example, a condition having a dynamic characteristic may include an object that is in motion and identified in one or more images (e.g., a pedestrian crossing a crosswalk, and/or an object that is not in motion (as indicated in the one or more images) but is capable of moving (e.g., a pedestrian standing by the edge of a road segment). Exemplary conditions that have at least one dynamic characteristic may include conditions relating to a crosswalk, a construction site, an overhead branch, a traffic jam, a bus stop, a bike lane, a road condition (e.g., a pothole or crack), a vehicle, a bus, a bicycle, a pedestrian, or the like, or a combination thereof. For example, conditions may include one or more overhead branches, a traffic jam, a presence of one or more persons at a bus stop, or a presence of one or more bicycles in a bike lane, or the like, or a combination thereof. By way of example, the condition may include a presence of a pedestrian (e.g., pedestrians 3411-3414) walking across the road segment. Alternatively or additionally, the condition may include a condition in which a pedestrian (e.g., pedestrians 3412-3414) is walking in a crosswalk and/or a pedestrian (e.g., pedestrian 3411) is not walking in a crosswalk. Alternatively or additionally, the condition may include a presence of a bus stop occupant. Alternatively or additionally, the condition may include a presence of a vehicle traveling the road segment. Alternatively or additionally, the condition may include a presence of a bus traveling the road segment. Alternatively or additionally, the condition may include a presence of a bicycle traveling the road segment. Alternatively or additionally, the condition may include a presence of a pothole (e.g., pothole 3431) or a crack in the road segment. As another example, the condition may include a density of pedestrians in a crosswalk and/or another area (e.g., the number of pedestrians per unit of time such as an hour).

By way of example, as illustrated in FIG. 34A, the camera of vehicle 3401 may capture an image of the environment of vehicle 3401. The image may show pedestrians 3411-3414 walking across the street. Vehicle 3401 may analyze the image and identify crosswalk 3441 (and/or pedestrians 3411-3414) as a condition that has at least one dynamic characteristic given that one or more objects (or absence thereof) in crosswalk 3441 change dynamically. As another example, the image captured by the camera of vehicle 3401 may also include construction site 3452, which may block part of the left lane. Construction site 3452 may change over time. For example, the operation of construction site 3452 may stop and return the occupied space. As another example, the operation of construction site 3452 may become illegal or noncompliant if the permit is expired or the space that construction site 3452 occupies exceeds the area it is allowed. Vehicle 3401 may analyze the image and identify construction site 3452 as a condition. In some embodiments, vehicle 3302 may also be configured to analyze the image and extra information relating to the condition (e.g., a size, a location, a shape, a potential occlusion, or the like, or a combination thereof).

In some embodiments, vehicle 3302 may receive information relating to the identified condition. For example, vehicle 3302 may request and receive information relating to a construction site identified in the image from server 3301 and/or database 3304. By way of example, vehicle 3302 may receive information of the permit of the construction site (e.g., the allowed operation period).

In some embodiments, the at least one dynamic characteristic is identified through analysis of the at least one image acquired by the camera associated with the host vehicle. For example, vehicle 3401 may be configured to analyze the image and identify pothole 3431. A pothole or a crack may be a condition having at least one dynamic characteristic given that the appearance (and/or a patch) of a pothole may be transient. Such road conditions may be considered to be dynamic. As an example, a pothole (or a crack) may appear after a flood, when a truck carrying a heavy load passes. Also, the pothole may be patched up after a period of time. In another example, a pothole (and/or various other detected or reported road conditions) can be considered as dynamic object over a certain period of time or up to a certain duration, or when a certain even occurs, after which, a dynamic object may be determined to be a non-dynamic (or non-transient) fixed object and can be either classified as such in the map or can be removed and added back as a fixed object. Vehicle 3302 may also be configured to determine the size of pothole 3431 based on the image analysis (which may increase over time).

Figure 34B:
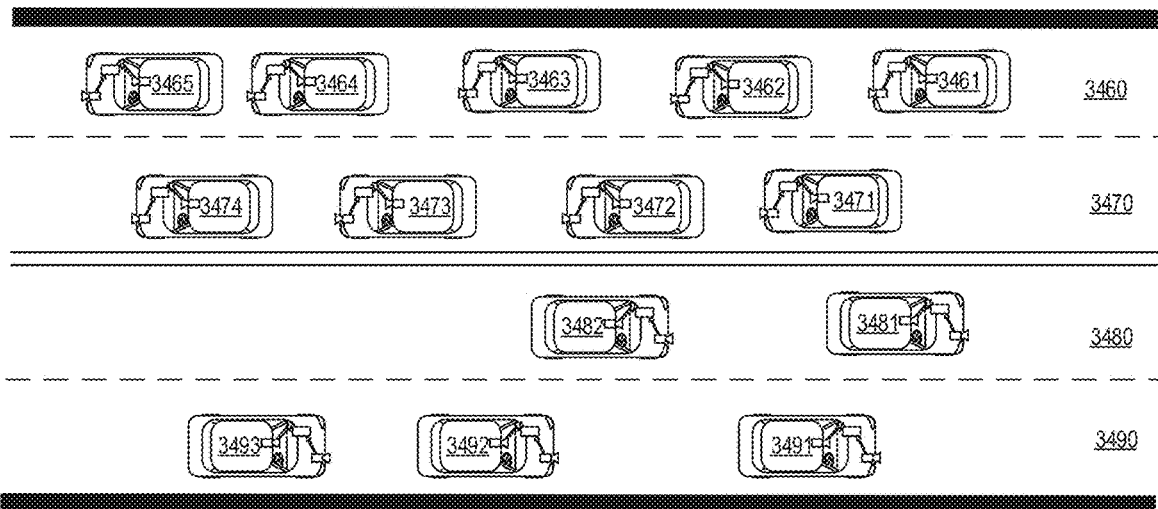
Figure 34C:
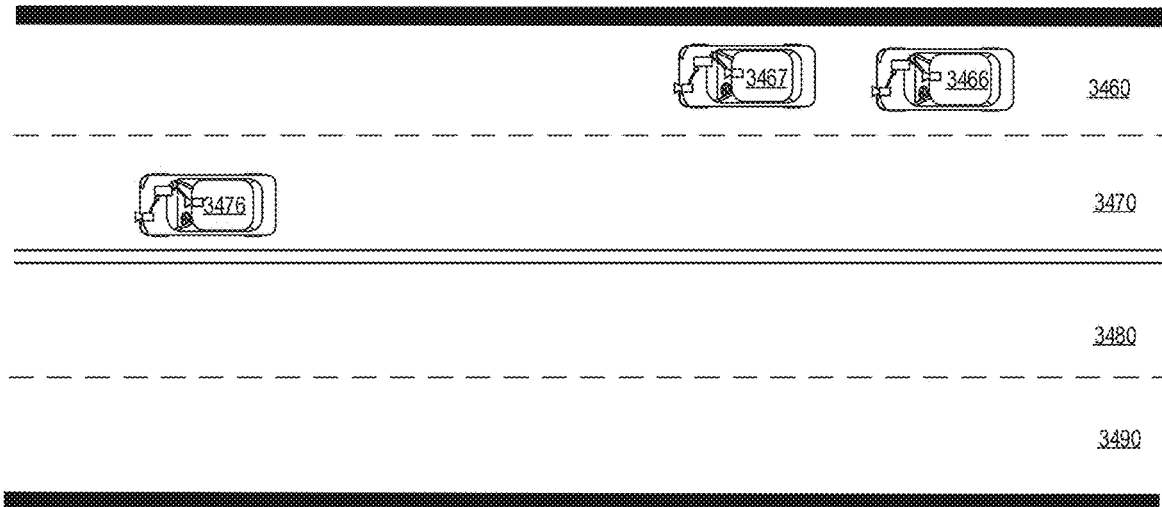

As additional examples, FIGS. 34B and 34C illustrates exemplary environment 3410 in which vehicles are in four lanes, i.e., lane 3460, lane 3470, lane 3480, and lane 3490.

As illustrated in FIG. 34B, vehicle 3461, vehicle 3462, vehicle 3463, vehicle 3464, and vehicle 3465 are in lane 3460. Vehicle 3471, vehicle 3472, vehicle 3473, and vehicle 3474 are in lane 3470. Vehicle 3481 and 3482 are in lane 3480. Vehicle 3491, 2392, and 3493 are in lane 3490. A camera of vehicle 3461 (the host vehicle in this example) may capture one or more images of the environment of vehicle 3461. The one or more images may show one or more vehicles in lane 3460 and one or more vehicles in lane 3470. Vehicle 3461 may also be configured to analyze the one or more images to identify the vehicles included in the one or more images as conditions that having at least one dynamic characteristic. In some embodiments, vehicle 3461 may further be configured to analyze the one or more images and determine a traffic jam based on the image analysis. For example, vehicle 3461 may analyze the one or more images and determine that the current speed of one or more vehicles identified in the one or more images is below a threshold speed and/or a percentage of a legal speed in the road segment. In some embodiments, vehicle 3461 may determine a traffic jam if the number of the vehicles (or a percentage of the number of the vehicles) that have a speed below threshold speed and/or a percentage of the legal speed in the road segment is equal to or greater than a threshold number (or a threshold percentage).

In the example illustrated in FIG. 34C, vehicle 3466 and vehicle 3467 are in lane 3460, and vehicle 3476 is in lane 3470. A camera of vehicle 3466 (the host vehicle in this example) may capture one or more images of the environment of vehicle 3466. The one or more images may show vehicle 3467 in lane 3460 and vehicle 3476 in lane 3470. Vehicle 3461 may also be configured to analyze the one or more images to identify the vehicles included in the one or more images as conditions that having at least one dynamic characteristic. In some embodiments, vehicle 3466 may further be configured to analyze the one or more images and determine that one or more vehicles stopped unexpected (e.g., stopping at a location that is not supposed to stop, such as, double parked). For example, vehicle 3466 may further be configured to analyze the one or more images and determine that vehicle 3467 has stopped based on the image analysis. Vehicle 3466 may also be configured to analyze the one or more images and determine that vehicle 3476 is or is not driving at a normal speed or at a speed greater than a threshold speed and/or a percentage of a legal speed in the road segment. Vehicle 3466 may determine the stop of vehicle 3467 as a dynamic condition. In some embodiments, vehicle 3466 may act upon the detection of the dynamic condition. For example, vehicle 3466 may navigate the vehicle to bypass vehicle 3467.

In some embodiments, server 3301 (and/or vehicle 3302) may use a machine learning model to identify one or more conditions in an image. For example, server 3301 (and/or vehicle 3302) may obtain or use a trained machine learning model for identifying conditions that have at least one dynamic characteristic in images. The trained machine learning model may be trained using training samples of labeled conditions and images. Server 3301 (and/or vehicle 3302) may input the images received into the trained machine learning model, which may output one or more identified conditions in the images. As another example, server 3301 (and/or vehicle 3302) may use an artificial neural network trained for identifying one or more conditions in images.

At step 3513, the at least one image may be analyzed to determine at least one identifier associated with the condition. For example, vehicle 3302 may analyze the at least one image to determine an identifier associated with a pothole (i.e., a condition), such as a position of the pothole. Exemplary identifiers associated with a condition may include a position of the condition, a distance of the condition relative to an object, a distance of the condition relative to a location, or the like, or a combination thereof. By way of example, as illustrated in FIG. 34, vehicle 3401 may analyze an image of its environment to determine the position of pothole 3431 and/or a distance of pothole 3431 relative to stop sign 3421. As another example, vehicle 3401 may analyze an image to determine a distance of the construction site relative to building 3451.

In some embodiments, vehicle 3302 may also be configured to transmit information relating to the identified condition and/or identifier associated with the condition to server 3301, database 3304, and/or external entity 3305.

In some embodiments, server 3301 (and/or vehicle 3302) may use a machine learning model to determine one or more identifiers associated with a condition in an image. For example, server 3301 (and/or vehicle 3302) may obtain or use a trained machine learning model for identifying one or more identifiers associated with a condition. The trained machine learning model may be trained using training samples of labeled identifiers, conditions and/or images. Server 3301 (and/or vehicle 3302) may input the images received into the trained machine learning model, which may output one or more determined identifiers associated with a condition. As another example, server 3301 (and/or vehicle 3302) may use an artificial neural network trained for identifying one or more identifiers associated with a condition.

In some embodiments, server 3301 may be configured to update the at least one identifier associated with the condition based on information received from at least one other vehicle.

As described elsewhere in this disclosure, server 3301 may receive one or more images (or one or more sets of images) from a plurality of vehicles representative the environments of the vehicles, and analyze the images to identify one or more conditions that have at least one dynamic characteristic. In some embodiments, server 3301 may also be configured to aggregate and/or correlate the conditions identified along a same road segment (or portion thereof) in the images. For example, server 3301 may aggregate one or more conditions identified in a first image received from a first vehicle and one or more conditions identified in a second image received from a second vehicle. Alternatively or additionally, server 3301 may remove one or more duplicate conditions from the aggregated conditions. Alternatively, server 3301 may keep one or more identified conditions that appear in both the first and second images. Server 3301 may eliminate one or more identified conditions that appear in only one of the first and second images. In some embodiments, server 3301 may aggregate the conditions identified in the images received from three or more vehicles. Alternatively or additionally, server 3301 may also remove one or more duplicate conditions from the aggregated conditions. Alternatively, server 3301 may keep one or more identified conditions that appear in all images. Alternatively, server 3301 may eliminate one or more identified conditions that appear in only a subset of the images (e.g., identified only in the first and third images, but not in the second image). Alternatively, server 3301 may determine a count number of the appearance of an identified condition in the images. Server 3301 may keep the condition if the count number equals or exceeds a threshold. For example, the threshold may be three, and server 3301 may determine that an identified condition appears three times out of four images (e.g., four images received from four different vehicles). Server 3301 may keep this identified condition. As another example, server 3301 may determine that another identified condition appears only once among the four images and may eliminate this identified condition.

Alternatively or additionally, server 3301 may be configured to aggregate and/or correlate one or more identifiers associated with a same condition identified in the images received from different vehicles. In some embodiments, the correlating may include determining refined positions of each condition based on the determined identifiers. For example, server 3301 may correlate a first determined position of pothole 3431 (as illustrated in FIG. 34) relative to stop sign 3421 based on a first image received from a first vehicle with a second determined position of pothole 3431 relative to stop sign 3421 based on a second image received from a second vehicle. Server 3301 may also determine a final position (or a refined position) for pothole 3431 relative to stop sign 3421 based on the first and second positions. By way of example, server 3301 may determine a first distance of pothole 3431 to stop sign 3421 being 3.0 meters based on the analysis of the first image and determine a second distance of pothole 3431 to stop sign 3421 being 2.0 meters. Server 3301 may determine a final distance of pothole 3431 to stop sign 3421 being 2.5 meters by averaging the first and second distances. Accordingly, aggregating and/or correlating may including averaging position information.

In some embodiments, server 3301 may determine one or more identifiers associated with a particular condition identified in the images received from three or more vehicles. Server 3301 may also correlate the determined identifiers for the particular condition. For example, server 3301 may correlate identifiers for the same condition identified in 20 images (or image sets) received from 20 different vehicles. Server 3301 may determine a refined position of the condition by, for example, obtaining a mean or median of 20 position indicators (i.e., an identifier). Alternatively, server 3301 may first filter out one or more outliers from 20 position indicators (e.g., by removing a position indicator that is 3.4 standard deviations above or below the median or mean of 20 position indicators). Server 3301 may then obtain a mean or median of the remaining position indicators as the refined position of the condition. In some embodiments, server 3301 may determine a confidence score for each of the determined position indicators associated with a condition. For example, server 3301 may assign a first confidence score for a first position indicator associated with a condition based on the first image received from the first vehicle. Server 3301 may also assign a second confidence score for a second position indicator associated with the condition based on the second image received from the second vehicle. To determine a final position indicator associated with the condition, server 3301 may be configured to take the confidence scores into account. For example, server 3301 may be configured to compute a weighted average based on the first and second position indicators by giving more weight to the first position indicator than the second position indicator if the first confidence score is higher than the second confidence score.

Figure 35B:
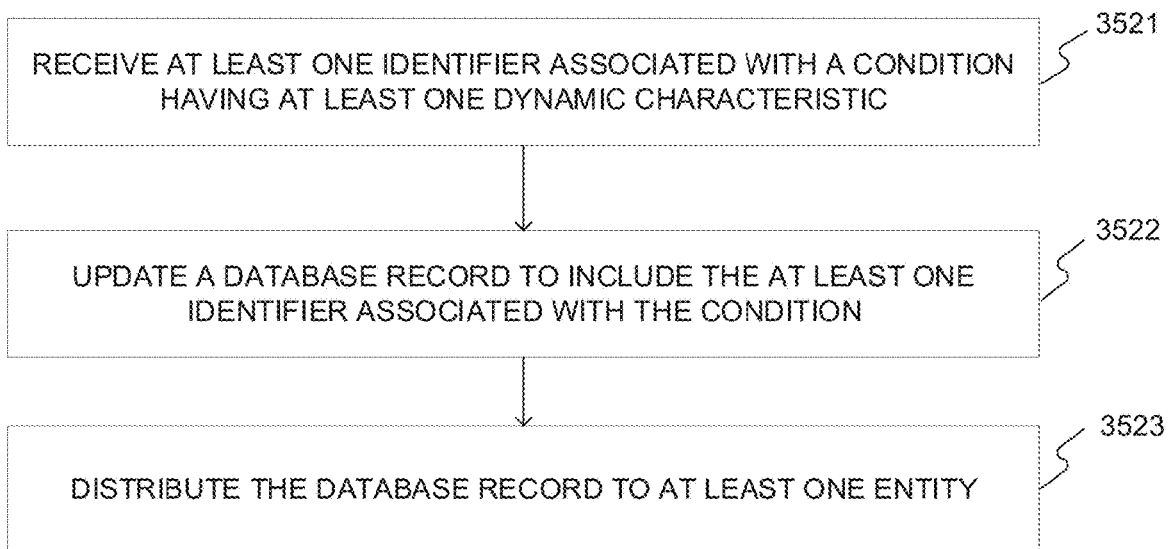
FIG. 35B is a flowchart showing an exemplary process for collecting condition information associated with a road segment, consistent with disclosed embodiments.

FIG. 35B is a flowchart showing an exemplary process 3520 for collecting condition information associated with a road segment, consistent with disclosed embodiments. One or more steps of process 3520 may be performed by a vehicle (e.g., vehicle 3302), a device associated with the vehicle (e.g., vehicle device 3303), a server (e.g., server 3301), and/or an external entity (e.g., external entity 3305).

While the descriptions of process 3510 provided below use server 3301 as an example, one skilled in the art would appreciate that one or more steps of process 3520 may be performed by a vehicle, a vehicle device, and/or an external entity.

At step 3521, at least one identifier associated with a condition having at least one dynamic characteristic may be received. In some embodiments, a condition and/or at least one identifier associated with the condition may be determined as described elsewhere in this disclosure (e.g., the descriptions in connection with process 3510). For example, server 3301 may receive the position of a pothole from vehicle 3302, via, for example, network 3306. In some embodiments, server 3301 may also be configured to receive information relating to the condition and/or the identifier. For example, server 3301 may be configured to receive location information relating to a road segment in which the pothole is identified. As another example, server 3301 may be configured to receive information of the permit of a construction site (e.g., the allowed operation period).

At step 3522, a database record may be updated to include the at least one identifier associated with the condition. For example, server 3301 may obtain a database record associated with the road segment (and/or the identified condition) from database 3304 and update the database record to include the at least one identifier associated with the condition. By way of example, server 3301 may obtain a database record associated with the road segment (or portion thereof) to include the position of pothole 3431. As another example, server 3301 may obtain a database record associated with crosswalk 3441 and update the database record to include the density of pedestrians determined based on the analysis of one or more images received from vehicle 3401.

At step 3523, the database record may be transmitted to at least one entity. For example, server 3301 may transmit the updated database record to one or more vehicles 3302, database 3304, and/or external entity 3305 (or a computing device associated with external entity 3305) via, for example, network 3306. In some embodiments, external entity 3305 may include a municipality (or a computing device associated with the municipality). In some embodiments, external entity 3005 may include an entity acting on behalf or at the direction of a municipality or other governing entity.

Using Semantic and Non-Semantic Information to Align Drives and Build Maps

As described above, the disclosed systems and methods may include collecting information from vehicles or other sources and generating a sparse map for vehicle navigation based on the collected information. In order to generate maps based on multiple drives traversing a road segment, the drive information harvested during the multiple drives may be aligned. As described above alignment may be performed based on objects having a recognized type identified in images captured by vehicles. Such features, which may be referred to as "semantic" features, may include stop signs, traffic lights, or other recognized features, as described above. In some instances, the use of semantic features alone may not be sufficient for aligning multiple drives. For example, a particular stretch of road may not contain enough semantic road features to accurately or effectively align information. Accordingly, in some embodiments, detected features of a non-standard type, such as cracks in the road, unique potholes, or other features not associated with a predetermined object type may also be used for alignment. Such features may be referred to as "non-semantic" features. The use of both semantic and non-semantic features may improve accuracy, efficiency, and effectiveness of generating sparse maps based on multiple drives by providing additional data points for alignment.

Figure 36:
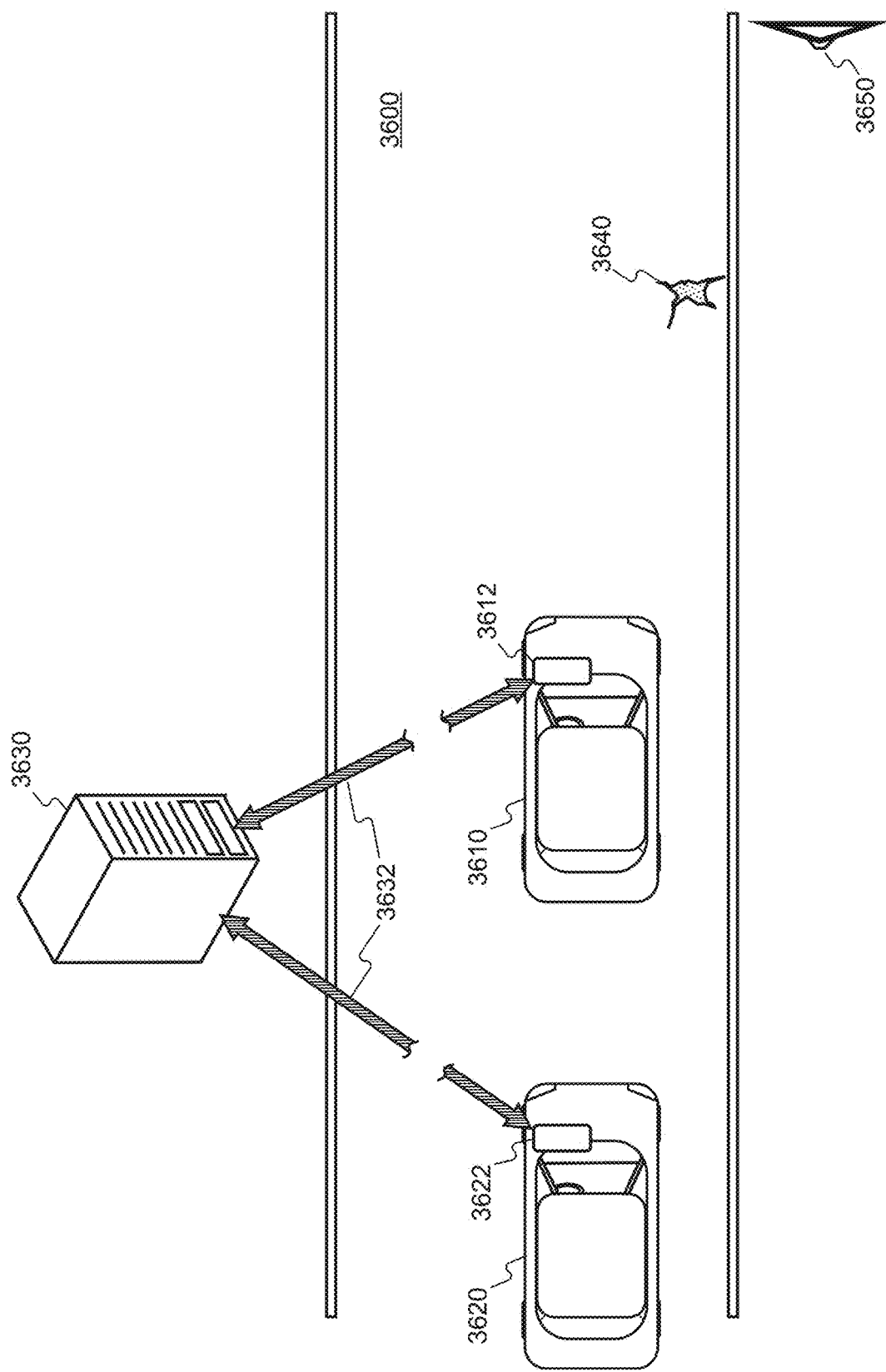
FIG. 36 is a is a schematic illustration of a system for aligning information from multiple drives based on semantic and non-semantic road features, consistent with disclosed embodiments

FIG. 36 is a is a schematic illustration of a system for aligning information from multiple drives based on semantic and non-semantic road features, consistent with the disclosed embodiments. FIG. 36 shows an example road segment 3600, which may be traversed by one or more vehicles 3610 and 3620. Road segment 3600 is shown as having a single lane of travel for purposes of simplicity. Road segment 3600, however, may include more complex road segments having multiple lanes and/or multiple directions of travel, as described throughout the present disclosure. In some embodiments, vehicles 3610 and 3620 may correspond to vehicle 200 (or vehicles 1205, 1210, 1215, 1220, or 1225) discussed above. Accordingly, any of the descriptions or disclosures made herein in reference to vehicle 200 may also apply to vehicles 3610 and 3620. In some embodiments, at least one of vehicles 3610 and 3620 may be an autonomous vehicle. Vehicles 3610 and 3620 may be configured to capture images of road segment 3600. Accordingly, each vehicle may be equipped with an image capture device or camera (e.g., image capture device 122 or camera 122). Vehicles 3610 and 3620 may include processing units 3612 and 3622, respectively, for processing and transmitting captured images. In some embodiments, vehicles 3610 and 3620 may represent multiple drives along road segment 3600. For example, vehicles 3610 and 3620 may travel on road segment 3600 at the same time or at different times (although shown as appearing on road segment 1200 at the same time in FIG. 36). In some embodiments, vehicle 3610 and vehicle 3620 may be the same vehicle. For example, the same vehicle may traverse road segment 3600 at two different times, representing multiple drives along road segment 3600, which may be used to generate a sparse map.

Each vehicle may communicate with a remote server 3630 via one or more networks (e.g., over a cellular network and/or the Internet, etc.) through wireless communication paths 3632. Server 3630 may be any computing device capable of receiving and processing information for generating navigational maps. In some embodiments, server 3630 may correspond to sever 1230, as described above. Accordingly, any of the descriptions or disclosures made herein in reference to server 1230 may also apply to server 3630. Vehicles 3610 and 3620 may transmit data to server 3630 and receive data from server 3630. For example, server 3630 may collect data from multiple vehicles travelling on the road segment 3600 at different times and may process the collected data to generate an autonomous vehicle road navigation model or to update a model. Server 3630 may transmit the autonomous vehicle road navigation model or the update to the model to the vehicles that transmitted data to server 3630. Further, server 3630 may transmit the autonomous vehicle road navigation model or the update to the model to other vehicles that travel on road segment 3600 at later times.

Road segment 3600 may include both semantic road feature 3650 and non-semantic road feature 3640. Vehicles 3610 and 3620 may capture images depicting non-semantic road feature 3640 and semantic road feature 3650, which may be used for generating a sparse map. In particular, server 3630 may align information from multiple drives (e.g., information captured by vehicle 3610 and 3620) based on both non-semantic road feature 3640 and semantic road feature 3650 to generate a road navigational model.

Figure 37A:
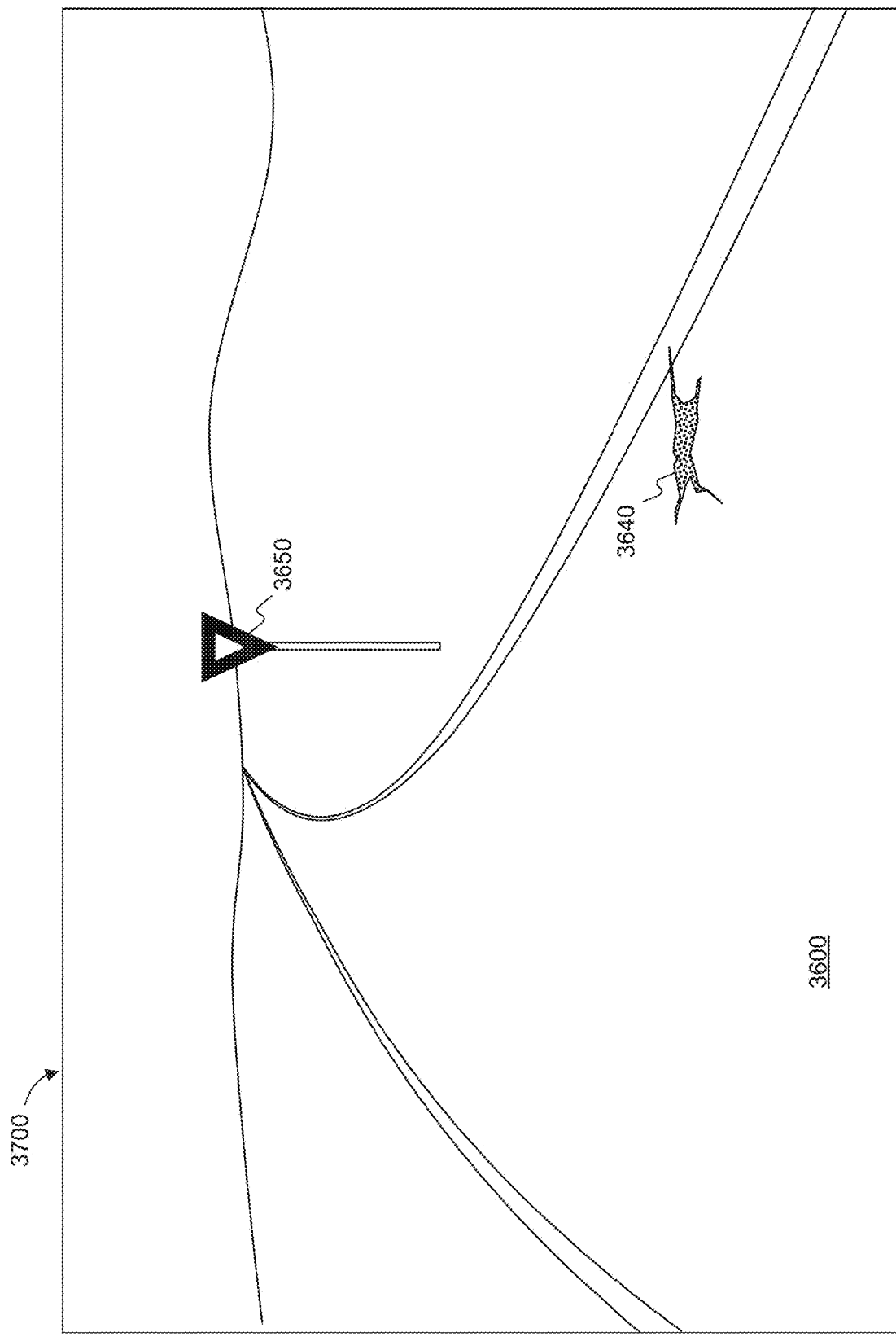
FIG. 37A shows an example image that may be captured by a vehicle, consistent with disclosed embodiments.

FIG. 37A shows an example image 3700 that may be captured by vehicles 3610 and/or 3620, consistent with disclosed embodiments. As shown in FIG. 37A, image 3700 may include representations of both semantic road feature 3650 and non-semantic road feature 3640, which may be used for alignment. For purposes of illustration, image 3700 is shown to include both non-semantic road features and semantic road features. In some embodiments, however, non-semantic road feature 3640 and semantic road feature 3650 may be represented in separate images captured along the same road segment.

As used herein a "semantic road feature" may refer to any feature along a road segment that is associated with a recognized object classification. For example, as shown in FIG. 36, semantic road feature 3650 may be a traffic sign, such as a yield sign. Semantic road feature 3650 may be any other feature or object along a roadway having a recognized object type. Such semantic road features may include lane markings, road signs, highway exit ramps, traffic lights, light posts, highway markers, or any other features that may be recognized as having a defined type or other classification. In some embodiments, semantic road feature 3650 may be associated with a subtype or subclassification of an object. For example, in instances where semantic road feature 3650 is a traffic sign, as shown in FIG. 37A, it may be classified under a subcategory of a yield sign based on the shape and appearance of the sign, as described in greater detail above. Other similar traffic sign subtypes may include speed limit signs, route number signs, traffic light signs, stop signs, directional signs, warning signs, merge signs, exit signs, railroad crossing signs, or any other recognizable type of traffic sign. As another example, where semantic road feature 3650 is a lane mark, it may be categorized based on a specific type of lane mark, such as a dashed lane mark, a double-line lane mark, a crosswalk, a speed hump, a railway crossing, a stop line, or any other recognizable type of roadway marking.

Server 3650 may be configured to process data associated with identified road features, including semantic road features, to align information collected from multiple drives along a road segment. To increase the number of data points that may be used for alignment of drive information or to provide data points in areas where there are insufficient semantic data points, non-semantic road features, such as non-semantic road feature 3640 may also be used for alignment. As used herein a "non-semantic road feature" may refer to any feature along a road segment that is not associated with a recognized object type or classification. For example, as shown in FIGS. 36 and 37A, non-semantic road feature 3640 may be a pothole. When processing image 3700, processor 3612 (or server 3630) may recognize non-semantic road feature 3640 within image 3700 but may not associate it with a known object type. For example, "pothole" may not be an object type recognized by processor 3612 or server 3630. However, processor 3610 may still determine a location of non-semantic road feature 3640, similar to how locations are determined for semantic road features and transmit the location information to server 3630. In some embodiments, processor 3610 may provide other information associated with non-semantic road feature 3640, which may be used to correlate location information for non-semantic road feature 3640 across multiple drives. For example, processor 3610 may include shape, color, size, or other information that can be determined for non-semantic road feature 3640 based on image 3700. This information may be compared to information about non-semantic road features reported in other drives to correlate the location information for purposes of alignment. For example, if vehicles 3610 and 3620 each report a feature on the road surface having similar size and shape and in approximately the same location along road segment 3600, server 3630 may correlate the two road features. Accordingly, server 3630 may then use the correlated non-semantic road features for alignment of the two drives. In some embodiments, the reported non-semantic road feature may be used for alignment if the identifying information and/or location information are within a certain threshold. For example, if a non-semantic road feature reported by vehicle 3610 is determined to have a width value that is within a certain threshold of a non-semantic road feature reported by another vehicle (e.g., within 90%, within 0.1 m, or any other measure of similarity), the reported locations may be used for alignment. In some embodiments, non-semantic road features may be correlated based on location alone. For example, non-semantic road features within a certain threshold distance (e.g., 0.01 m, 0.1 m, 1.0 m, etc.) may be correlated for purposes of alignment.

Figure 37D:
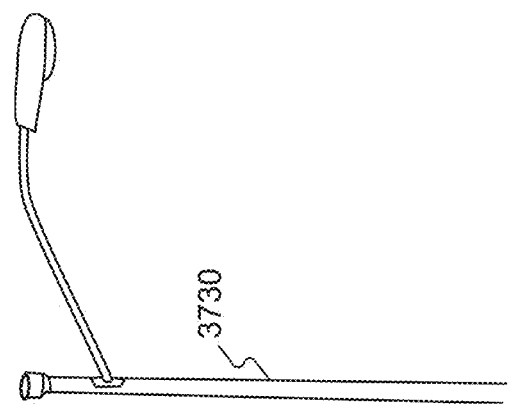
FIGS. 37B, 37C, and 37D illustrate example non-semantic road features that may be used for alignment purposes, consistent with disclosed embodiments.
Figure 37C:
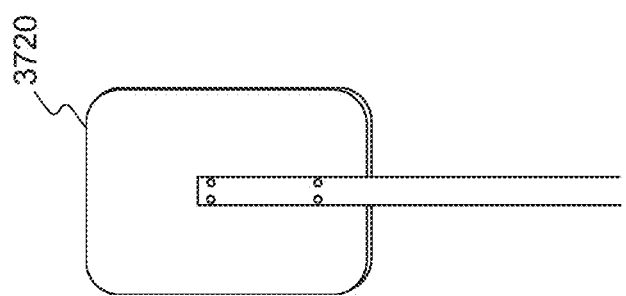
Figure 37B:
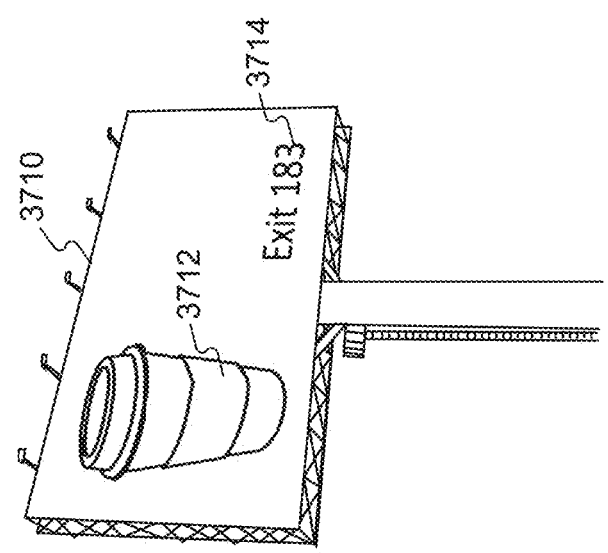

While a pothole is used by way of example, non-semantic road feature 3640 may include any detectable feature within an environment of a vehicle that is not associated with a predefined object type or classification. FIGS. 37B-37D illustrate example non-semantic road features that may be used for alignment purposes, consistent with disclosed embodiments. In some embodiments, non-semantic road feature 3640 may include an advertisement sign, such as billboard 3710, as shown in FIG. 37B. Because billboard 3710 is not a recognized type of traffic sign, it may be classified as a non-semantic road feature and used for alignment purposes. Information such as a shape, width, height, color, or other properties of billboard 3710 may also be identified for purposes of correlating location information reported for billboard 3710 across multiple drives. In some embodiments, images, shapes, text, or other features displayed on the face of billboard 3710 may also be used for identifying billboard 3710 between multiple drives. For example, in the example illustrated in FIG. 37B, processor 3612 may identify a shape or image corresponding to coffee cup 3712 using various image processing algorithms as described above. In other embodiments, processor 3612 may recognize text 3714, for example using a OCR algorithms or other text-recognition techniques. Such information may be used to identify billboard 3710 across multiple sets of drive information. Various other types of signs may also be considered non-semantic road features, including construction signs, informational signs, political signs, national or state park signs, outdoor business signs, handmade signs (e.g., yard sale signs, local advertisement signs, etc.), In some embodiments, non-semantic road features may include the back of a traffic sign 3720, as shown in FIG. 37C. For example, traffic sign 3720 may be associated with a lane of travel having an opposite direction of travel than the direction traveled by vehicle 3610. Accordingly, because only the back of the traffic sign is represented in a captured image, processor 3610 may not identify traffic sign 3720 as a traffic sign, and thus may classify it as a non-semantic road feature. Properties of the back of traffic sign 3720, such as the height, shape, color, or other properties may be used to correlate location information for traffic sign 3720 across multiple drives. As another example, non-semantic road feature 640 may include light post 3730, as shown in FIG. 37D. It is noted that in some embodiments, light posts may be recognized semantic road features used for alignment. Accordingly, whether a road feature is considered semantic or non-semantic may depend on the types of object classifications recognized by server 3630. Accordingly, traffic signs, lane marks, highway markers, traffic signals, or any other features that may be semantic road features in some embodiments, may be non-semantic road features in other embodiments depending on the types of objects recognized by the server. Further, a road feature having a predefined type may in some instances be classified as a non-semantic road feature if it is not recognized as having the predefined type. For example, light post 3730 may have different design than those typically recognized by server 3630, may be damaged or dirty, or may not be detected as a light post for other reasons and thus may be treated as non-semantic but still used for alignment purposes.

Various other non-semantic road features may be used for alignment in addition to those shown in FIGS. 37A-D. In some embodiments, non-semantic road features may include features on a surface of a road, such as cracks, potholes, manhole covers, oil stains, tire marks, paint splatters or stray paint markings, darker or lighter pavement patches, obscure or unrecognized lane markings (e.g., bicycle lane designations, yield lines, etc.), dirt patches, worn pavement regions, partially worn roadway markings, or any other detectable features on the surface of a road. In some embodiments, non-semantic road features may include objects along a road segment. For example, non-semantic road features may include plants (e.g., grasses, flowers, bushes, shrubs, trees, cacti, moss, etc.), fence posts, telephone poles, electrical or communication boxes, benches, buildings, mailboxes, bus stops, train stations, trash or recycle bins, bollards, rocks, or any other objects that may be found along a roadway. In some embodiments, the non-semantic road features may be temporary or transitory but may remain in one location long enough that it may be detected along multiple drives. For example, the non-semantic road feature may include traffic cones, construction vehicles, construction equipment, construction signs, parked or disabled vehicles, roadkill, trash or debris, puddles, collectable trash bins, or any other non-permanent or semi-permanent objects or road markings. While various examples of non-semantic road features are provided herein, the present disclosure is not limited to any type or form of non-semantic road feature.

Based on the semantic road features and non-semantic road features, server 3630 may align information collected from multiple drives. For example, vehicle 3610 may capture images, such as image 3700, including representations of non-semantic road feature 3640 and semantic road feature 3650. A location of the road features may be determined based on the captured images. In some embodiments, the location may be determined by vehicle 3610, for example, using processor 3612. In other embodiments, the location may be determined on the server side. For example, vehicle 3610 may transmit captured image 3700 or information derived from image 3700 to server 3630, which may determine the location of the semantic road feature 3650 and non-semantic road feature 3640 based on the received information.

Similarly, a second vehicle 3620 may report a location of semantic and non-semantic road features, along with other drive information to server 3630. Such information may be transmitted at the same time as information from vehicle 3610 or at a different time. Server 3630 may compare 3-dimensional location information associated with non-semantic road feature 3640 and semantic road feature 3650 reported by vehicles 3610 and 3620 and may align the drive information based on the reported locations of semantic road feature 3650. Based on the alignment, server 3630 may determine a refined position of the semantic and non-semantic road features. For example, server 3630 may determine an average location for each of the semantic and non-semantic road features and may store the average location in a map. In other embodiments, server 3630 may apply a regression analysis or curve fitting algorithm to the locations of the semantic and non-semantic road features to determine the refined positions. For example, the refined positions may be based on a linear, polynomial, exponential, logarithmic, or power curve fit to the reported semantic and non-semantic road feature locations. The refined positions of the semantic and non-semantic road features may be defined based on a coordinate system for the sparse map. For example, the refined points may be expressed in coordinates (x, z), as described above, or using any other coordinate system. In some embodiments, the coordinate system may be local to the common road segment. Additional details of feature alignment that may be performed are described above with respect to FIGS. 14-16. Server 3630 may be configured to store the refined positions in a map and may distribute the map to one or more vehicles for use in navigation along a road segment, as described above.

Figure 38:
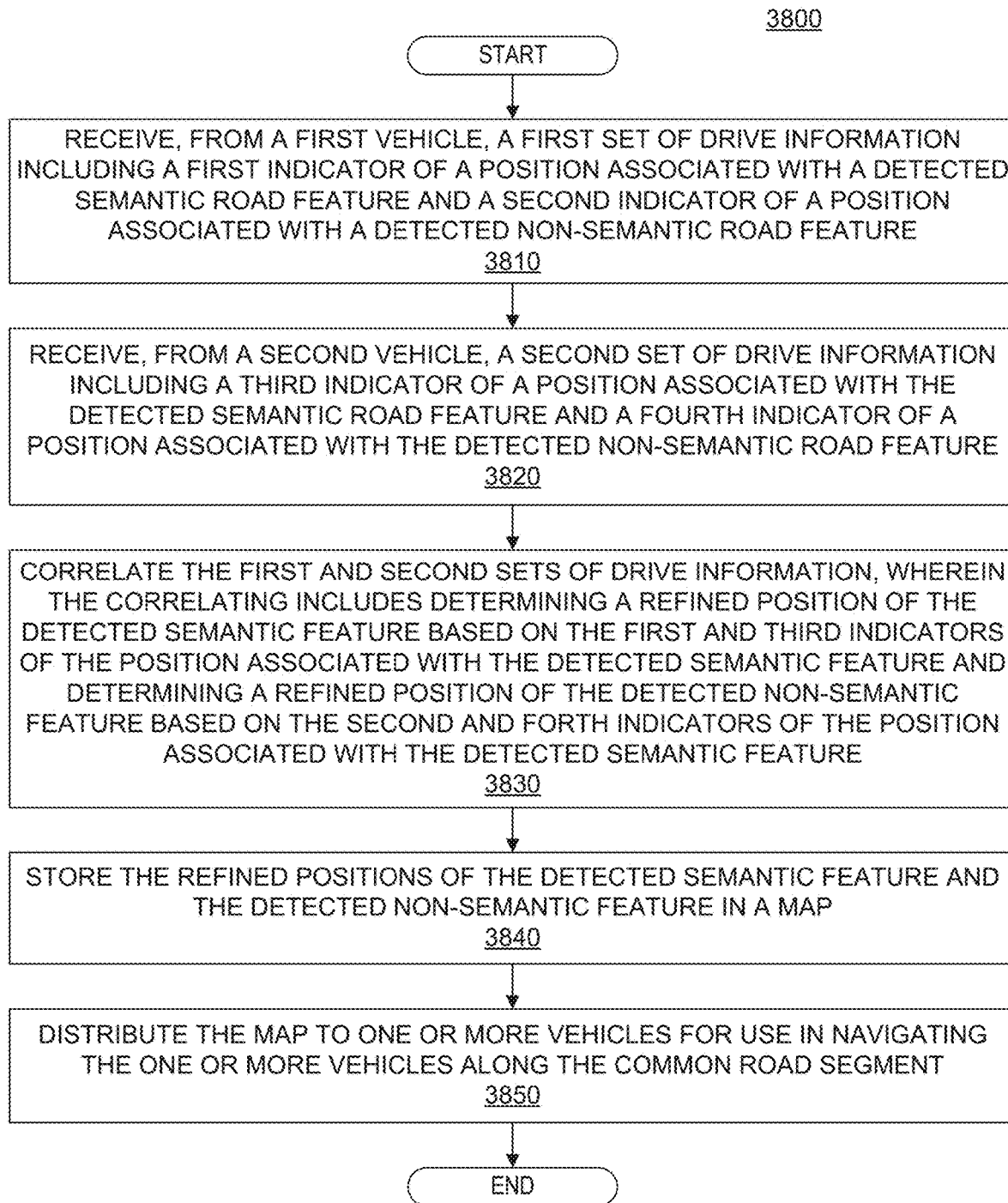
FIG. 38 is a flowchart showing an example process for correlating information collected from a plurality of vehicles relative to a common road segment, consistent with disclosed embodiments.

FIG. 38 is a flowchart showing an example process 3800 for correlating information collected from a plurality of vehicles relative to a common road segment, consistent with disclosed embodiments. Process 3800 may be performed by a server, such as server 3630. In some embodiments, some or all of process 3800 may be performed by a processing unit of a vehicle, such as processor 3612 of vehicle 3610. In some embodiments, a non-transitory computer readable medium may contain instructions that when executed by a processor cause the processor to perform process 3800.

At step 3810, process 3800 may include receiving a first set of drive information from a first vehicle. For example, the first set of drive information may be received by server 3630 from vehicle 3610. The first set of drive information may include at least a first indicator of a position associated with a detected semantic road feature (such as semantic road feature 3650) and a second indicator of a position associated with a detected non-semantic road feature (such as non-semantic road feature 3640). The first and second indicators of position may be determined based on analysis of at least one image captured by a camera of the first vehicle during a drive of the first vehicle along at least a portion of the common road segment. For example, as described above, vehicle 3610 may capture image 3700 along road segment 3600 and may determine a position of non-semantic road feature 3640 and semantic road feature 3650 using one or more image analysis techniques.

As described above, the semantic road feature may include an object having a recognized object type. The semantic road feature may include any of the example semantic road features discussed above, including, for example, a traffic light, a stop sign, a speed limit sign, a warning sign, a direction sign, or a lane marking. The non-semantic road feature may include an object not having a recognized object type. For example, the non-semantic road feature may include a pothole, a road crack, or an advertising sign. Various other non-limiting examples of non-semantic road features are provided above.

At step 3820, process 3800 may include receiving a second set of drive information from a second vehicle. For example, the second set of drive information may be received by server 3630 from vehicle 3620. The second set of drive information may include at least a third indicator of a position associated with the detected semantic road feature and a fourth indicator of a position associated with the detected non-semantic road feature. As with the first set of drive information, the third and fourth indicators of position may be determined based on analysis of at least one image captured by a camera of the second vehicle during a drive by the second vehicle along at least the portion of the common road segment. As described above, in some embodiments, the second vehicle may capture images of the common road segment at the same time, or at different times, than the first vehicle. In some embodiments the first and second vehicles may be the same vehicle traversing the common road segment at different times.

At step 3830, process 3800 may include correlating the first and second sets of drive information. This correlation may correspond to the alignment techniques described in greater detail above. For example, the correlating may include determining a refined position of the detected semantic road feature based on the first and third indicators of the position associated with the detected semantic road feature and determining a refined position of the detected non-semantic road feature based on the second and forth indicators of the position associated with the detected semantic road feature. As described above, the refined positions of the detected semantic road feature and the detected non-semantic road feature may be relative to a coordinate system local to the common road segment. In some embodiments, the coordinate system local to the common road segment may be based on a plurality of images captured by cameras on board the plurality of vehicles. For example, the coordinate system may be developed based on analysis of the images to determine a three-dimensional space associated with the road segment, from which a three-dimensional coordinate system may be developed. Further details regarding three-dimensional coordinates for generating sparse maps are provided above. In some embodiments, the correlating may further include applying a curve fitting algorithm to the first set of drive information and the second set of drive information. In other words, a curve defined by a mathematical function having a "best fit" with the indicators of position of the detected semantic and non-semantic road features may be determined. For example, a linear or nonlinear regression analysis may be performed to fit a curve to the drive information. In some embodiments, correlating the drive information including determining an average position for a road feature based on a plurality of position indicators.

At step 3840, process 3800 may include storing the refined positions of the detected semantic road feature and the detected non-semantic road feature in a map. For example, the refined positions of the detected semantic road feature and the detected non-semantic road feature may be stored in a sparse map, as described in greater detail above. Accordingly, the first and second sets of drive information may be "aligned" to form a single comprehensive set of drive information. In some embodiments, this may be repeated several times using additional sets of drive information to form a sparse map, such as sparse map 800.

At step 3850, process 3800 may include distributing the map to one or more vehicles for use in navigating the one or more vehicles along the common road segment. For example, the sparse map developed based on the aligned drive information may be distributed to vehicles 3610 and 3620 by server 3630 for navigation. In some embodiments, map generation may not end upon initial generation and distribution of the map. For example, as discussed above, the sparse map may be continuously or periodically updated based on data collected from vehicles as those vehicles continue to traverse the common road segment. Accordingly, step 3840 may include distributing an update to a sparse map containing information for updating only a portion of the overall sparse map, which may be stored in the vehicles.

Collecting Non-Semantic Feature Points

As described above, the disclosed systems and methods may include collecting location information associated with non-semantic road features from a plurality of vehicles for purposes of aligning drive information. Accordingly, vehicles, such as vehicles 3610 and 3620, described above, may be configured to detect non-semantic road features from images captured by an image capture device and determine coordinates for the non-semantic road features. While such techniques are described in general above, the following disclosure provides additional details for such processes.

A vehicle, such as vehicle 3610 described above with respect to FIG. 36, may include at least on image capture device for capturing images from within an environment of vehicle 3610. For example, the images may be captured using image acquisition unit 120 (e.g., through image capture device 122) of vehicle 200. The image sensors may include any suitable type of image capture device, such as an Aptina M9V024 WVGA sensor with a global shutter, as described above, or any other form of image sensor. Vehicle 3610 may further be equipped with a processing device 3612, which may be configured to process images captured by the image capture device. Processing device 3612 may be configured to detect non-sematic road features represented in the images captured by the image capture device. For example, similar to the detection of the various landmarks described above, vehicle 3610 may use various image recognition algorithms or software to identify point locations within a captured image. For example, vehicle 3610 may recognize a series of edge points, corner points or various other point locations associated with a non-semantic road feature.

Figure 39A:
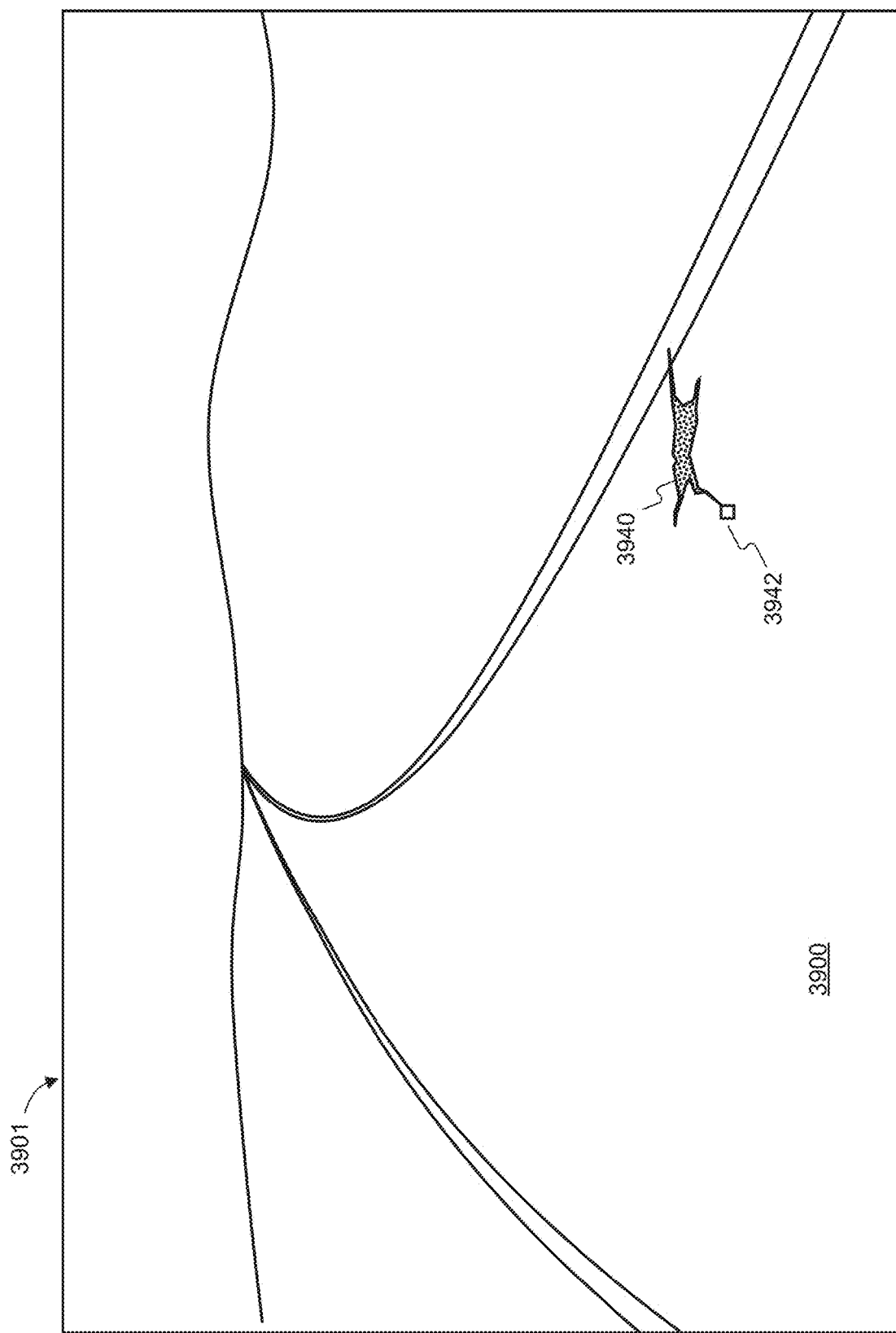
FIGS. 39A and 39B show example images that may be used for detecting non-semantic road features, consistent with disclosed embodiments.
Figure 39B:
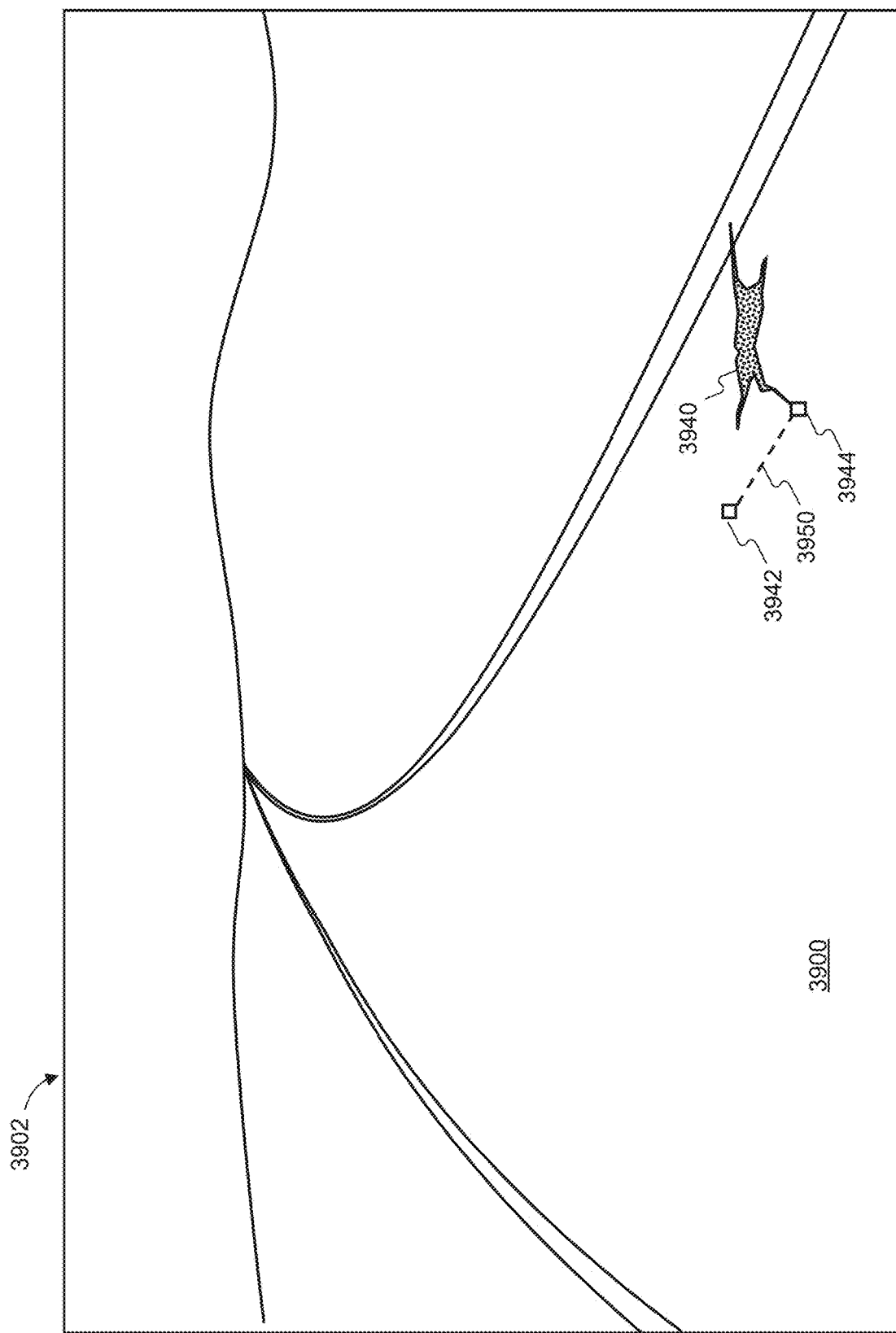

FIGS. 39A and 39B show example images 3901 and 3902 that may be used for detecting non-semantic road features, consistent with disclosed embodiments. As shown in FIG. 39A, image 3901 may include non-semantic road feature 3940 included along a road segment 3900. Image 3901 may be captured by an image capture device, such as image capture devices 122 and/or 124 included in image acquisition unit 120. Non-semantic road feature 3940 may correspond to non-semantic road feature 3640, described above, and thus any of the embodiments or descriptions provided above with respect to non-semantic road feature 3640 may also apply to non-semantic road feature 3940. While a pothole is used by way of example, any of the various example non-semantic road features provided above may also be detected. For example, non-semantic road feature 3940 may include, but is not limited to, an advertisement sign, a light pole, a road crack, a building, a backside of a sign, a mark or discoloration in the roadway, a plant (e.g., a tree, shrub, grass, cactus, etc.), or any other feature that may not be associated with a recognized object type.

Processing unit 3612 may be configured to detect a representation of non-semantic road feature 3940 from image 3901. As described above, this may include using an image recognition algorithm, such as Viola-Jones object detection, scale-invariant feature transform (SIFT), histogram of oriented gradients (HOG) features, convolutional neural networks (CNN), or any other forms of object detection algorithms Other example algorithms may include video tracking algorithms, motion detection algorithms, feature detection algorithms, color-based detection algorithms, texture-based detection algorithms, shape based detection algorithms, boosting based detection algorithms, face detection algorithms, or any other suitable algorithm for analyzing one or more images. In some embodiments, the non-semantic road feature may be identified through a trained machine learning algorithm. For example, the algorithm may be trained using a training set of images containing non-semantic road features to develop a model which may be used to detect non-semantic road features in other images. Various machine learning models may be used, including a logistic regression model, a linear regression model, a regression model, a random forest model, a K-Nearest Neighbor (KNN) model, a K-Means model, a decision tree, a cox proportional hazards regression model, a Naïve Bayes model, a Support Vector Machines (SVM) model, a gradient boosting algorithm, artificial neural networks (such as deep neural networks, convolutional neural networks, etc.) or any other form of machine learning model or algorithm.

Processing unit 3612 may be configured to detect one or more points associated with non-semantic road feature 3940. For example, processing unit 3612 may identify point 3942 which may correspond to a corner of non-semantic road feature 3940, as shown in FIG. 39A. Various other points associated with non-semantic road feature 3940 may be determined, including points located on an edge of non-semantic road feature 3940, points located on a surface of non-semantic road feature 3940, or the like. Based on the location of point 3942, coordinates of non-semantic road feature 3940 may be determined. As described above, a sparse map generated based on locations detected by a plurality of vehicles may be represented by a three-dimensional spline. Accordingly, the coordinates for non-semantic road feature 3940 may be represented in three-dimensional space. The three-dimensional coordinates may be determined in reference to a coordinate frame, which may be relative to the image capture device, real-world coordinates (e.g., latitude and longitude, etc.), a coordinate frame local to road segment 3900, or any other suitable frame of reference. In some embodiments the coordinates of point 3942 may be determined based on an estimated position of point 3942 relative to vehicle 3610. For example, based on the position of point 3942 within image 3901, processing unit 3612 may determine an approximate location of point 3942 relative to vehicle 3610. The camera angle, the speed of the vehicle, the width of the vehicle, the position of the camera relative to the vehicle, or various other factors may be accounted for in determining the position of point 3942.

In some embodiments, the three-dimensional coordinates of point 3942 may be based on detection of point 3942 in multiple images. FIG. 39B shows an example of a second image 3902 that may be used for determining three-dimensional coordinates of point 3942. In the example shown in FIG. 39B, image 3902 may be taken at some time after image 3901. For example, images 3901 and 3902 may be consecutive images captured by an image capture device on board vehicle 3610. As another example, one or more other images may have been captured during a time period between the time of capture of image 3901 and the time of capture of image 3902. As shown in FIG. 39B, a representation of non-semantic road feature 3940 may appear in a different location within image 3902 relative to image 3901. For example, processing unit 3612 may detect a second image location 3944 associated with the same corner point of non-semantic road feature 3940. Point 3942 is overlaid on image 3902 in FIG. 39B for illustration purposes, although it does not correspond to any feature within image 3902. In FIGS. 39A and 39B, the difference between images 3901 and 3902 may be greatly exaggerated. For example, in practice, the difference between consecutive images captured by an image capture device may be much more subtle as many image frames (e.g., tens, hundreds, thousands, etc.) may be captured by the image capture device per second. Accordingly, the difference between images 3901 and 3902 shown in FIGS. 39A and 39B is exaggerated for illustration purposes.

Processing unit 3612 may determine a difference between points 3942 and 3942 in the respective images, as shown by dashed line 3950. In some embodiments, this difference may be analyzed in conjunction with motion information for vehicle 3610 to determine the three-dimensional coordinates. For example, the vehicle may use GPS data, sensor data (e.g., from an accelerometer, a speed sensor, a suspension sensor, etc.), and/or other data to determine coordinates for a point associated with non-semantic road feature 3940. For example, processing unit 3612 may determine coordinates for point 3942 based on a position of vehicle 3610 at the time image 3901 is taken and may determine coordinates for the same point (represented by image location 3944) based on a position of vehicle 3610 at a time when image 3902 is taken. Ideally, the three-dimensional coordinates for point 3940 at each of these times will be the same. However, in some instances, there may be slight discrepancies due to movement of the vehicle or other sources of error. Sensor data, such as suspension sensor data, accelerometer data, or other data may be used to correct any discrepancies between two or more coordinates determined based on image data.

Further, while images 3901 and 3902 are shown as being consecutive images in FIGS. 39A and 39B, in some embodiments, they may be captured at the same time, for example, by two separate image capture devices (e.g., image capture device 122 and image capture device 124). In some embodiments, images 3901 and 3902 may form a stereoscopic pair. Based on a difference between the representation of a non-semantic road feature within the images (e.g., difference 3950), as well-known positions and orientations of the corresponding image capture devices, three-dimensional coordinates with respect to vehicle 3610 may be determined. Various other techniques for determining the three-dimensional coordinates for point 3942 based on difference 3950 and/or motion information for the vehicle may be apparent to those skilled in the art.

Vehicle 3610 may be configured to transmit the three-dimensional coordinates for non-semantic road feature 3940 to a server, such as server 3630 described above with respect to FIG. 36. Vehicle 3610 may transmit the three-dimensional coordinates through wireless transmission, as indicated by arrows 3632. Server 3630 may be configured to generate and/or update a road navigation model based on the received coordinates. In some embodiments, coordinates for non-semantic road feature 3940 may be received from other vehicles, such as vehicle 3620. Server 3630 may align drive information received from vehicles 3610 and 3620 based on the coordinates for non-semantic road feature included in the respective drive information, as described in greater detail above. In some embodiments, some or all of the steps described above may be performed by server 3630. For example, processing unit 3612 may transmit one or more images captured by an image capture device (or associated information), to server 3630, which may determine the three-dimensional coordinates for points associated with non-semantic road feature 3940.

Figure 40:
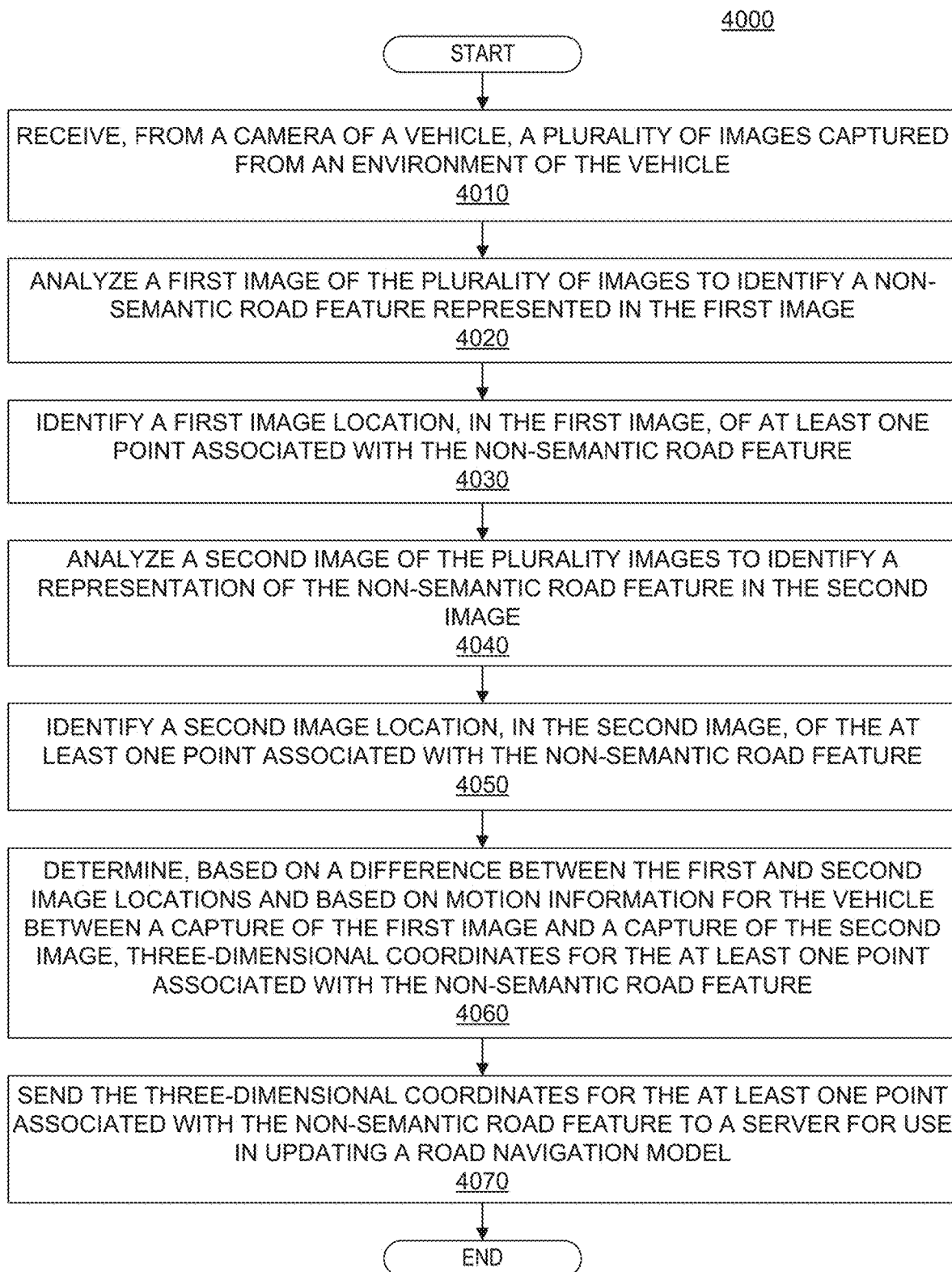
FIG. 40 is a flowchart showing an example process for determining non-semantic road feature points, consistent with disclosed embodiments.

FIG. 40 is a flowchart showing an example process 4000 for determining non-semantic road feature points, consistent with disclosed embodiments. Process 4000 may be performed, for example, by processing unit 3612 of vehicle 3610, as described above. In other embodiments, some or all of process 4000 may be performed by a server, such as server 3630. In some embodiments, a non-transitory computer readable medium may contain instructions that when executed by a processor cause the processor to perform process 4000.

At step 4010, process 4000 may include receiving, from a camera of a vehicle, a plurality of images captured from an environment of the vehicle. For example, vehicle 3610 may capture a plurality of images using an image capture device, such as image capture device 122. At step 4020, process 4000 may include analyzing a first image of the plurality of images to identify a non-semantic road feature represented in the first image. For example, processing unit 3612 may analyze image 3901 to identify non-semantic road feature 3940 represented in image 3901. As described above, this may include various image processing or object recognition techniques, such as such as convolutional neural networks (CNN), scale-invariant feature transform (SIFT), histogram of oriented gradients (HOG) features, or other techniques. The non-semantic road feature may include an object that does not have a recognized object type. Accordingly, the non-semantic road feature may include any of the various examples provided herein. For example, the non-semantic road feature may include a pothole, a road crack, a backside of a sign, a building, a light pole, an advertising sign, or any other feature not associated with a predefined object type. At step 4030, process 4000 may further include identifying a first image location, in the first image, of at least one point associated with the non-semantic road feature. For example, processing unit 3612 may detect point 3942 of non-semantic road feature 3940. The at least one point may include a corner point, an edge point, a point on a surface or any other location that may be detected with respect to the non-semantic road feature.

At step 4040, process 4000 may include analyzing a second image of the plurality images to identify a representation of the non-semantic road feature in the second image. For example, processing unit 3612 may analyze image 3902 to identify non-semantic road feature 3940 represented in image 3902. As described above, the second image may be captured at some time after the first image. For example, the first and second images may be consecutive images captured by an image capture device. In other embodiments, the first and second images may be captured at the same time, for example, by separate image capture devices. In some embodiments, the first and second image capture devices may form a stereoscopic pair. At step 4050, process 4000 may include identifying a second image location, in the second image, of the at least one point associated with the non-semantic road feature. For example, processing unit 3612 may identify second image location 3944 within image 3902.

At step 4060, process 4000 may include determining three-dimensional coordinates for the at least one point associated with the non-semantic road feature. In some embodiments, the three-dimensional coordinates may be based on a difference between the first and second image locations. For example, the three-dimensional coordinates may be determined, at least in part, based on difference 3950 between points 3942 and 3944. In some embodiments, the three-dimensional coordinates may be further based on motion information for the vehicle between a capture of the first image and a capture of the second image. For example, processing unit 3612 use GPS data, sensor data (e.g., from an accelerometer, a speed sensor, a suspension sensor, etc.), and/or other data to determine coordinates for the at least one point associated with the non-semantic road feature.

In some embodiments, the three-dimensional coordinates for the at least one point associated with the non-semantic road feature may be relative to an origin corresponding to a location of the camera. In other words, the three-dimensional coordinates may be based on a three-dimensional coordinate frame originating at the image capture device. Real-world coordinates of the at least one point by then be determined based on a real-world position of the camera, which may be determined based on GPS or other location information of the vehicle. As described above, the three-dimensional coordinates may be located in various positions relative to the non-semantic road feature. For example, the three-dimensional coordinates may be located at a corner of the non-sematic road feature, on an edge of the non-sematic road feature, on a surface of the non-sematic road feature, or in various other locations.

In some embodiments, the location of the three-dimensional coordinates may depend on the type of non-semantic road feature that is identified. For example, in some embodiments, the non-semantic road feature may be a backside of a sign and the three-dimensional coordinates may be on a surface of the backside of the sign. The three-dimensional coordinates may similarly be on a corner of the sign, on an edge of the sign, on a corner of the signpost, on an edge of the signpost, at a center of the sign or signpost, etc. As another example, the non-sematic road feature may be a building and the three-dimensional coordinates may be on a surface of the building. In this example, the three-dimensional coordinates may be located on a corner of the building, an edge of the building, on a feature of the building, such as a door, window, business sign, or the like. As yet another example, the non-sematic road feature may be a light pole and the three-dimensional coordinates may be on a surface of the light pole, an edge of the light pole, an end of the light pole, etc. As a further example, the non-sematic road feature may be a pothole and the three-dimensional coordinates may be at an edge of the pothole, a center of the pothole, a corner of the pothole, or the like.

At step 4070, process 4000 may include sending the three-dimensional coordinates for the at least one point associated with the non-semantic road feature to a server for use in updating a road navigation model. For example, processing unit 3612 may transmit the three-dimensional coordinates through a wireless transmission to server 3630. In some embodiments, the server may be configured to correlate the three-dimensional coordinates sent by the vehicle with three-dimensional coordinates for at least one point associated with the non-semantic road feature sent by at least one other vehicle. For example, server 3630 may receive additional three-dimensional coordinates for the non-semantic road feature from vehicle 3620. Server 3630 may align drive information received from vehicles 3610 and 3620 based on the respective three-dimensional coordinates received from each vehicle. In some embodiments, the correlation may be based on the processes described above, such as process 3800.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigation system for a vehicle, the system comprising:
    at least one processor comprising circuitry and a memory, wherein the memory includes instructions executable by the circuitry to cause the at least one processor to:
        receive, from a camera of the vehicle, a plurality of images captured from an environment of the vehicle;
        analyze a first image of the plurality of images to identify a non-semantic road feature represented in the first image;
        identify a first image location, in the first image, of at least one point associated with the non-semantic road feature;
        analyze a second image of the plurality images to identify a representation of the non-semantic road feature in the second image;
        identify a second image location, in the second image, of the at least one point associated with the non-semantic road feature;
        determine, based on a difference between the first and second image locations and based on motion information for the vehicle between a capture of the first image and a capture of the second image, three-dimensional coordinates for the at least one point associated with the non-semantic road feature; and
        send the three-dimensional coordinates for the at least one point associated with the non-semantic road feature to a server for use in updating a road navigation model.

2. The navigation system of claim 1, wherein the three-dimensional coordinates for the at least one point associated with the non-semantic road feature are relative to an origin corresponding to a location of the camera.

3. The navigation system of claim 1, wherein the server is configured to correlate the three-dimensional coordinates sent by the vehicle with three-dimensional coordinates for at least one point associated with the non-semantic road feature sent by at least one other vehicle.

4. The navigation system of claim 1, wherein the three-dimensional coordinates are located at a corner of the non-semantic road feature.

5. The navigation system of claim 1, wherein the three-dimensional coordinates are located on an edge of the non-semantic road feature.

6. The navigation system of claim 1, wherein the three-dimensional coordinates are located on a surface of the non-semantic road feature.

7. The navigation system of claim 1, wherein the non-semantic road feature is a backside of a side sign and the three-dimensional coordinates are on a surface of the backside of the sign.

8. The navigation system of claim 1, wherein the non-semantic road feature is a building and the three-dimensional coordinates are on a surface of the building.

9. The navigation system of claim 1, wherein the non-semantic road feature is a light pole and the three-dimensional coordinates are on a surface of the light pole.

10. The navigation system of claim 1, wherein non-sematic road feature is a pothole and the three-dimensional coordinates are at an edge of the pothole.

11. The navigation system of claim 1, wherein the non-semantic road feature includes an object that does not have a recognized object type.

12. The navigation system of claim 1, wherein the non-semantic road feature includes a pothole, a road crack, a backside of a sign, a building, a light pole, or an advertising sign.

13. A method for navigating a vehicle, the method comprising:
    receiving, from a camera of the vehicle, a plurality of images captured from an environment of the vehicle;
    analyzing a first image of the plurality of images to identify a non-semantic road feature represented in the first image;
    identifying a first image location, in the first image, of at least one point associated with the non-semantic road feature;
    analyzing a second image of the plurality images to identify a representation of the non-semantic road feature in the second image;
    identifying a second image location, in the second image, of the at least one point associated with the non-semantic road feature;
    determining, based on a difference between the first and second image locations and based on motion information for the vehicle between a capture of the first image and a capture of the second image, three-dimensional coordinates for the at least one point associated with the non-semantic road feature; and
    sending the three-dimensional coordinates for the at least one point associated with the non-semantic road feature to a server for use in updating a road navigation model.

14. The method of claim 13, wherein the three-dimensional coordinates for the at least one point associated with the non-semantic road feature are relative to an origin corresponding to a location of the camera.

15. The method of claim 13, wherein the server is configured to correlate the three-dimensional coordinates sent by the vehicle with three-dimensional coordinates for at least one point associated with the non-semantic road feature sent by at least one other vehicle.

16. The method of claim 13, wherein the three-dimensional coordinates are located at a corner of the non-semantic road feature.

17. The method of claim 13, wherein the three-dimensional coordinates are located on an edge of the non-semantic road feature.

18. The method of claim 13, wherein the three-dimensional coordinates are located on a surface of the non-semantic road feature.

19. The method of claim 13, wherein the non-semantic road feature is a backside of a side-sign and the three-dimensional coordinates are on a surface of the backside of the sign.

20. The method of claim 13, wherein the non-semantic road feature is a building and the three-dimensional coordinates are on a surface of the building.

21. The method of claim 13, wherein the non-semantic road feature is a light pole and the three-dimensional coordinates are on a surface of the light pole.

22. The method of claim 13, wherein the non-semantic road feature is a pothole and the three-dimensional coordinates are at an edge of the pothole.

23. The method of claim 13, wherein the non-semantic road feature includes an object that does not have a recognized object type.

24. The method of claim 13, wherein the non-semantic road feature includes a pothole, a road crack, a backside of a sign, a building, a light pole, or an advertising sign.

25. A non-transitory computer-readable medium storing instructions that, when executed by at least one processor, cause the at least one processor to:
receive, from a camera of a vehicle, a plurality of images captured from an environment of the vehicle;
analyze a first image of the plurality of images to identify a non-semantic road feature represented in the first image;
identify a first image location, in the first image, of at least one point associated with the non-semantic road feature;
analyze a second image of the plurality images to identify a representation of the non-semantic road feature in the second image;
identify a second image location, in the second image, of the at least one point associated with the non-semantic road feature;
determine, based on a difference between the first and second image locations and based on motion information for the vehicle between a capture of the first image and a capture of the second image, three-dimensional coordinates for the at least one point associated with the non-semantic road feature; and
send the three-dimensional coordinates for the at least one point associated with the non-semantic road feature to a server for use in updating a road navigation model.

* * * * *